United States Patent [19]

Galloway et al.

[11] Patent Number: 5,333,084
[45] Date of Patent: Jul. 26, 1994

[54] ELECTRONICALLY ALIGNABLE FLEXIBLE DISK DRIVE

[75] Inventors: Gregory M. Galloway, 1617 Canary Dr., Sunnyvale, Calif. 94087; Titus E. Davis, Santa Clara; Roger O. Williams, Fremont, both of Calif.

[73] Assignee: Gregory M. Galloway, Santa Clara, Calif.

[21] Appl. No.: 611,962

[22] Filed: Jul. 13, 1990

[51] Int. Cl.5 .............................................. G11B 5/596
[52] U.S. Cl. ............................. 360/77.07; 360/77.02; 360/77.08
[58] Field of Search ............... 360/77.07, 77.06, 77.04, 360/77.11, 78.13, 78.14, 77.02, 77.03, 77.08, 78.04

[56] References Cited

U.S. PATENT DOCUMENTS

| | | | |
|---|---|---|---|
| 4,445,153 | 4/1984 | Fujimoto et al. | 360/77.06 X |
| 4,453,188 | 6/1984 | Johnson et al. | 360/86 X |
| 4,789,909 | 12/1988 | Moteki | 360/77.06 |
| 4,872,074 | 10/1989 | Brown et al. | 360/78.13 X |
| 4,969,059 | 11/1990 | Volz et al. | 360/77.04 |
| 5,097,365 | 3/1992 | Takahashi | 360/77.06 |

OTHER PUBLICATIONS

"Tronix DMA Manual"—1989 Ironia Peripherals Inc., Santa Clara, Calif.

"Dyson 350A & 350/2A Alignment Instruction booklet"—1985 pp. 1-15 Xidex Corp.

B. Naegel "Brikon (Brian) Floppy disk tester document" F.I.B. #31, pp. 2-5 (Sep. 27, 1985).

Primary Examiner—Aristotelis Psitos
Assistant Examiner—Varsha V. Sheladia
Attorney, Agent, or Firm—Michael J. Hughes

[57] ABSTRACT

A disk drive in which the radial alignment, track zero alignment, index to data timing, write current, asymmetry and threshold dropout can be electronically adjusted. A plurality of programs stored in random access memory run a plurality of adjustment procedures used to control the electronic adjustment functions of the disk drive. An alignment disk read by the disk drive provides alignment data for the radial, track zero and index to data alignment procedures. A microstepper circuit in the disk drive allows the read/write heads to be moved in discrete steps of approximately 1/126 of the track pitch for electronically adjusting the radial and track zero parameters. The index to data alignment is set by generating and storing an artifical index offset value. The write current and asymmetry adjustment procedures utilize digital to analog convertors (DACS) to vary the voltage supplied to the read/write heads. The threshold dropout procedure utilizes a DAC to control the output of a pulse detector.

5 Claims, 13 Drawing Sheets

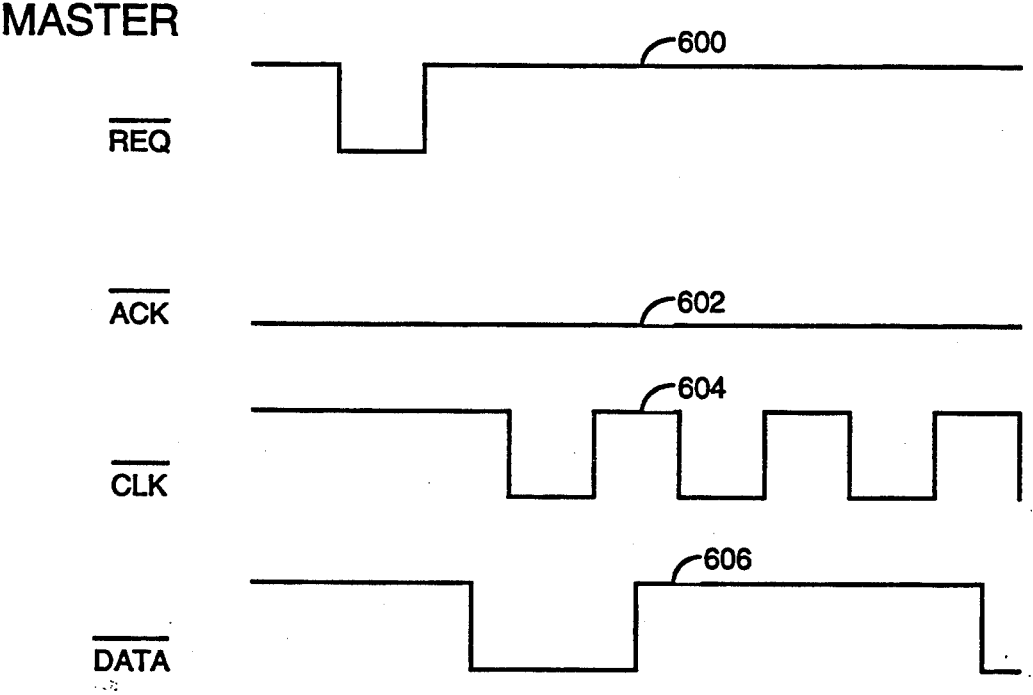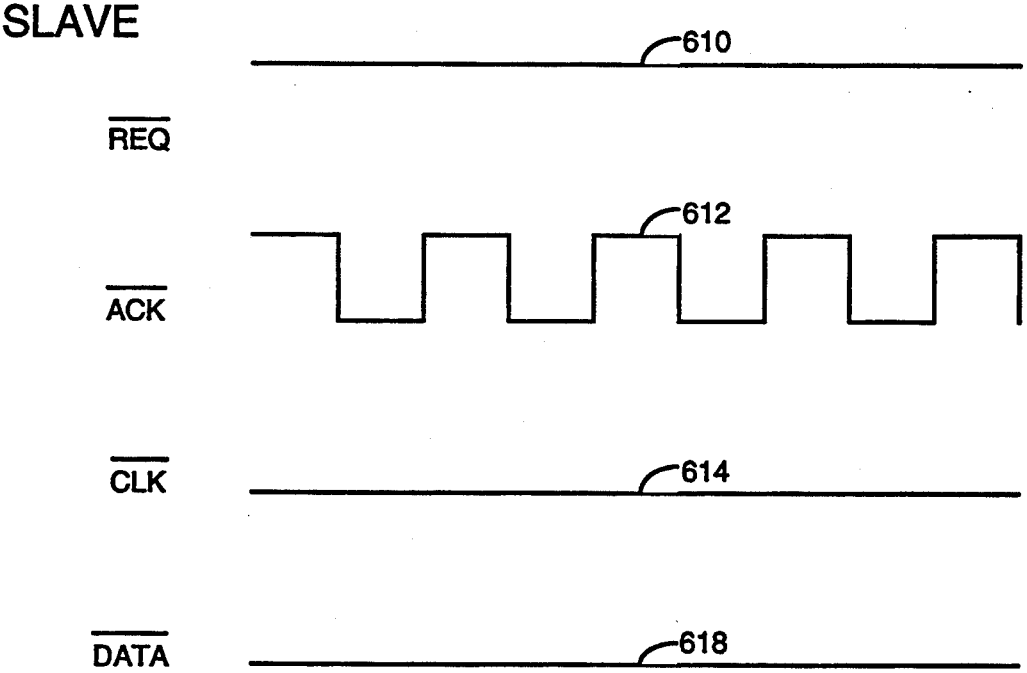
FIG. 20

ELECTRONICALLY ALIGNABLE FLEXIBLE DISK DRIVE

BACKGROUND OF THE INVENTION

1. Field of the Invention

The present invention relates to a disk drive for floppy disks and more particularly to a disk drive having an alignment circuit that allows read/write head parameters, such as the radial alignment, track zero offset, index to data timing, write current level, asymmetry and threshold dropout to be electronically adjusted.

2. Description of the Prior Art

FIG. 1 shows a standard, commercially available disk drive 10 for use with a floppy disk 14, such as a double sided, high density, 96 track per inch (TPI), 5.25 inch diskette. A plurality of concentric magnetic data tracks data 16 are recorded on the disk 14. A pitch "P" is the distance separating adjacent data tracks. The disk drive 10 includes read/write carriage assembly 18 that supports an upper read/write transducer 22 (and a lower read/write transducer 24 which is not shown in FIG. 1) and moves on a pair of carriage guide rods 26. A shaft 30 of a stepper motor 34 is attached to the carriage assembly 18 by a band 38 to provide a means for moving the carriage assembly 18 in discrete steps. A read/write circuit 50 contains the electronic circuitry for enabling the transducers 22 and 24 to read and write data on the disk 14. A spindle motor 42 rotates the disk 14 under the transducer 22 during operation.

An index sensor 46 is positioned on the spindle motor for detecting when an index hole 50 in the disk 14 passes the sensor 46. Similarly, an optical track zero sensor 54 is positioned on the disk drive 10 for sensing when a flag 58 on the carriage assembly 18 passes the sensor 54.

In order for the disk drive 10 to function properly, it is important that the read/write transducer (head) 22 be properly aligned with respect to the data tracks 16 on the floppy disk. If the transducer 22 is not properly aligned, numerous problems arise in attempting to read and/or write data on the disk 14. Typical parameters that need to be kept within alignment specifications are the radial alignment, the track zero offset and the index to data offset. Additionally, parameters such as azimuthal alignment, write current and asymmetry are frequently monitored on an "end of life" basis (i.e. when these parameters fall sufficiently out of specification, the transducer 22 must be replaced).

With high volume industrial disk drives (e.g. disk drives used to record tens of thousands of copies of an applications program), it is not unusual for the disk drive to require alignment on a daily basis. Typically, the alignment procedure must be performed by a skilled technician. Even a simple alignment procedure can require fifteen to thirty minutes of the technician's time.

In a typical alignment procedure, a floppy disk having diagnostic information recorded on it (an alignment disk) is used to display an alignment signal indicative of the alignment status of the read/write transducer 22 on an oscilloscope or drive exerciser. Screws on the disk drive 10 are then loosened, the relevant part is manually moved to bring the parameter being displayed into specification, and the screws are then retightened to secure the part in a new position. For example, to set the radial alignment, the stepper motor 34 is manually moved and secured in a new position. To adjust the track zero alignment, the track zero sensor 54 is manually moved and secured in a new position. To adjust the index to data offset, the index sensor 46 is manually moved and secured in a new position. Write current and asymmetry are generally set during the drive manufacturing process using a procedure that involves manually adjusting a potentiometer that sets the write current and asymmetry. Once this adjustment is made, it cannot be readily changed.

In addition to requiring a skilled technician and being time consuming, a further problem with these manual adjustments is that the process of tightening the screws on the adjusted part often changes the position of the part and pushes the parameter back out of specification.

The alignment disks for accomplishing the manual alignment procedure are well-known. For example, U.S. Pat. No. 4,513,331, issued to Baker et al. on Apr. 23, 1985, shows a diagnostic diskette having prerecorded diagnostic tracks for providing reference data about various electrical and mechanical response characteristics of a disk drive. Other patents dealing with alignment diskettes include U.S. Pat. No. 4,748,524 (Fukaya et al., May 31, 1988); U.S. Pat. No. 4,513,333 (Young et al., Apr. 23, 1985); U.S. Pat. No. 4,608,618 (R. Sturtevant-Stuart, Aug. 26, 1986); U.S. Pat. No. 4,562,494 (C. Bond, Dec. 31, 1985); and U.S. Pat. No. 4,694,359 (T. Oya, Sep. 15, 1987).

Devices for analyzing the signals generated by the diagnostic diskettes are also known in the art. For example, Tronix, Inc. of Santa Clara, Calif., sells a Digital Media Analyzer (DMA) suitable for this purpose. U.S. Pat. No. 4,641,207, issued to Green et al. on Feb. 3, 1987, discloses an external diagnostic device that is coupled to the input and output terminates of a disk drive and monitors and/or generates signals used in checking various drive parameters such as track 00 (track zero) alignment, radial and azimuthal alignment of the read/write head, sector burst interval and disk speed. U.S. Pat. No. 4,754,343, issued to Cascio, Sr. et al. on Jun. 28, 1988, discloses a portable alignment device that displays a signal from an alignment disk in a manner that allows the stepper motor or head carriage assembly to be moved until the signal is optimized. U.S. Pat. No. 4,103,338, issued to Cizmic et al. on Jul. 25, 1978, discloses a disk drive exerciser having a memory for storing diagnostic programs. U.S. Pat. No. 4,321,636, issued to C. Lenz on Mar. 23, 1982, discloses a detector for using cat-eye type alignment tracks for aligning a read/write transducer.

Patents disclosing automated methods and devices for disk drive diagnostics are also known. For example, U.S. Pat. No. 4,935,835, issued to Godwin et al. on Jun. 19, 1990, discloses a method for using a special reference track on a floppy disk having optical servo tracks to automatically adjust the radial alignment of the read/write head and position the head relative to track zero U.S. Pat. No. 4,103,338, issued to Cizmic et al. on Jul. 25, 1978 discloses an apparatus for storing self-diagnostic programs for a disk drive. U.S. Pat. No. 4,149,199, issued to Chick et al. on Apr. 10, 1979, discloses a device for storing track eccentricity data for use in correcting the position of a read/write transducer. U.S. Pat. No. 4,825,313, issued to Moribe et al. on Apr. 25, 1989 discloses a method for using stored displacement values to correct the position of a magnetic head. British patent application GB 2226179-A, of Kani et al., published on Jun. 20, 1990, discloses a method and apparatus for verifying tracking errors that utilizes a stepper motor and an alignment disk.

Other patents disclosing disk drive diagnostic devices include U.S. Pat. No. 4,725,968, issued to Baldwin et al. on Feb. 16, 1988; British patent application GB 2225150-A, of Kanal et al., published on May 23, 1990; British patent application GB 2187878-A, of Kanai et al., published on Sep. 16, 1987. Japanese patent JP 62-287414, issued Dec. 14, 1987 to Ishida et al.; Japanese patent JP 63-201909, issued Aug. 22, 1988 to N. Adachi; Japanese patent JP 01-185893, issued Jul. 25, 1989 to C. Kawakami; and Japanese patent JP 01-159875, issued Jun. 22, 1989 to Mizunuma et al.

SUMMARY OF THE INVENTION

It is therefore an object of the present invention to provide a disk drive that does not require frequent manual adjustment of the track zero offset, the radial alignment and the index to data alignment.

It is another object of the present invention to provide a disk drive in which the write current and asymmetry can be electronically adjusted.

It is another object of the present invention to provide a disk drive that has an extended read/write head lifetime.

It is another object of the present invention to provide a disk drive that can electronically determine the threshold dropout level.

Briefly, the preferred embodiment of the present invention comprises a floppy disk drive in which a plurality of alignment and electrical parameters are electronically adjusted and/or monitored. The alignment parameters include the radial alignment, the track zero alignment, the index to data alignment and the azimuthal alignment. The electrical parameters include the write current setting, the asymmetry setting and the threshold dropout.

The alignment parameters are electronically adjusted (or monitored in the case of the azimuthal alignment) by using alignment data from a prerecorded alignment disk. For the radial and track zero alignment procedures, the disk drive read/write heads are moved in small increments (1/126 of a track pitch) until the amplitude of an analog signal generated from the alignment data is maximized.

The electrical parameters are adjusted by writing and then reading back data on a floppy disk. An analog peak envelope of the read data is converted to a digital signal which is processed in an external analyzer. The analyzer issues commands which reset voltage levels in the disk drive that control the write current and asymmetry values.

An envelope detector circuit, comprised of a peak detector and a low pass filter, is used to generate the analog peak envelopes used in the various alignment and electrical parameter adjustment/monitoring procedures.

Programs for controlling the collection and processing of the alignment information (referred to as the alignment system control software) are stored in a non-volatile memory circuit. A plurality of digital to analog convertors (DACs) contained in a write current-/asymmetry circuit and in a threshold dropout circuit are used for changing the voltage levels required in the electrical parameter adjustment procedures.

The radial alignment adjustment is electronically accomplished by microstepping (stepping in approximately 1/126 track pitch increments) the read/write head relative to a track on the alignment disk until a radial alignment (cateye) pattern read from the alignment disk indicates that radial alignment has been achieved. An offset value is calculated from this information and applied to subsequent positioning of the head thereby eliminating the need for a manual radial alignment adjustment.

Index to data alignment is achieved by electronically generating an artificial index pulse that brings the period between optical index detection and index pulse detection into specification; thus eliminating the need to manually adjust the index to data optical sensor.

The track zero offset is electronically adjusted by positioning the head over the track zero alignment track on the alignment disk and then microstepping the head backwards until a track zero flag is sensed by an optical sensor. A track zero offset is then electronically calculated and applied to subsequent positioning of the head thus eliminating the need to perform a manual track zero alignment procedure.

The write current to the upper and lower heads is electronically adjusted by comparing the amplitude of a first track, written at a first write current, to the amplitude of a second track, written at a second write current. This process is repeated for a plurality of tracks until the readback amplitude ceases to increase, indicating that media saturation has been achieved.

The write current is varied by using a plurality of digital to analog circuits (DACS) located in the write current/asymmetry circuit. The DACS allow the voltage supplied to the head to be varied in response to commands from a CPU thereby varying the write current. It is estimated that the ability to adjust the write current will prolong the life of the read/write heads by 25 to 50%.

Asymmetry is electronically adjusted by using a DAC in the write current/asymmetry circuit to alter the write current flowing in different parts of the read/write winding. The correct adjustments to the write current are made in response to asymmetry commands issued by the external drive analyzer. The selected setting for the asymmetry DAC is stored and used to control the head winding write current distribution until another asymmetry adjustment procedure is run.

Threshold dropout is electronically adjusted by writing and reading data on a special disk having a calibrated defect (for example a 50% reduction in the metal oxide layer). A DAC in the threshold dropout circuit is adjusted until the external drive analyzer fails the disk. The DAC setting at this point is stored as a reference value.

The azimuthal offset parameter cannot be adjusted using the present invention. Rather, the azimuthal offset parameter is monitored by the external drive analyzer and reported.

An advantage of the present invention is that the stepper motor does not need to be manually adjusted to perform a radial alignment.

Another advantage of the present invention is that the track zero optical sensor does not need to be moved to perform a track zero alignment.

Another advantage of the present invention is that the index sensor does not need to be moved to perform an index to data alignment.

Another advantage of the present invention is that the write current and asymmetry can be electronically adjusted.

Another advantage of the present invention is that the threshold dropout can be electronically set and monitored.

These and other objects and advantages of the present invention will no doubt become obvious to those of ordinary skill in the art after having read the following detailed description of the preferred embodiment which is illustrated in the various drawing figures.

IN THE DRAWINGS

FIG. 16 is a circuit diagram of the microprocessor/memory section of the alignment circuit shown in FIG. 3;

FIG. 17 is a circuit diagram of the analog diagnostics section of the alignment circuit shown in FIG. 3;

FIG. 20 is a diagram illustrating a communication protocol according to the present invention.

DETAILED DESCRIPTION OF THE PREFERRED EMBODIMENT

Figure 1:
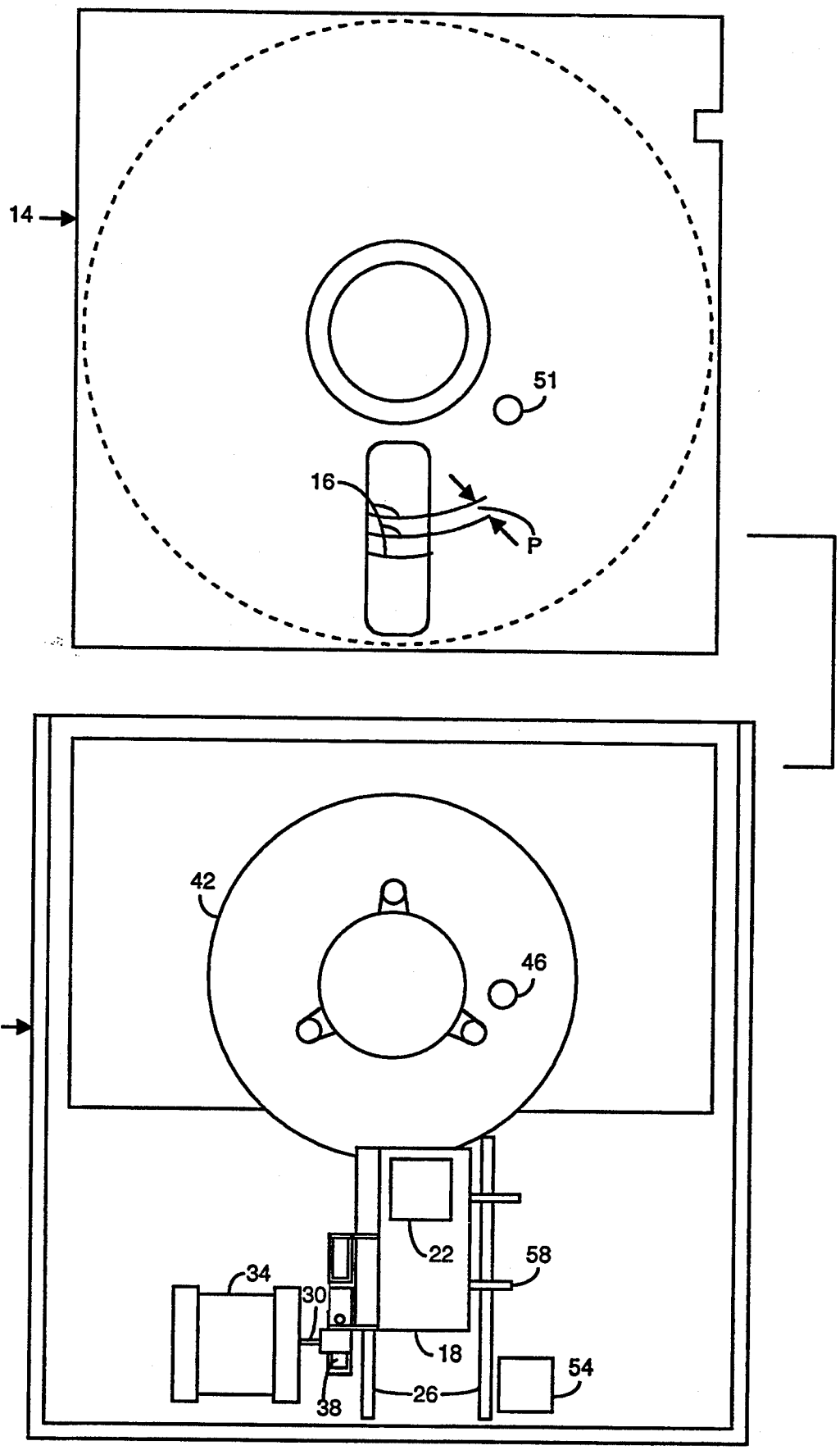
FIG. 1 is a top view of a disk drive and a floppy disk according to the prior art.
Figure 2:
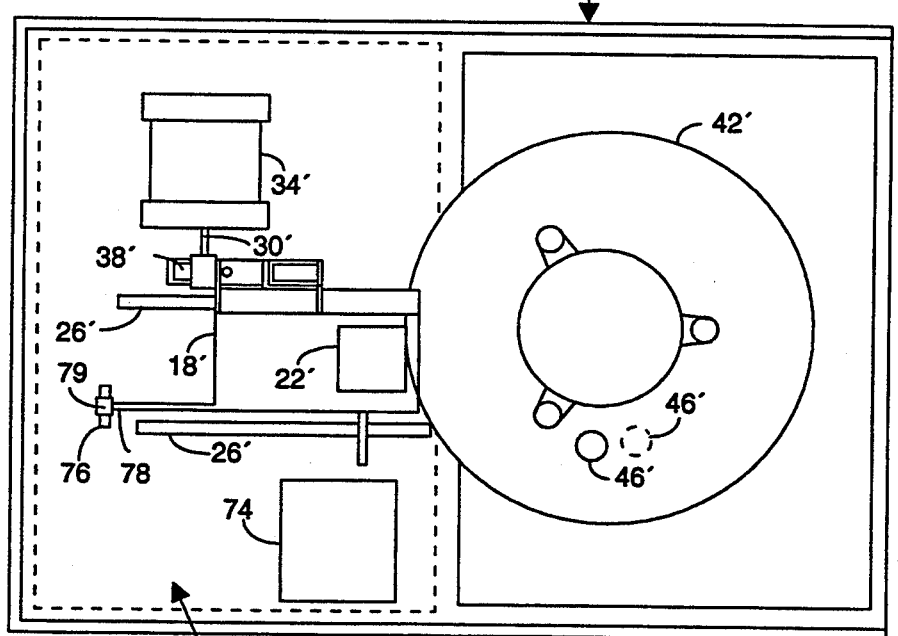
FIG. 2 is a top view of a disk drive according to the present invention.

FIG. 2 illustrates an electronically alignable disk drive 70 according to the present invention. Elements of the disk drive 70 that are identical to elements shown in FIG. 1 are labeled with the same reference number used in FIG. 1 followed by a prime symbol.

Comparison of FIG. 2 with FIG. 1 shows that the disk drive 70 comprises the disk drive 10 of the prior art with the read/write circuit 50 being replaced by an alignment circuit 74. In the preferred embodiment, the alignment circuit 74 is added to a commercially available disk drive, such as a high density 5.25 inch 1.2 MB disk drive with a 360 rpm spindle motor, model no. FD-55GV available from TEAC or a 360 KB 48 tpi disk drive, TEAC model no. FD-55BR (with an optional 600 rpm spindle motor).

Typically, the alignment circuit 74 is contained on a printed circuit (PC) board 75 that is mounted under the carriage assembly 18' (illustrated by dashed lines in FIG. 2). For clarity the alignment circuit is depicted as occupying only a portion of the PC board 75. The track zero sensor 54 of the drive 10 is replaced by a new track zero sensor 76 which is mounted on the printed circuit board 75. The track zero sensor is a commercially available optical sensor such as is available from Sharp, part number GP1S55. The track zero flag 58 of the prior art is replaced by a new track zero flag 78 mounted on the back of the carriage assembly 18'. The track zero flag 78 fits into a notch 79 (illustrated more clearly in FIG. 4) in the track zero sensor 76 thereby interrupting an optical signal.

In the present invention, the index to data sensor 46' is advanced to its foremost position relative to the ordinary position of the index to data sensor 46 (indicated by dashed lines in FIG. 2) to ensure that the sensor 46' is activated earlier than is called for in most specifications.

Figure 3:
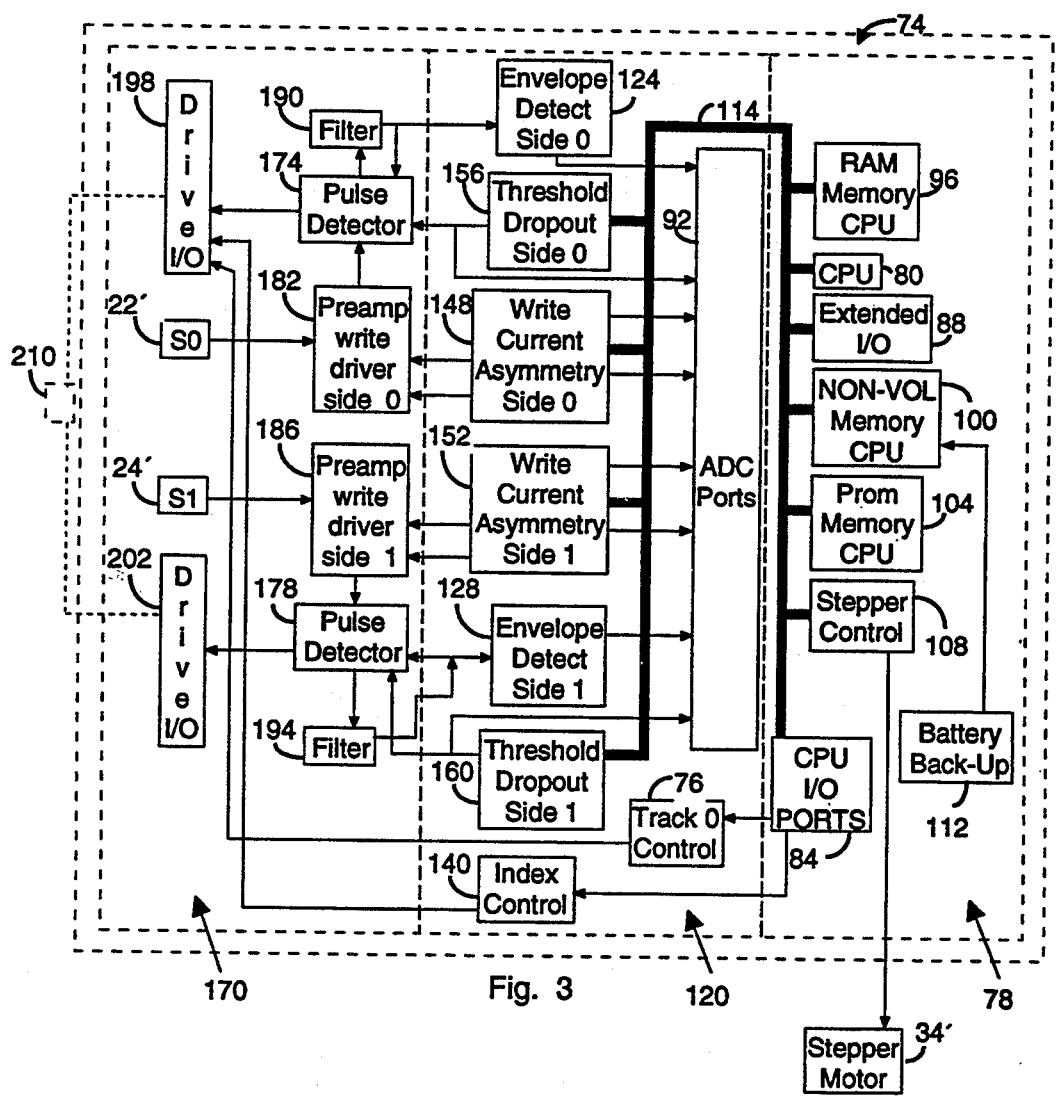
FIG. 3 is a block diagram of the alignment circuit according to the present invention.

FIG. 3 illustrates the alignment circuit 74 in more detail. A microprocessor/memory circuit 78 includes a central processing unit (CPU) 80, such as a Signetics microcontroller (part number PC883C 552), a plurality of CPU I/O ports 84 and a plurality of extended I/O ports 88 connected to a plurality of analog to digital circuit (ADC) ports 92.

The circuit 78 also includes a plurality of memory circuits for the CPU 80, including a random access memory (RAM) circuit 96, a non-volatile RAM circuit 100, a programmable read only memory (PROM) circuit 104 (used as a cold boot loader) and a stepper control circuit 108, all of which are also connected to the ADC ports 92. The RAM circuits 96 and 100 are actually part of the same non-volatile memory chip and are shown as separate blocks to emphasize their different functions. The RAM circuit 96 is used to store programs for controlling the alignment functions, while the RAM circuit 100 is used to store alignment parameters ("values") generated by the alignment functions. A battery 112 supplies power to the nonvolatile memory circuit 100. A bus 114, illustrated as a heavy line in FIG. 3, electrically connects various components in the alignment circuit 74.

The stepper control circuit 108 is an integrated circuit (IC) that divides each detent of the stepper motor 34' into approximately 126 microsteps. The exact number of microsteps depends on the type of stepper motor and media used. For example, for a high density 5.25 inch floppy disk, the track pitch (i.e. the distance between tracks) is 6 mil. For a 3.25 inch disk, the track pitch is 3 mil. Thus, the detent for stepper motors suitable for use with different media will vary, causing the number and/or size of the microsteps to vary. A commercially available IC suitable for use as the stepper control circuit 108 is available from SGS Thomson Microelectronics (part number L6217A).

Figure 14:
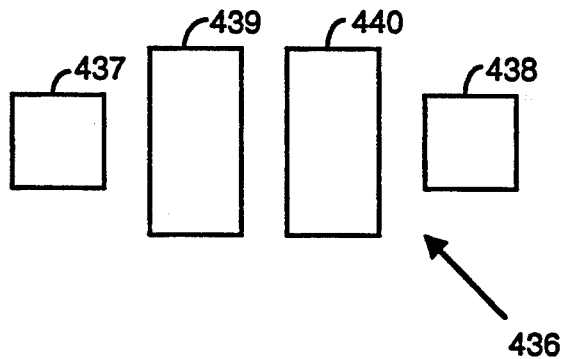
FIG. 14 is an illustration of an azimuthal alignment signal according to the prior art.

The alignment circuit 74 includes an analog diagnostics module 120. The module 120 includes a plurality of pairs of identical circuits with the first member of each pair functioning as an alignment/diagnostic circuit for one side (side 0) of the disk 14 and the second member of the pair functioning as a diagnostic circuit for the other side (side 1) of the disk 14'. As is shown in FIG. 14, many of the circuit pairs in the module 120 are actually single integrated circuits that provide separate circuitry for the side 0 and side 1 functions.

The module 120 includes a first and second envelope detect circuit 124 and 128, respectively; the track zero sensor 76; an index control circuit 140; a first and second write current/asymmetry circuit 148 and 152, respectively; and a first and second threshold dropout circuit 156 and 160, respectively. The first and second write current/asymmetry circuits 148 and 152 (actually a single chip) include a plurality of digital to analog convertors (DACs) used in the automatic write current and automatic asymmetry adjustment procedures. The threshold dropout circuits 156 and 160 also comprise a plurality of DACS used in the automatic threshold dropout procedure. Each DAC allows approximately 255 discrete voltage levels to be utilized.

The first and second envelope detect circuits 124 and 128 each comprise a plurality of operational amplifiers and associated low pass filtering circuitry for filtering the analog data before passing it to the ADC ports 92, where the analog signal is converted to a digital signal that can be interpreted by the analyzer 210. The first and second envelope detect circuits 124 and 128 generate the analog signals used for processing the radial alignment, track zero, threshold dropout, write current and the azimuthal alignment data.

The alignment circuit 74 also includes a read/write module 170 comprised of a plurality of paired circuits for enabling the transducers 22' and 24' to read and write data on both sides of the disk 14. The module 170 comprises a first and second pulse detector 174 and 178, respectively; a first and second preamp write driver 182 and 186, respectively; a first and second filter 190 and 194, respectively; and a first and second drive I/O circuit 198 and 202, respectively. The I/O circuits 198 and 202 are utilized to connect the disk drive 70 to an analyzer 210, which is an oscilloscope or a computer designed especially for processing digital alignment information from disk drives. The analyzer 210 has the capability of generating write signals (generating write gate), measuring the asymmetry in magnetic read data and processing other digital read signals from a magnetic disk. In the preferred embodiment, the analyzer 210 is the computer referred to as a Digital Media Analyzer (DMA), available from Tronix, Inc. of Santa Clara, Calif.

Figure 4:
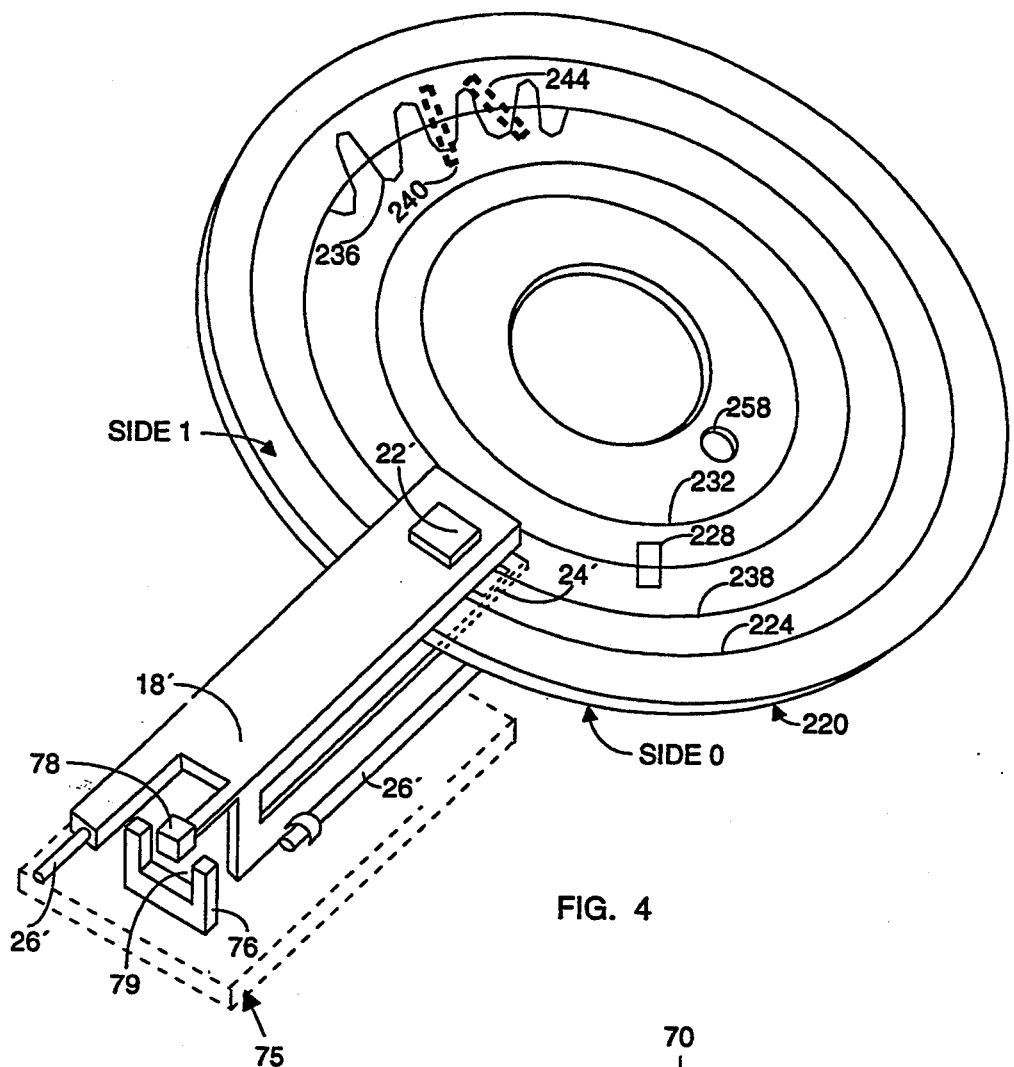
FIG. 4 is a schematic perspective view of an alignment disk and head carriage assembly.

FIG. 4 illustrates an alignment disk 220 (shown without a disk jacket) for use with the drive 70 and shows the track zero sensor 76 in more detail. The disk 220 is an ordinary 5.25 inch floppy disk that has several discrete types of alignment data recorded on it. A commercially available alignment disk, such as the Analog Alignment Disk (AAD) available from Dysan, Inc., is suitable for use as the alignment disk 220.

One type of alignment data recorded on the disk 220 is a track zero data track 224. The track zero data track 224 is a recognizable data signal used as reference track for positioning the read/write transducer 22'. Another data track contains an index to data burst 228 used in determining the index to data timing. A radial alignment track 232 is also included on the disk 220. Typically, the radial alignment track 232 includes a cateye-type data track that generates a cateye signal used in the radial alignment procedure.

A signal 236 is illustrated along a portion of an azimuth alignment track 238 for demonstrating a first read/write gap orientation 240 and a second read/write gap orientation 244 used in discussing azimuthal alignment. The first orientation 240 shows the read/write gap of the transducer 22' oriented perpendicular to the analog signal 236 while the second orientation 244 shows the read/write gap skewed relative to the analog signal 236.

The carriage assembly 18' is also shown in FIG. 4. Examination of FIG. 4 shows that the carriage assembly 18' includes the lower read/write transducer 24' for reading and writing data on the second side (side 1) of a disk such as the alignment disk 220 or the floppy disk 14. The disk 220 also includes an index hole 258 analogous to the index hole 50. The track zero sensor 76 includes a gap 260. When the track zero flag 58' (which moves with the head 22') moves into the gap 260, an optical sensor is triggered that sends a signal to the CPU 80 via the CPU I/O ports 84. The track zero sensor 76 is attached to the PC board 75 and does not move with the head 22'. Generally, during the manufacturing of the drive 70, the sensor 76 is permanently set at a position that would put the head 22' approximately over track two (two tracks toward disk center) when the flag 58' is in the gap 260. This ensures that during the track zero alignment procedure, microstepping should be done in the inward direction.

Figure 5:
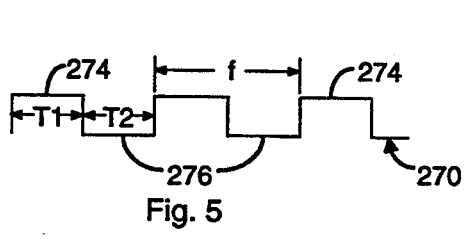
FIG. 5 is schematic representation of a read data segment.

FIG. 5 illustrates a data segment 270 of 5 volt TTL read data. A plurality of "on" data pulses 274 having a pulse width $T_1$ (a period of time measured in milliseconds) and a plurality of "off" data pulses 276 having a pulse width $T_2$. A frequency "f" separates successive pulses 274.

Figure 6:
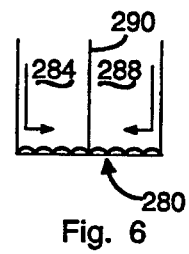
FIG. 6 is a schematic representation of a read/write head coil.

FIG. 6 illustrates a read/write head coil (winding) 280 as would be found on the transducers 22' and 24'. Write current flows in a first cell 284 of the coil 280 in the direction indicated by the arrow in the cell 284. Write current flows in a second cell 288 in the direction indicated by the arrow in the cell 288. A read/write centertap 290 electrically separates the first and second cells 284 and 288.

FIGS. 7 through 13 illustrate flowcharts having a plurality of steps 300 through 430 that summarize the various alignment and diagnostic procedures used to control the electrically alignable disk drive 70. As is explained below, some of the steps 300 through 430 are performed outside the disk drive 70, for example, by the analyzer 210. Most of the steps are performed on the disk drive 70 under the control of the drive software which is stored on the RAM memory circuit 96. The source code listing set out below, before the claims, is a listing of the source code for the drive software.

FIG. 14 is an illustration of an azimuthal alignment pattern 436 as is commonly used in the prior art for monitoring azimuthal alignment. The pattern 436 is recorded on the azimuthal alignment track 238 of the alignment disk 220 and includes a first and second small rectangle 437 and 438, respectively, and a first and second large rectangle 439 and 440, respectively.

Figure 15:
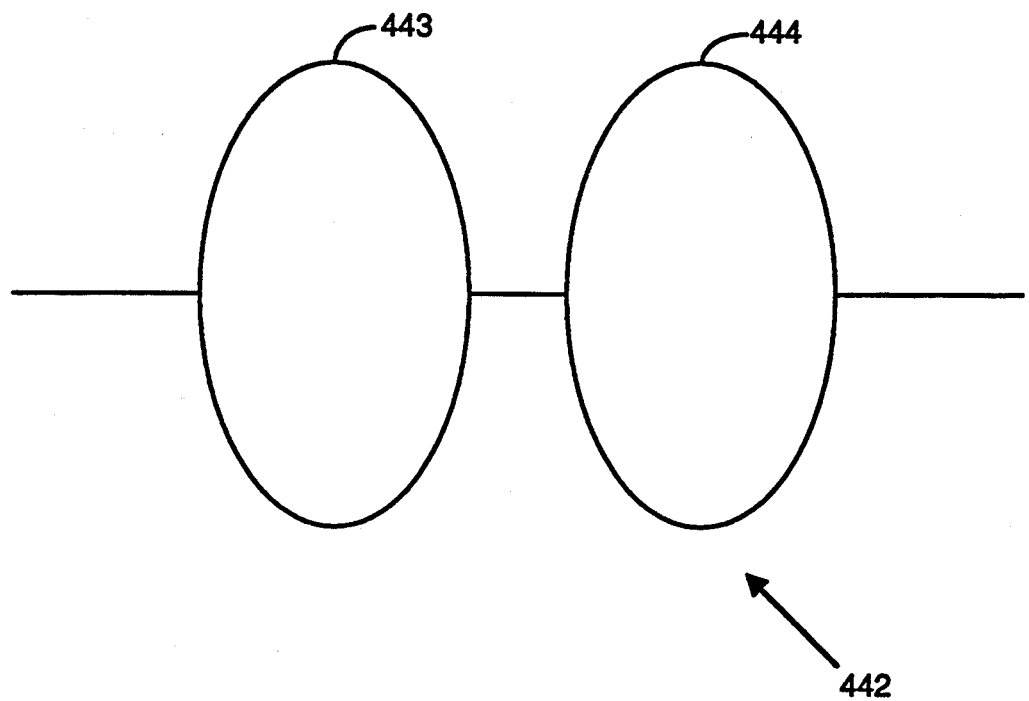
FIG. 15 is an illustration of a cateye alignment signal according to the prior art.

FIG. 15 is an illustration of a cateye alignment pattern 442 as is commonly used in the prior art for adjusting the radial alignment of a read/write transducer. The pattern 442 has a first (left) lobe 443 and a second (right) lobe 444. In the preferred embodiment the cateye alignment pattern 442 found on a Dysan AAD disk is used for the radial alignment procedure.

FIG. 16 is a circuit diagram of the microprocessor/memory circuit 78. The CPU 80 is a microcontroller 460 (Signetics, part number 80C552). The analog to digital convertor 92 is built into the microcontroller 460. The output of the index sensor 46' is connected to the index circuit 140 which also includes a filter for filtering the index signal before it is passed to the CPU 80 for processing. The CPU I/O ports 84 include a plurality of address decoders and I/O latches. A receive clock port 461, a receive data port 462, a receive acknowledge port 463, a receive request port 464, a transmit clock port 465, a transmit data port 466, a transmit acknowledge port 467 and a transmit request port 468 are included in the CPU I/O ports 84. The ports 461, 462, 463, 464, 465, 466, 467 and 468 are collectively referred to as the drive communication ports 469 and are utilized for establishing a communications link between the disk drive 70 and the analyzer 210. Four of the ports are used for reading data and four of the ports are used for writing data.

The output from the track zero sensor 76 is connected to the CPU I/O ports 84. The output from the index sensor 46' (shown in FIG. 2) is connected to the index control circuit 140 which feeds the index signal to the CPU 80 for processing.

FIG. 17 is a circuit diagram of the analog diagnostics module 120. The threshold dropout circuits 156 and 160 include a DAC chip 476. A plurality of DACs are included on the DAC chip 476. The DAC chip 476 supplies a voltage signal to the pulse detectors 178 (and 174). The voltage signal out of the DAC chip 476 is adjustable in 256 steps and controls the point at which the pulse detectors 174 and 178 will not operate.

The write current/asymmetry circuits 148 and 152 comprise a DAC chip 478 that includes a pair of write current DACs 479 and 480, used for adjusting the write current to the side 0 and side 1 transducers, respectively, and a pair of asymmetry DACs 482 and 483, used in adjusting the asymmetry on the side 0 and side 1 transducer, respectively. For convenience, the connector symbols in FIG. 17 are labeled with the reference numeral of the DAC to which the identifier symbol corresponds.

The pulse detectors 174 and 178 each comprise a read channel integrated circuit 484 typically used in Winchester drives (National Semiconductor, part number 8464). The IC 484 will cease to operate (fail to detect pulses) when the amplitude of the signal from the envelope detectors 124 and 128 falls below a certain level. The level at which failure of the IC 484 occurs is determined by the voltage setting of the DAC 476. The envelope detector circuits 124 and 128 comprise a plurality of operational amplifiers and a plurality of CMOS switches 488. The envelope detectors 124 and 128 look at the average integration read RF peak envelope and convey this information to the analog to digital circuit 92 for conversion to a digital signal that can be processed by the analyzer 210.

The filters 190 and 194 are active filters. The stepper control 108 is an IC 492 (SGS Thomson, part number L6217A) that allows the stepper motor 34' to be controlled in 256 discrete steps.

Figure 18:
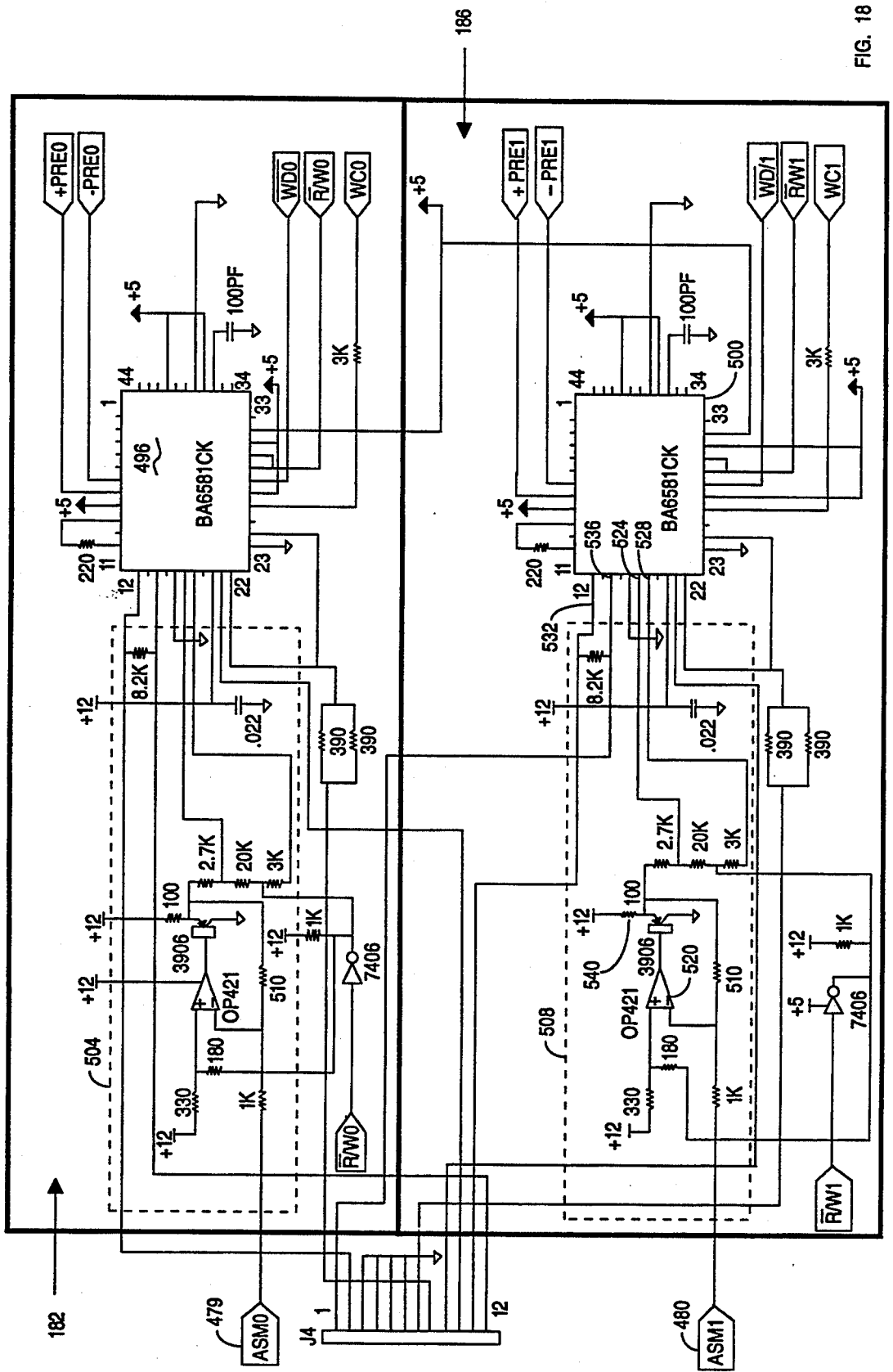
FIG. 18 is a circuit diagram of the preamp write driver section of the alignment circuit shown in FIG. 3.

FIG. 18 is a circuit diagram of the first and second preamp write drivers 182 and 186, respectively, that function in the read/write process and in the automatic asymmetry adjust procedure. In the automatic asymmetry adjust procedure, current is supplied to a pair of IC's 496 and 500 (TEAC, part number BA6581K) by a pair of balanced circuits 504 and 508, respectively. By controlling the signals from the pair of DAC's 479 and 480, the IC's 496 and 500 can be used to control the flow of current in the cells 284 and 288 of the head winding coil 280. For convenience, the connector symbols in FIG. 18 are labelled with the reference numerals of the DAC to which the connectors correspond.

Since the first and second preamp write drivers 182 and 186 are nearly identical circuits whose functions are the same, only the second preamp write driver 186 will be described further. Referring to the second preamp write driver 186, the DAC 480 is used to vary the voltage supplied to an operational amplifier (op amp) 520 in two hundred and fifty-six discrete voltage steps. The voltage applied to the op amp 520 controls the current being supplied to a pair of input pins 524 and 528 of the IC 500. In response to the current input at the pins 524 and 528, the IC 500 generates output signals from a pair of output pins 532 and 536 that control the amount of current flowing in the cells 284 and 288 of the head winding 280 during the write process. In the prior art, a potentiometer was connected to the pins 524 and 528 and used to make a manual asymmetry adjustment.

Balancing of the circuits 504 and 508 is required because the asymmetry adjustment is a very delicate adjustment. Typically, the pulse widths $T_1$ and $T_2$ (in FIG. 5) must be identical to within twenty nanoseconds. Therefore, it is important that the voltage supplied to the circuit 508 by the DAC 480 be precisely transmitted to the pins 524 or 528. Temperature control is achieved by a resistor 540 which controls the op amp 520 in response to temperature changes in the circuit 508.

Figure 19:
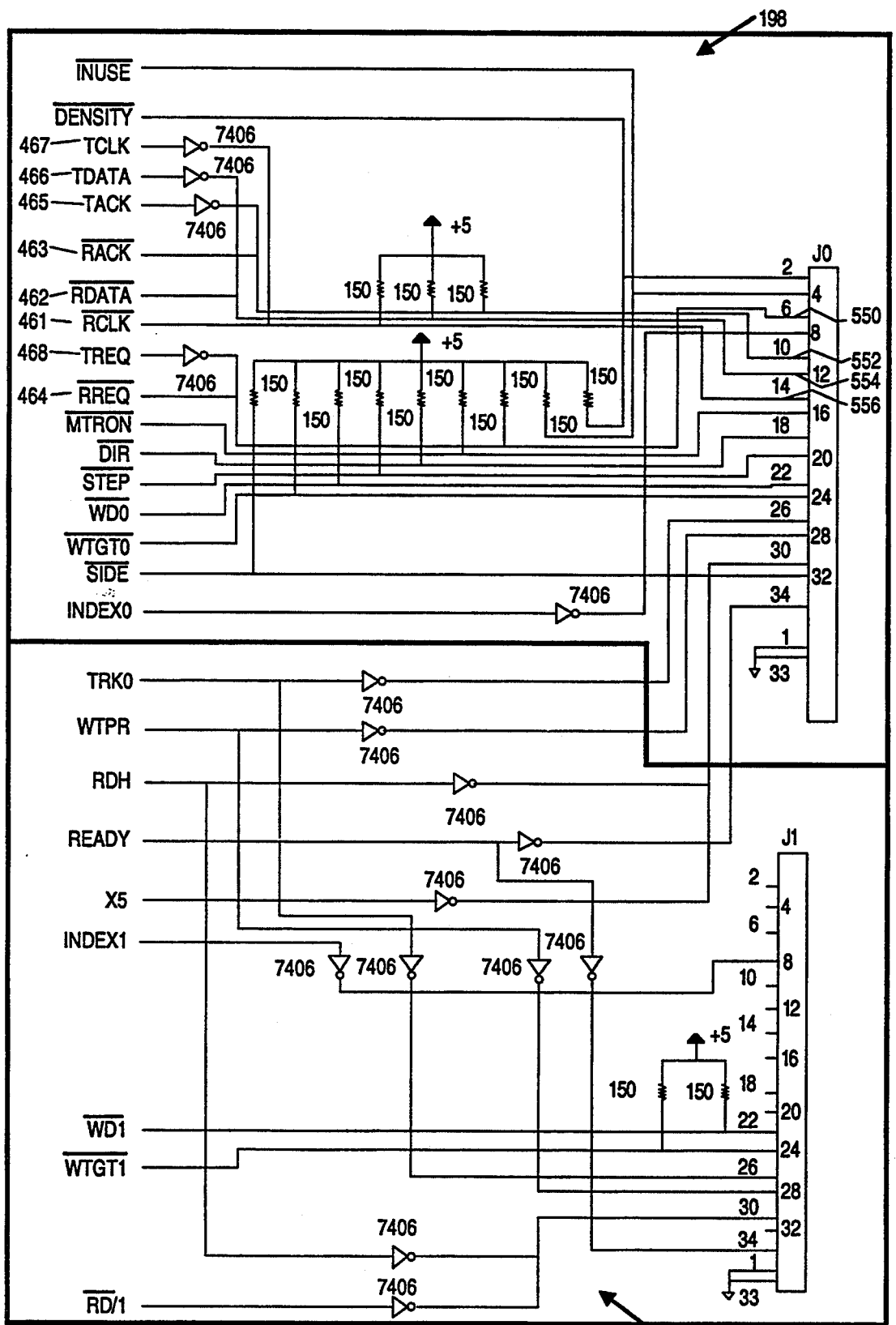
FIG. 19 is a circuit diagram of the drive I/O section of the alignment circuit shown in FIG. 3.

FIG. 19 is a circuit diagram of the first and second drive I/O circuits, respectively. Inspection of FIG. 18 shows that the ports 461, 462, 463, 464, 465, 466, 467 and 468 are connected to a plurality of ports 550, 552, 554 and 556 on the analyzer 210 for completing the communications link between the disk drive 70 and the analyzer 210.

FIG. 20 illustrates the communications protocol used to permit the disk drive 70 to communicate with external devices such as the analyzer (DMA) 210 over the communication ports 469. A master device, which could be either the analyzer 210 or the drive 70, sends four types of signals to a slave device which would be the other member of the analyzer 210/drive 70 pair. The four types of signals sent by the master device are a request signal 600, an acknowledge signal 602, a clock signal 604 and a data signal 606, acknowledge signal 612, clock signal 614 and data signal 618.

Referring to FIGS. 2 through 20, the use and method of operation of the present invention can be explained. Typically, the electrically alignable disk drive 70 is used in applications where tens of thousands of disks will be duplicated, such as in the manufacturing of commercially distributed software programs. In such applications, the disk drive 70 is used in combination with a disk duplicating device that reads a master copy of the software program and instructs the disk drive 70 to write the software program on the disk 14. Generally, an automatic disk loading device feeds blank disks 14 into the disk drive 70 and removes and stacks the disks 14 after they have been recorded.

In a manufacturing process such as this, the alignment of the duplicating disk drive 70 is particularly important because the manufactured software will be distributed to end-users having many different types of disk drives in various stages of misalignment. By having the software programs manufactured on a well-aligned disk drive, the software will be compatible with the greatest number of end-user disk drives.

Referring to FIG. 3, in order to electronically align the disk drive 70, diagnostic programs stored in the RAM memory circuit 96 are utilized to control the various alignment procedures discussed below. These programs are referred to as the alignment system control software in the text of this specification and the source code for these programs is listed at the end of the specification under the heading "Source Code Listing". In the source code, the programs are collectively referred to as the ANSI Drive Control Software.

For the radial, track zero and index to data alignment procedures, and for the azimuthal check procedure, alignment data on the alignment disk 220 is read by the transducer 22' and sent to the CPU 80 for processing under control of the diagnostic programs. Processing of the alignment data results in the generation of either an alignment parameter value or an offset value which is used to electronically correct for misalignment of the parameter in question. The offset or alignment parameter value is stored in the nonvolatile RAM circuit 100 and is used as the setting for the parameter in question until the alignment routine is repeated. In practice, each of the transducers 22' and 24' must be aligned and adjusted separately; however, since the procedures are the same in both cases, only the various procedures for aligning and/or adjusting the transducer 22' will be discussed below. In all cases similar procedures are used to align and/or adjust the transducer 24'.

WRITE CURRENT VALUE

The write current value is a setting for the DAC 480 contained in the write/asymmetry circuit 148 that yields a desired write current in the transducer 22'. Typically, the write current value is set to achieve a desired degree of media saturation. Media saturation refers to the depth to which magnetic data is written in the oxide layer of a magnetic disk. Ideally, it is desirable to utilize the entire depth of oxide layer for writing data, so a media saturation value of 110% is used.

In the disk drives 10 of the prior art, the write current is set when a disk drive is manufactured and is not usually reset after that. However, normal wear of the transducer 22 and other factors, such as the thickness of the disk 14, cause the write current to change over time. With the present invention, the write current can be automatically adjusted either to compensate for wear on the transducer 22' or to achieve a different level of media saturation.

Figure 7:
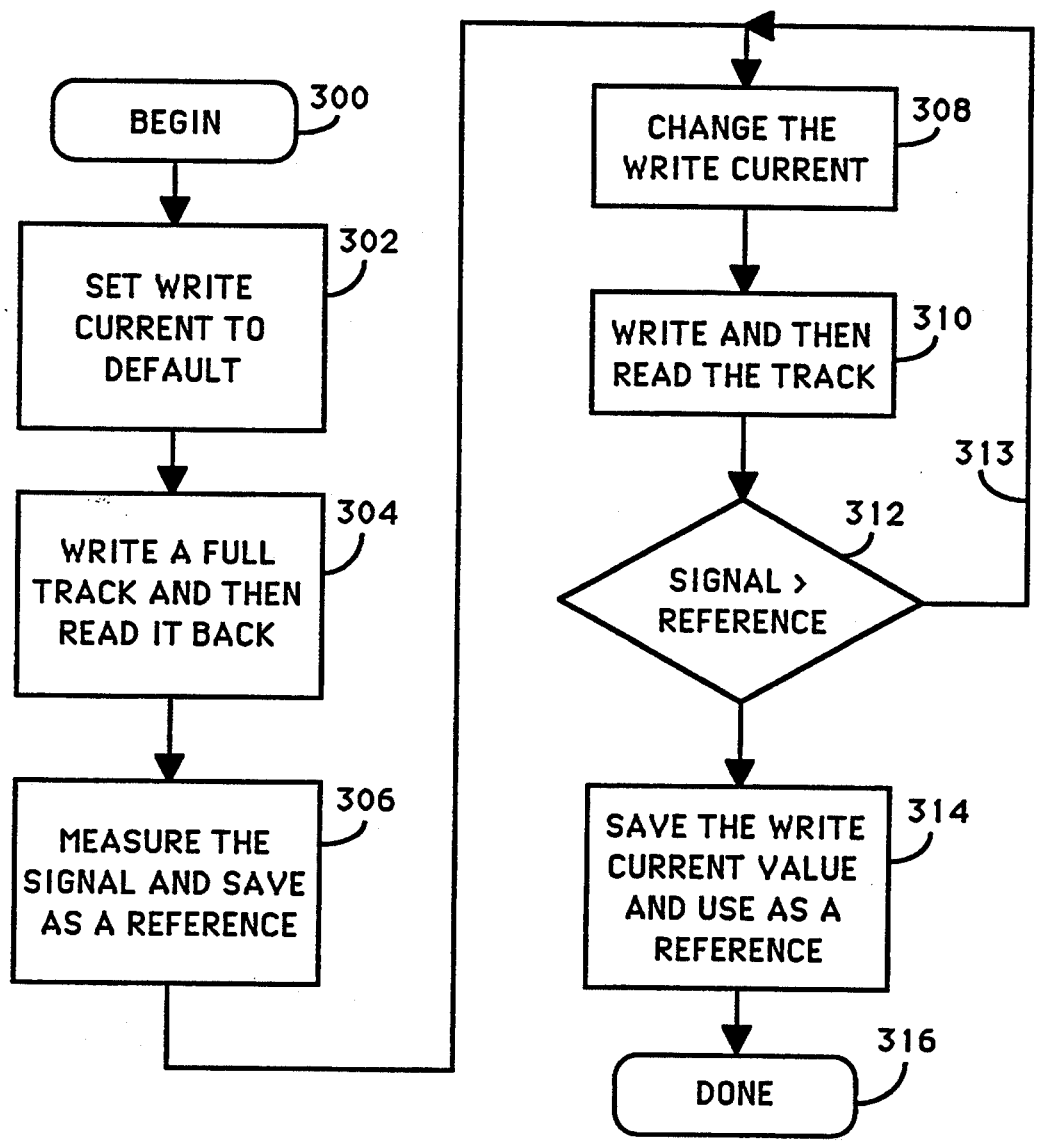
FIG. 7 is a flow chart of the write current adjust procedure according to the present invention.

FIG. 7 is a flowchart that summarizes the procedure for performing an automatic write current adjustment sequence. The DAC 480 within the write current circuit 148 is set to a default value (step 302) that supplies a first voltage to the preamp write driver 182 (i.e. to the IC 500). The IC 500 outputs a first current level to the transducer 22' that results in a first (default) write current. Generally, a default value of about 4.5 milliamps is used as the first write current.

A first data track (step 304) is written by the analyzer 210 at the first write current using the transducer 22'. The write signal for the first data track, at an appropriate frequency and clock, is generated by the analyzer 210 (in the preferred embodiment, the DMA available from Tronix, Inc., is used). The first data track is read back through the transducer 22' as a first readback signal. The peak envelope of the first readback signal is determined by the envelope detect circuit 124 and converted to a plurality of digital signals in the ADC circuit 92 (about 1000 samples per track). The plurality of digital signals are then processed by the system control software to determine the average track amplitude and sent to the analyzer 210 for storage (step 306).

The analyzer 210 then issues a command to reset the DAC 480 to supply a second voltage (step 308) which yields a second write current. Generally, the second write current value will be higher than the first write current value because the default setting is selected to be less than the saturation level. If the default value is already past the saturation level, the system control software determines this and causes the second write current to be less than the first write current.

A second data track is written at the second write current on the same track as the first data track was previously written (step 310). The second data track is read back to yield a second readback signal and the amplitude of the second readback signal compared to the first reference signal (step 312) in the analyzer 210. The system control software determines whether the second readback signal is higher, lower or the same as the first readback signal (step 312) and makes a decision whether to proceed to the step 314 or to enter the loop 313. If the loop 313 is entered the second readback signal is saved as a new reference value and the DAC 480 is reset to either increase or decrease the write current. A new readback signal is generated and the decision step 312 is repeated until the reference signal is acceptable and the appropriate setting for the DAC 480 is stored in the non-volatile RAM 100 as a final reference write current value (step 314).

Since write current is dependent on the media used as the data storage disk, the write current alignment procedure is usually performed using the same media as will ultimately be used in the disk drive 70. For the same reason, the first and second data tracks are written on the same track location on the disk 14.

ASYMMETRY

Asymmetry is a measure of the symmetry of data bits being written by the transducer 22'. Referring to FIG. 5, asymmetry exists when the pulse width $T_1$ is not equal to the pulse width $T_2$. In the present invention, asymmetry is electronically adjusted by using the write current/asymmetry circuit 148 to control the write current in the transducer 22' and the analyzer 210 to process the asymmetry data. Referring to FIG. 6, the write current in either the first cell 284 or the second cell 288 can be varied by the write current/asymmetry circuit 148. Changing the write current in one of the cells 284 or 288 changes the pulse width $T_1$ or $T_2$ relating to that cell.

Figure 8:
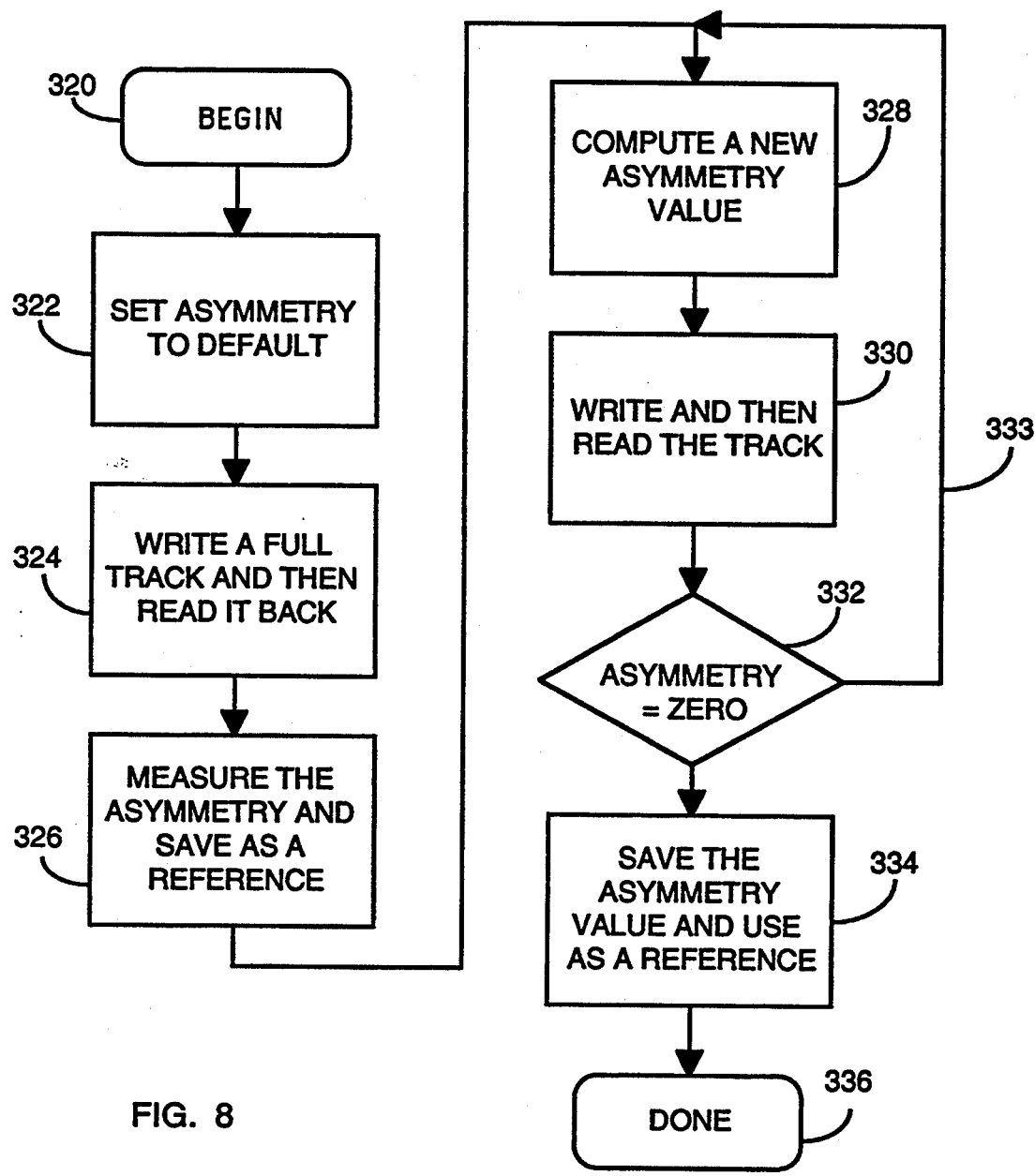
FIG. 8 is a flow chart of the asymmetry adjust procedure according to the present invention.

FIG. 8 is a flowchart that summarizes the automatic asymmetry adjustment procedure. The asymmetry adjust procedure is similar to the automatic write current adjust sequence in that the analyzer 210 (preferably the DMA) is used to write a first data track at a first write current value (set at a default value—step 322) having the proper reference frequency for the rpm of the spindle motor 42'. The default value means the DACs 512 or 516 are set to make the current in each of the head cells 284 and 288 equal.

A first readback signal is then generated when the analyzer 210 reads the first data track using the transducer 22' (step 326). The first readback signal processed by the analyzer (DMA) 210 to yield a first asymmetry value (step 326). The first asymmetry value is stored, the analyzer 210 commands the DACs 512 or 516 to be reset to a new value. A second asymmetry value is generated by writing a second data track at a second write current value and reading the second data track to yield a second readback signal (step 330). The second readback signal is processed by the analyzer 210 to yield a second asymmetry value. The first and second asymmetry values are then compared (step 332) and a decision is made on whether to enter the loop 333. Generally, if the measured asymmetry reported by the analyzer 210 is less than ±20 nanoseconds the process is ended and the asymmetry value is saved in the nonvolatile RAM 100 (step 334).

The DMA (analyzer 210) measures asymmetry by taking every data bit of readback signal, separating the $T_1$ pulse widths from the $T_2$ pulse widths, measuring the pulse widths to within ±2.5 nanoseconds and calculating the asymmetry.

THRESHOLD DROPOUT

Threshold dropout is a parameter used to identify defects in the recording media (i.e. in the floppy disk 14), such as a weak spot in the oxide layer. The threshold dropout parameter is set so that if the read amplifier detects a drop of more than a specified percentage in the normal track amplitude, a media fail signal will be generated.

Figure 9:
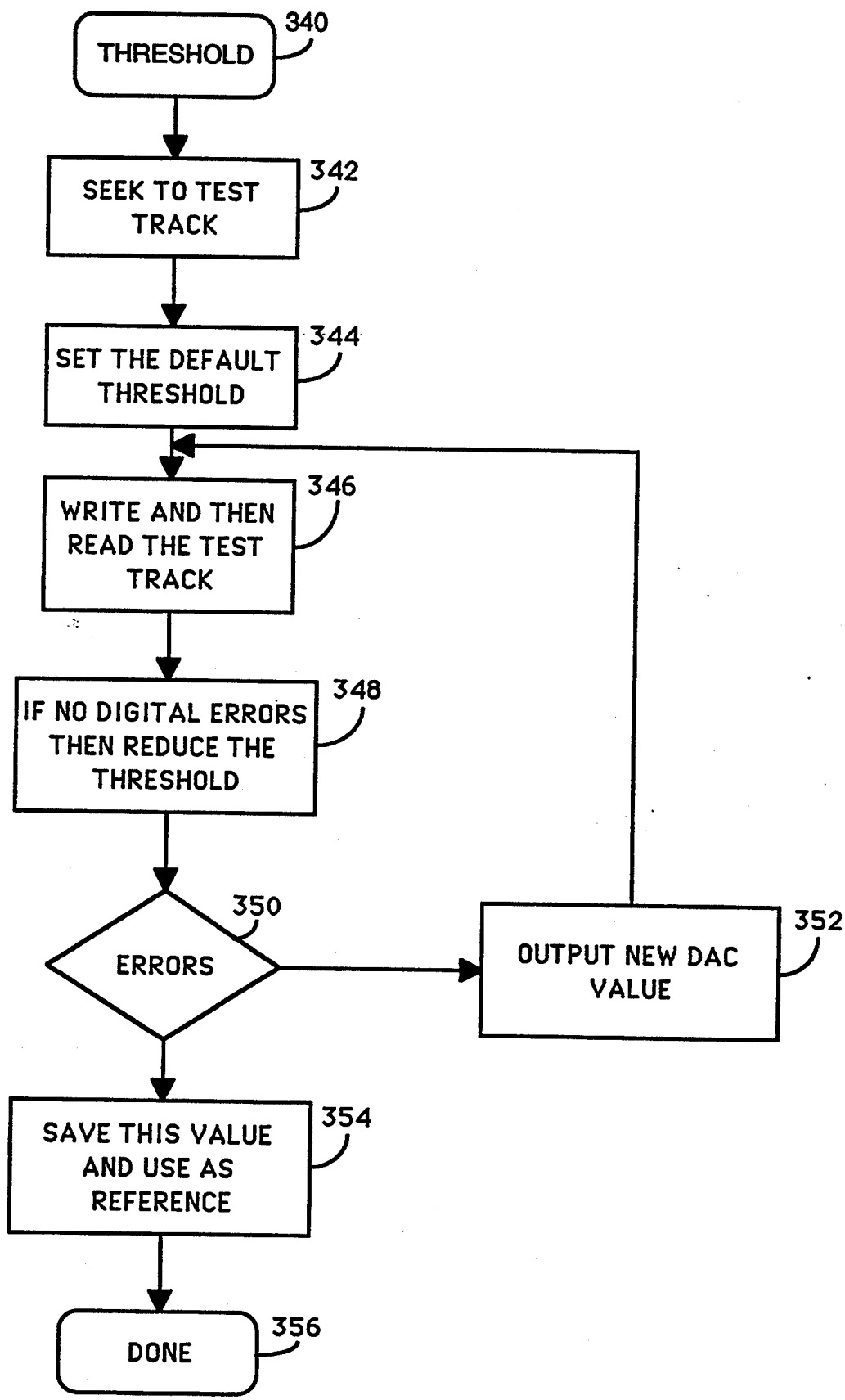
FIG. 9 is a flow chart of the threshold dropout adjustment procedure according to the present invention.

FIG. 9 is a flowchart that summarizes the automatic threshold dropout procedure. In the threshold dropout procedure, a specially manufactured "threshold" disk having a known and quantified defect is inserted in the drive 70. For example, the oxide layer may be thinned in a certain region so that a readback amplitude that is only fifty percent of optimum is obtained. The DAC 476 in the threshold dropout circuit 156 (or 160 depending on whether side 0 or side 1 is being read) is set to a default value (step 342). Data is then written on the threshold disk by the analyzer 210 and the transducer 22' in the same manner as was previously described with respect to step 304 of the write current procedure shown in FIG. 7.

The analyzer 210 and transducer 22' then read the track back. The analyzer 210 runs a check to verify if all the bits written are in fact read back (step 346). If the track is satisfactorily read back, the setting for the DAC 476 is changed and a second data track is written, read and verified. This process is repeated until the track is not satisfactorily read back (step 352). The setting of the DAC 476 at this point is stored in the nonvolatile RAM 100 as the threshold dropout reference parameter.

SOFTWARE CONTROL OF WRITE CURRENT, ASYMMETRY AND THRESHOLD DROPOUT

Figure 10:
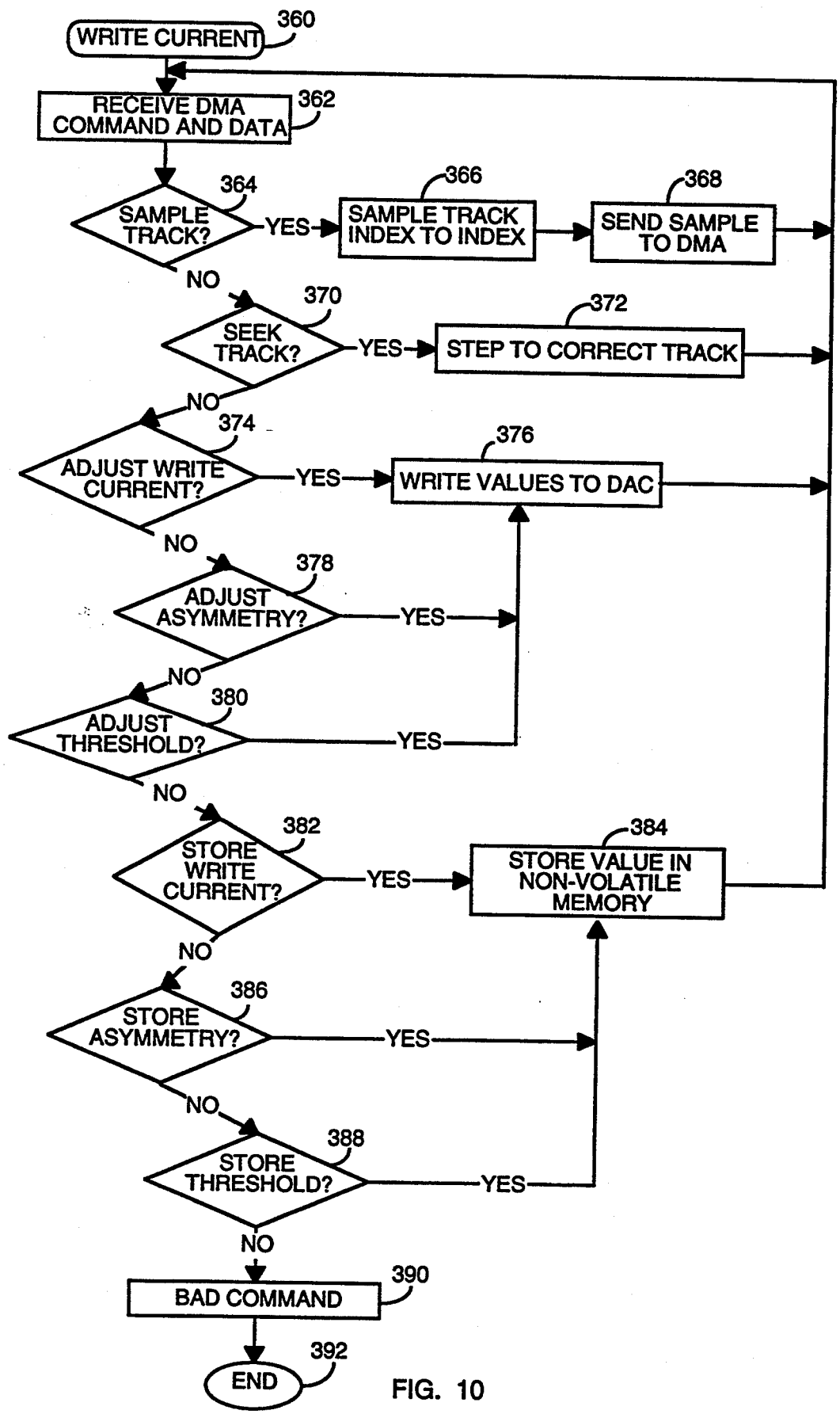
FIG. 10 is a flow chart summarizing the write current, asymmetry and threshold dropout procedures.

FIG. 10 is a flowchart that summarizes the functions performed by the electrically alignable disk drive 70 during the write current adjust, asymmetry and threshold dropout procedures.

Referring to step 362, the analyzer (DMA) 210 sends a command to the drive 70 over the communication ports 469. The command is interrogated by the drive software to determine what kind of command it is. For example, step 364 asks if this is a sample track command. If the answer is no, the command moves down the pathway to step 370 where it is again interrogated. The process is repeated until the command is identified. For example, if at step 364, the command was identified as a sample track command, the drive software moves to step 366 and performs the sample track function by using the analog to digital convertor 92 to sample a track of analog data from the envelope detect circuit 124 or 128. The digital data is then sent to the analyzer 210 for processing. For example, the write current, threshold or asymmetry could be determined by the analyzer 210 as previously described. After processing the data, the analyzer 210 would issue another command which would reenter the loop at step 362 for interrogation.

Steps 374, 378 and 380 each determine if the command is a command to change a DAC setting. If it is, the drive software moves to step 376 which adjusts the appropriate DAC. Similarly, steps 382, 386 and 388 all inquire if a parameter should be saved. If the answer is yes, the drive software moves to step 384 and the parameter is stored in the nonvolatile memory circuit 100.

FIG. 20 illustrates the relationship of the four signals used in the communications protocol that allows the disk drive 70 to communicate with an external device such as the analyzer 210. The master device, which could be either the analyzer 210 or the disk drive 70, makes a request by dropping the request line 600 low. The request line 600 stays low until the slave device drops its acknowledge line 612 low. The acknowledge line 612 stays low until the master request line 600 goes high. At this point, the master/slave relationship has been established and data can be transferred. Serial data bits are transmitted from the master to the slave with the master clock line 604 lock stepped with the slave acknowledge line 612 half cycles apart. Sixteen bit strings are transmitted with eight bits carrying the command identifier and eight bits carrying the data. At the end of transmission, either device (master or slave) can raise a request.

RADIAL ALIGNMENT

In a typical alignment procedure, the first alignment parameter to be examined is the radial alignment. The radial alignment procedure determines whether the read/write gap of the head 22' is centered on a data track. The cateye radial alignment pattern 442 recorded on the alignment disk 220 is utilized in the radial alignment process.

Figure 11:
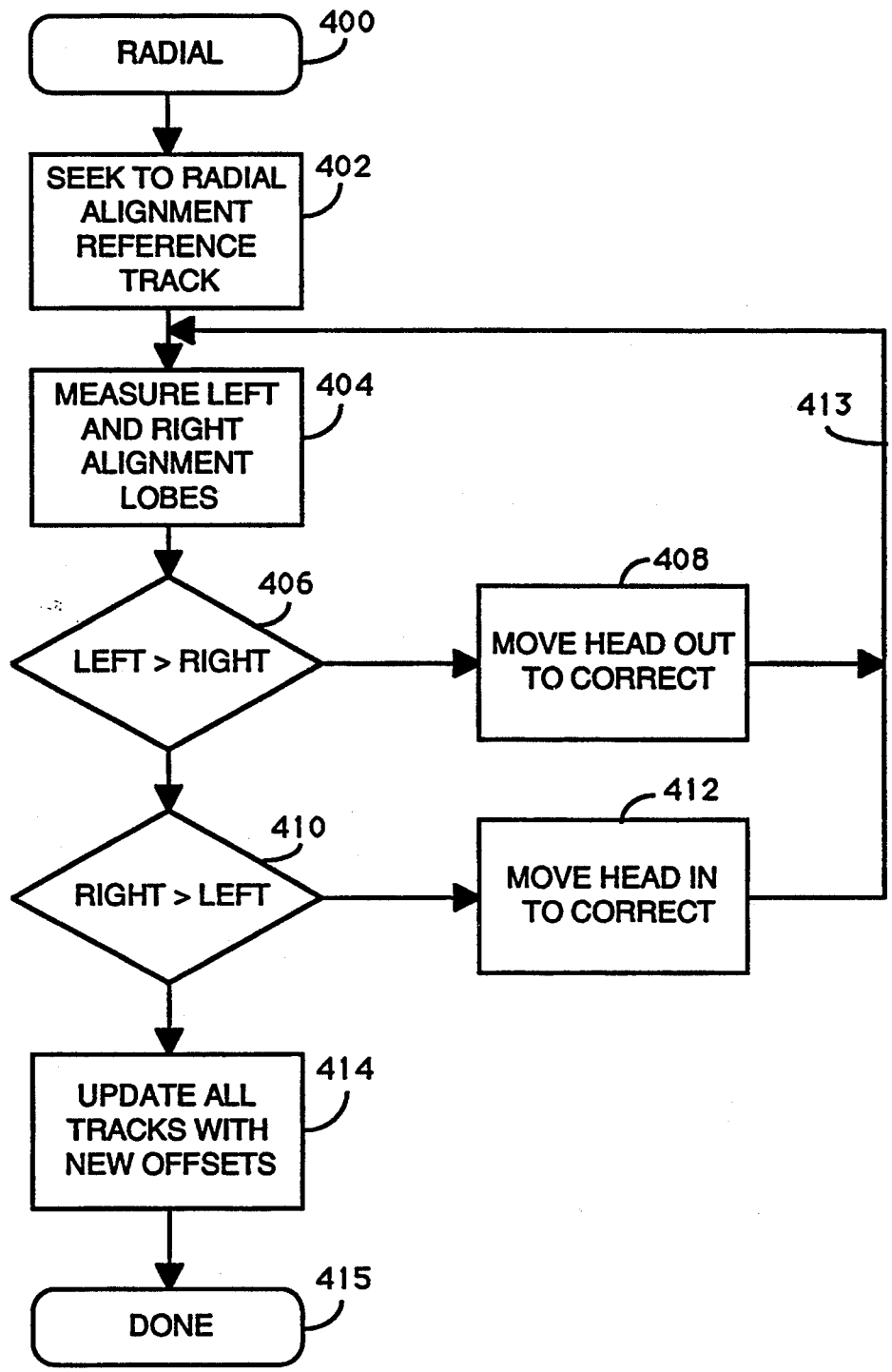
FIG. 11 is a flow chart of the radial adjustment procedure according to the present invention.

FIG. 11 is a flowchart illustrating the steps involved in the radial alignment procedure. In the radial alignment procedure, the head 22' is commanded to search for the radial alignment track 232 which contains the standard two lobes cateye pattern 442 (step 402). To get the head in the rough vicinity of the track 232, the carriage assembly 18' is moved to the general vicinity of the track zero track (track 224 in FIG. 4). The transducer 22' is then moved back and forth across track zero in microstep increments until the readback signal is maximized. Using this position as the approximate track zero location, the stepper motor then steps to the location that is supposed to contain the radial alignment track. For example, with the Dysan disk, the radial alignment track is known to be at track 16 (called track 232 in FIG. 4). A table of radial alignment track locations for different alignment disks is stored on the system control software.

Generally, this rough positioning procedure will put the transducer 22' within one track of the radial alignment track (track 232).

The shapes of the left and right lobes 443 and 444 are then measured by the envelope detect circuit 124 and the CPU 80 (step 404). Radial alignment is achieved when each of the two lobes 443 and 444 have the same shape within specified tolerances. The shape of the lobes 443 and 444 are adjusted by using the stepper control circuit 108 to move the head 22' inward (step in)

or outward (step out) in microsteps (generally 1/126 track pitch increments) until the desired shape of the radial alignment pattern is achieved. Steps 406 and 410 represent the search for a position of the head 22' that yields the desired equal lobe configuration. The loop 413 is repeated until step 404 indicates that the shapes of the lobes 443 and 444 are the same.

The number of microsteps required to achieve radial alignment is stored in the ROM memory circuit 100 as the radial offset value. The radial offset value is then automatically applied to every detent of the stepper motor 34' (step 414), thereby achieving automatic radial alignment for the head 22'.

TRACK ZERO ALIGNMENT

Figure 12:
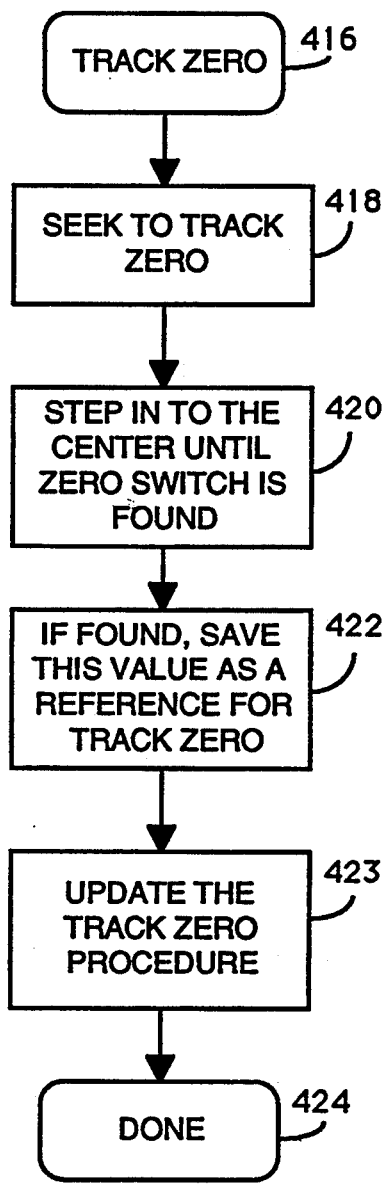
FIG. 12 is a flow chart of the track zero adjustment procedure according to the present invention.

FIG. 12 is a flowchart illustrating the steps involved in the track zero alignment procedure. Automatic track zero alignment is achieved in the present invention by commanding the head 22' to scan across side 0 of the alignment disk 220 until the track zero data track (track 224) is located (step 418). Track 224 is located by using the envelope detect circuit 124 to measure the peak envelope of the track zero signal. The track zero position is the position where peak envelope signal is maximized.

During the manufacturing process, the track zero sensor 76 and the track zero flag 78 were positioned so that the flag is always located in the slot 79 (see FIG. 4) when the transducer 22' is over track zero. Once the track zero data track 224 is located, the stepper control circuit 108 is used to microstep the carriage assembly 18' inward until the flag 78 leaves the slot 79. This phenomenon is detected when the signal from the optical detector 76 returns (step 420). The number of microsteps is stored in the nonvolatile RAM circuit 100 as the track zero reference value (step 422). Once the track zero reference value is known, an algorithm in the system control software is updated (step 423) so that when a track reference position is needed, the carriage assembly 18' automatically finds to the position where the flag 78 just leaves the slot 79. The desired track position is then located by stepping the required number of steps to the position as modified by the track zero reference value.

INDEX TO DATA ALIGNMENT

Figure 13:
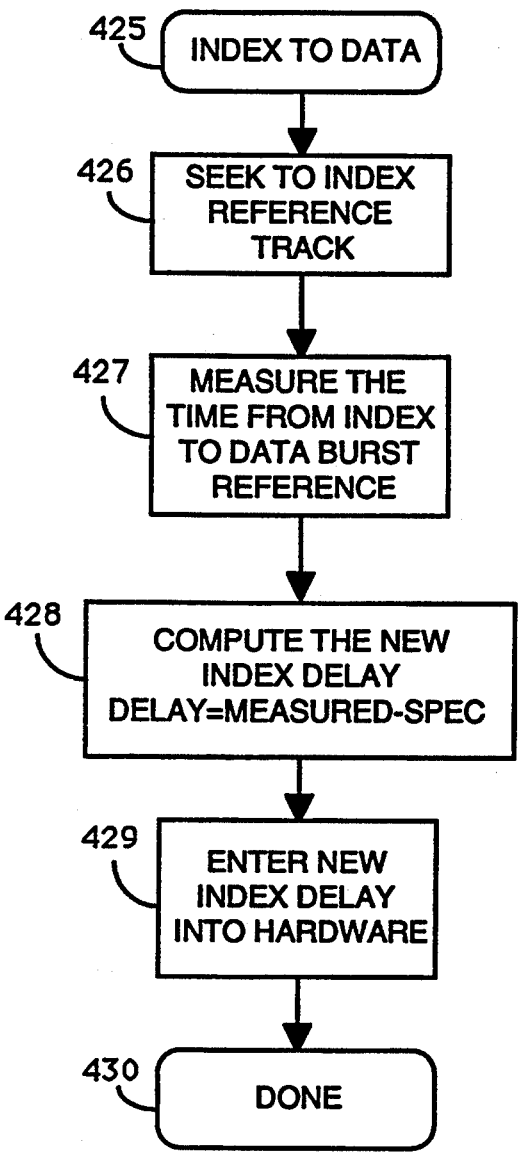
FIG. 13 is a flow chart of the index to data alignment procedure according to the present invention.

FIG. 13 is a flowchart illustrating the steps involved in the index to data alignment procedure. The index to data alignment parameter is a measure of time period that exists between the time an optical index signal is generated (when the hole 258 passes the index sensor 46') and the time the index data burst 228 is detected by the head 22'.

Automatic index to data alignment is achieved in the present invention by commanding the head 22' to move to the data track that contains the index pulse 228 (step 426). The optical index is sent through the index control circuit 140 to the CPU 80 where the time difference between optical index and the index data burst is measured (step 427). As was discussed with relation to FIG. 2, the optical pulse always occurs much earlier than is required by the specification because the sensor 46' was mounted to fire early. An index delay is calculated in the CPU 80 as the difference between the measured delay and the specification delay (step 428). The index delay is stored in the nonvolatile RAM for future use (step 429). Since this process does not require the manual adjustment of the sensor 46', it is much more accurate and less time consuming than the manual adjustment process.

The index delay is used in the following manner to achieve automatic index to data alignment. When an external device, such as a disk duplicator, requests an index to data signal from the drive 70, the drive 70 notes the optical index. The control software then delays for the stored index delay period. At the end of the index delay period, a artificial index signal is sent down the cable to the external device. The external device should then begin writing at the specified period (e.g. 100 microseconds) after receiving the artificial index.

AZIMUTH

The azimuth parameter refers to the orientation of the read/write gap in the transducer 22' relative to the centerline of a data track. For example, the orientation 240 in FIG. 4, shows a properly oriented read/write gap. The orientation 244 represents an improperly oriented read/write gap.

The disk drive 70 can report azimuthal alignment data. Referring to FIG. 14, such data is generated by measuring the amplitudes of the rectangles 437 through 440 with the envelope detector circuit 124, and comparing the relative amplitudes of the rectangles in the CPU 80, and calculating an alignment signal using the method taught by Bruce Naegel in a Brikon publication entitled, F.I.B. #31, dated Sep. 27, 1985 which utilizes a mathematical relationship shown as Equation (1) below:

$$\text{Azimuth signal loss} = 20 \log [(\sin \pi s/\lambda)(\lambda/\pi s)] \text{db} \quad (1)$$

where
$s = w \times \tan \beta$;
$w = $ track width; and
$\beta = $ Azimuth angle.

Equation (1) is attributed to Finn Jorgenson, *The Complete Handbook of Magnetic Recording*, Tab Books, p. 86 (1980). The azimuthal alignment status is then reported (displayed) on the analyzer 210.

SOURCE CODE LISTING

```
/* ADCS   ANSI Drive Control Software */ define DEBUG 1                /* software debug flag */ include <reg552.h>            /* CPU register defs */
include <regadcs.h>            /* hardware register defs */
#include <crsadcs.h>            /* cursor address defs */
#include <cmdadcs.h>            /* software command defs */
#include <erradcs.h>            /* software error defs */
```

```c
#include <defadcs.h>    /* software flag defs */
#include <stdio.h>      /* standard I/O functions */
#include <stdlib.h>     /* standard lib functions */
#include <ctype.h>      /* char type functions */
#include <string.h>     /* char string functions */
#include <math.h>       /* math lib functions */
include <absacc.h>     /* extended address functions */ struct trackinfo {
    unsigned int stepin0;       /* stepin offset side 0 */
    unsigned int stepout0;      /* stepout offset side 0 */
    unsigned int stepin1;       /* stepin offset side 1 */
    unsigned int stepout1;      /* stepout offset side 1 */
    unsigned int stepin2;       /* stepin offset SDS */
    unsigned int stepout2;      /* stepout offset SDS */
    unsigned char current0;     /* write current side 0 */
    unsigned char current1;     /* write current side 1 */
    unsigned char current2;     /* write current side SDS */
    unsigned char current3;     /* write current side SDS */
    unsigned char asymmetry0;   /* write asymmetry side 0 */
    unsigned char asymmetry1;   /* write asymmetry side 1 */
    unsigned char asymmetry2;   /* write asymmetry side SDS */
    unsigned char asymmetry3;   /* write asymmetry side SDS */
    unsigned char clip0;        /* signal clip level side 0 */
    unsigned char clip1;        /* signal clip level side 1 */
    unsigned char clip2;        /* signal clip level side SDS */
    unsigned char clip3;        /* signal clip level side SDS */
};

struct aligninfo {
    unsigned char t0hrefv;      /* track zero high ref value */
    unsigned char t0lrefv;      /* track zero low ref value */
    unsigned char t0mins;       /* track zero minimum signal */
    unsigned char t0intr;       /* track zero intr value */
    unsigned char radhrefv;     /* radial high ref value */
    unsigned char radlrefv;     /* radial low ref value */
    unsigned char radlobes;     /* radial alignment track */
    unsigned char radfilter;    /* radial alignment filter */
    unsigned char radintr;      /* radial intr value */
    unsigned char azhrefv;      /* azimuth high ref value */
    unsigned char azlrefv;      /* azimuth low ref value */
    unsigned char azimuth;      /* azimuth alignment track */
    unsigned char azfilter;     /* azimuth filter value */
    unsigned char axintr;       /* azimuth intr value */
    unsigned char idxhrefv;     /* index burst high ref value */
    unsigned char idxlrefv;     /* index burst low ref value */
    unsigned char indexb;       /* index burst test track */
    unsigned char idxfilter;    /* index burst filter value */
    unsigned char idxintr;      /* index intr value */
    unsigned char amphrefv;     /* amplitude high ref value */
    unsigned char amplrefv;     /* amplitude low ref value */
```

```c
        unsigned char amplitude;            /* amplitude test track */
        unsigned char ampfilter;            /* amplitude test filter */
        unsigned char amplength;            /* amplitude test length */
        unsigned char ampintr;              /* amplitude intr value */
};

code    char cright[] = "Copyright (C) 1990 By TRONIX PERIPHERALS INC.";
code    char patent[] = "Patent Applied for";
code    char address[] = "2000 Wyatt Drive Suite 9";
code    char phone[]  = "(408) 727-4191";
code    char version[] = "ADCS Version 0.0";

void        watchdog(),sysinit(),selftest(),driveinit(),idleloop(),nonvinit();
void        output(),dothekey(),refresh(),perror(),update(),dmaxfer();
void        fixdot(),fixvalue(),smotor(),updatedacs(),stepin(),stepout();
void        idle1ms(),idle10ms(),idle100ms(),idle1s(),trackidend();
void        ustepmotor(),ustepin(),ustepout(),plabels(),shortloop(),trackzr();
void        trackzero(),doradial(),trackaa(),trackra(),trackplay(),rerror();
void        halt(),teststack(),trackaaend(),trackraend(),trackid(),indexprd();
void        getcmddata(),putcmddata(),docmddata(),indexdata(),trackzrend();

unsigned char getadc();

/* The following locations are for volatile data values. */
data    bit tick250us,tick1ms;              /* clock tick flags */
data    bit tick10ms,tick100ms,tick1s;      /* clock tick flags */
data    bit tickindex;                      /* index tick flag */
data    bit tickindex0;                     /* index tick flag side 0 */
data    bit tickindex1;                     /* index tick flag side 1 */
data    bit sportok;                        /* serial port is active */
data    bit tready;                         /* output char ready flag */
data    bit dma;                            /* DMA connect flag */
data    bit direction;                      /* direction of step (0 = in) */
data    bit failed;                         /* selftest failed flag */
data    bit newversion;                     /* new software version flag */
data    bit lzeroswitch;                    /* last value of zero switch */
data    bit onzero;                         /* on track zero flag */
data    bit driveready;                     /* drive ready flag */
data    bit diskin;                         /* drive index is active */
data    char *tailp;                        /* output buffer tail pointer */
data    char *headp;                        /* output buffer head pointer */
data    char *endp;                         /* output buffer end pointer */
data    char itoatemp[7];                   /* local data buffer for itoa */
data    char addr[10];                      /* local cursor buffer */
data    unsigned char onems;                /* 250us counter for 1ms */
data    unsigned char c,p,s,t;              /* temp 8 bit values */
data    unsigned int i,q,r,n;               /* temp 16 bit values */
data    unsigned int a;                     /* temp 16 bit (interrupt) */
data    unsigned long l;                    /* long integer for average */
xdata   char lastkey;                       /* last serial input char */
```

```
xdata    char ring[RINGSIZE];                          /* serial output buffer */
xdata    unsigned char ixcounter;                      /* index tick counter */
xdata    unsigned char cvpntr;                         /* console value pointer */
xdata    unsigned char tenms;                          /* 1ms counter for 10ms */
xdata    unsigned char hndms;                          /* 10ms counter for 100ms */
xdata    unsigned char onesec;                         /* 10ms counter for 1sec */
xdata    unsigned char motoron;                        /* true if motor is on */
xdata    unsigned char idlec;                          /* idle loops per 1ms */
xdata    unsigned char didlec;                         /* idle loops per 1ms flag */
xdata    unsigned char maxtrack;                       /* last track position */
xdata    unsigned char byten,byone;                    /* steps for 1 and 10 tracks */
xdata    unsigned char seektrack,track,dtrack;         /* track counters and values */
xdata    unsigned char mstate,dmstate;                 /* stepper motor phase state */
xdata    unsigned char kickit;                         /* 0,none 1,kickin 2,kickout */
xdata    unsigned char lastoff,dlastoff;               /* last stepper motor offset */
xdata    unsigned char side,dside;                     /* current side counters */
xdata    unsigned char xerror;                         /* xerror flag and value */
xdata    unsigned char sendcmd,senddata;               /* ADCS -> DMA command,data */
xdata    unsigned char recvcmd,recvdata;               /* DMA -> ADCS command,data */
xdata    unsigned char dmastate;                       /* current DMA state */
xdata    unsigned char dcur0,dcur1,dcur2,dcur3;        /* last head current values */
xdata    unsigned char dsym0,dsym1,dsym2,dsym3;        /* last head asymmetry values */
xdata    unsigned char dclp0,dclp1,dclp2,dclp3;        /* last display clip values */
xdata    unsigned char keyflag;                        /* flag used with refresh */
xdata    unsigned char iop0,iop1,iop2;                 /* temp IO port values */
xdata    unsigned char didelay0,didelay1;              /* display delay side 0,1 */
xdata    unsigned char sample[SAMPLESIZE];             /* track sample data buffer */
xdata    unsigned char stack8[MAXSTACK];               /* stack for 8 bit values */
xdata    unsigned char sp8,sp16;                       /* 8,16 bit stack pointers */
xdata    unsigned int tlengthus;                       /* track length in us */
xdata    unsigned int dtlengthus;                      /* track length counter */
xdata    unsigned int idlecount;                       /* idle loops per 1ms counter */
xdata    unsigned int custep,lustep;                   /* current and last ustep */
xdata    unsigned int dstpi0,dstpi1,dstpi2;            /* last motor display values */
xdata    unsigned int dstpo0,dstpo1,dstpo2;            /* last motor display values */
xdata    unsigned int stack16[MAXSTACK];               /* stack for 16 bit values */

/* The following locations are for non-volatile data values. */ xdata    unsigned char zstate,zoffset,wtrack;          /* stepper motor zero states */
xdata    unsigned char rcent0,rcent1;                  /* radial % side 0,1 */
xdata    unsigned char tidelay,idelay0,idelay1;        /* index delay side 0,1 */
xdata    unsigned char drivetype;                      /* current drive type */
xdata    unsigned char adisktype;                      /* alignment disk type */
xdata    unsigned char errorp;                         /* xerror buffer pointer */
xdata    unsigned char debug;                          /* software debug flag */
xdata    char lastvers[20];                            /* last software version */
xdata    unsigned char errors[MAXERROR + 1];           /* error list buffer */
xdata    struct trackinfo tdac[MAXTRACK + 1];          /* track DAC data values */
xdata    struct aligninfo adac[MAXALIGN + 1];          /* alignment data values */
```

```c
main()                                  /* this is the program start */
{
    watchdog();                         /* feed the watchdog timer */
    sysinit();                          /* init the system values */
    nonvinit();                         /* init non-volatile values */
    driveinit();                        /* init the drive values */
    EA = 1;                             /* all interrupts enabled */
    selftest();                         /* execute the drive selftest */
    idleloop();                         /* begin the idle loop */
}

/*****************************************************************
   This function will init all system hardware and software registers.

Variables used: none
   *****************************************************************
*/
void sysinit()                          /* hardware/software regs */
{
    /*   Init all software registers */ tick250us = 0;                      /* clear the 250us tick flag */
    tick10ms = 0;                       /* clear the 10ms tick flag */
    tick100ms = 0;                      /* clear the 100ms tick flag */
    tick1s = 0;                         /* clear the 1s tick flag */
    tickindex = 0;                      /* clear the index tick flag */
    tickindex0 = 0;                     /* clear the index tick 0 */
    tickindex1 = 0;                     /* clear the index tick 1 */
    motoron = 0;                        /* clear the motor on flag */
    ixcounter = 0;                      /* index pulse counter */
    onzero = 0;                         /* clear the on zero flag */
    driveready = 0;                     /* drive is not ready yet */
    diskin = 0;                         /* clear the diskin flag */
    kickit = 0;                         /* clear the kick motor flag */
    sportok = 0;                        /* clear the serial port flag */
    failed = 0;                         /* clear selftest result flag */
    newversion = 0;                     /* clear the new version flag */
    lzeroswitch = 0;                    /* last value of zero switch */
    tready = 1;                         /* set the trans ready flag */
    dma = 1;                            /* assume DMA is connected */
    direction = 0;                      /* clear head direction flag */
    onems = 4;                          /* set 250us counter for 1ms */
    tenms = 10;                         /* set 1ms counter for 10ms */
    hndms = 10;                         /* set 10ms counter for 100ms */
    onesec = 100;                       /* set 10ms counter for 1s */
    idlecount = 0;                      /* clear idle loop counter */
    idlec = 0;                          /* init loops per 1ms */
    tlengthus = 0;                      /* clear track length in us */
    seektrack = 0;                      /* clear seek to track value */
    track = 0;                          /* clear track counter */
    side = 2;                           /* init side mode to SDS */
```

```c
        mstate = 7;                     /* init the first motor state */
        lastoff = 0x7f;                 /* last stepper motor offset */
        lastkey = 0;                    /* clear the last key char */
        keyflag = 0;                    /* clear the key flag value */
        xerror = 0;                     /* xerror flag and value */
        sendcmd = 0;                    /* clear the send command */
        senddata = 0;                   /* clear the send data */
        recvcmd = 0;                    /* clear the recv command */
        recvdata = 0;                   /* clear the revc data */
        dmastate = 0;                   /* clear the DMA state */
        iop0 = 0;                       /* clear the temp IO values */
        iop1 = 0;                       /* clear the temp IO values */
        cvpntr = 0;                     /* clear console pointer */
        custep = 0;                     /* clear the current ustep */
        lustep = 0;                     /* clear the last ustep */
        sp8 = 0;                        /* clear 8 bit stack pointer */
        sp16 = 0;                       /* clear 16 bit stack pointer */
        headp = &ring[0];               /* clear buffer pointer */
        tailp = headp;                  /* clear output tail pointer */
        endp = &ring[RINGSIZE - MAXLINE];   /* clear output end pointer */

/*  Init all hardware registers */ iop0 = 0x80;                    /* clear IO port 0 register */
        iop1 = 0;                       /* clear IO port 1 register */
        iop2 = 0;                       /* clear IO port 2 register */
        IOP0 = iop0;                    /* set P0 bits in hardware */
        IOP1 = iop1;                    /* set P1 bits in hardware */
        IOP2 = iop2;                    /* set P2 bits in hardware */
        CMSR5 = 0;                      /* clear index side 0 */
        CMSR4 = 1;                      /* clear index side 1 */
        TH0 = 0x05;                     /* 250us delay reload value */
        TH1 = 0xf3;                     /* 2400 baud reload value */
        S0CON = 0x52;                   /* mode = 1, REN, TI */
        TMOD = 0x22;                    /* timer 0 and 1 auto-reload */
        TCON = 0x75;                    /* timer / counter control */
        TM2CON = 0xa8;                  /* timer 2 control setup bits */
        CTCON = 0xa9;                   /* timer 2 capture setup bits */
        ADCON = 0x00;                   /* init the ADC port */
        RTE = 0x50;                     /* enable cm2 and cm1 */
        STE = 0x20;                     /* enable cm0 */
        IP0 = 0x00;                     /* interrupts same priority */
        IP1 = 0x00;                     /* interrupts same priority */
        IEN0 = 0x17;                    /* serial, ext 0,1, timer 0, */
        IEN1 = 0x01;                    /* index */
}

/***********************************************************************
```

This function will execute the drive init functions.

Variables used: none

```
*********************************************************/
void driveinit()
{
    switch (drivetype) {           /* init the drive values */
    case D360K300:                 /* 5.25' 360K 300 RPM */
    case D360K600:                 /* 5.25' 360K 600 RPM */
    case D360K900:                 /* 5.25' 360K 900 RPM */
    case D360K1200:                /* 5.25' 360K 1200 RPM */
        maxtrack = 82;             /* init the last track value */
        byone = 2;                 /* number of steps one track */
        byten = 20;                /* number of steps ten tracks */
        break;
    case D1200K360:                /* 5.25' 1.2M 360 RPM */
    case D1200K720:                /* 5.25' 1.2M 720 RPM */
    case D1200K900:                /* 5.25' 1.2M 900 RPM */
    case D1200K1200:               /* 5.25' 1.2M 1200 RPM */
        maxtrack = 82;             /* init the last track value */
        byone = 1;                 /* number of steps one track */
        byten = 10;                /* number of steps ten tracks */
        break;
    case D720K300:                 /* 720K 300 RPM */
    case D720K600:                 /* 720K 600 RPM */
    case D720K900:                 /* 720K 900 RPM */
    case D720K1200:                /* 720K 1200 RPM */
    case D1400K300:                /* 1.44M 300 RPM */
    case D1400K600:                /* 1.44M 600 RPM */
    case D1400K900:                /* 1.44M 900 RPM */
    case D1400K1200:               /* 1.44M 1200 RPM */
        maxtrack = 82;             /* init the last track value */
        byone = 1;                 /* number of steps one track */
        byten = 10;                /* number of steps ten tracks */
        break;
    default:
        xerror = BADTYPE;          /* bad drive type */
        perror(EERROR);            /* enter the error code */
        break;
    }
}

/*********************************************************
```

This function will test for a new software version number, and if found will init all non-volatile memory values.

Variables used: i

```
*********************************************************
/
```

```c
void nonvinit()
{
    if (!strcmp(lastvers,version)) return;      /* same software version */
    stack16[++sp16] = i;                         /* save i */
    strcpy(lastvers,version);                    /* update the saved version */
    newversion = 1;                              /* new software version */

/* dysan 208-40 alignment setup values */
    adac[DYSAN20840].t0hrefv = 255;              /* track zero high ref value */
    adac[DYSAN20840].t0lrefv = 100;              /* track zero low ref value */
    adac[DYSAN20840].t0mins = 130;               /* track zero minimum signal */
    adac[DYSAN20840].t0intr = 0xff;              /* track zero intr value */
    adac[DYSAN20840].radhrefv = 255;             /* radial high ref value */
    adac[DYSAN20840].radlrefv = 100;             /* radial low ref value */
    adac[DYSAN20840].radlobes = 16;              /* radial alignment track */
    adac[DYSAN20840].radfilter = 100;            /* radial alignment filter */
    adac[DYSAN20840].radintr = 0xff;             /* radial intr value */
    adac[DYSAN20840].azhrefv = 255;              /* azimuth high ref value */
    adac[DYSAN20840].azlrefv = 100;              /* azimuth low ref value */
    adac[DYSAN20840].azimuth = 16;               /* azimuth alignment track */
    adac[DYSAN20840].azfilter = 0;               /* azimuth filter value */
    adac[DYSAN20840].axintr = 0xff;              /* azimuth intr value */
    adac[DYSAN20840].idxhrefv = 255;             /* index burst high ref value */
    adac[DYSAN20840].idxlrefv = 100;             /* index burst low ref value */
    adac[DYSAN20840].indexb = 1;                 /* index burst test track */
    adac[DYSAN20840].idxfilter = 100;            /* index burst filter value */
    adac[DYSAN20840].idxintr = 0xff;             /* index intr value */
    adac[DYSAN20840].amphrefv = 0;               /* amplitude high ref value */
    adac[DYSAN20840].amplrefv = 0;               /* amplitude low ref value */
    adac[DYSAN20840].amplitude = 39;             /* amplitude test track */
    adac[DYSAN20840].ampfilter = 0;              /* amplitude test filter */
    adac[DYSAN20840].amplength = 200;            /* amplitude test length */
    adac[DYSAN20840].ampintr = 0xff;             /* amplitude intr value */

/* setup the default track offsets */
    tdac[0].stepin0 = ONESTEP * 2;               /* stepper DAC offset side 0 */
    tdac[0].stepout0 = ONESTEP * 2;              /* stepper DAC offset side 0 */
    tdac[0].stepin1 = ONESTEP * 2;               /* stepper DAC offset side 1 */
    tdac[0].stepout1 = ONESTEP * 2;              /* stepper DAC offset side 1 */
    tdac[0].stepin2 = ONESTEP * 2;               /* stepper DAC offset SDS */
    tdac[0].stepout2 = ONESTEP * 2;              /* stepper DAC offset SDS */
    tdac[0].current0 = 0x7f;                     /* head current side 0 */
    tdac[0].current1 = 0x7f;                     /* head current side 1 */
    tdac[0].current2 = 0x7f;                     /* head current side SDS */
    tdac[0].current3 = 0x7f;                     /* head current side SDS */
    tdac[0].asymmetry0 = 0x7f;                   /* head asymmetry side 0 */
    tdac[0].asymmetry1 = 0x7f;                   /* head asymmetry side 1 */
    tdac[0].asymmetry2 = 0x7f;                   /* head asymmetry side SDS */
    tdac[0].asymmetry3 = 0x7f;                   /* head asymmetry side SDS */
    tdac[0].clip0 = 0x7f;                        /* signal clip level side 0 */
    tdac[0].clip1 = 0x7f;                        /* signal clip level side 1 */
```

```c
        tdac[0].clip2 = 0x7f;                    /* signal clip level side SDS */
        tdac[0].clip3 = 0x7f;                    /* signal clip level side SDS */
        for (i = 1 ; i <= MAXTRACK ; i++) {      /* copy to other tracks */
            tdac[i] = tdac[i - 1];               /* copy all values */
            tdac[i].stepin0 += ONESTEP;          /* stepper DAC offset side 0 */
            tdac[i].stepout0 += ONESTEP;         /* stepper DAC offset side 0 */
            tdac[i].stepin1 += ONESTEP;          /* stepper DAC offset side 1 */
            tdac[i].stepout1 += ONESTEP;         /* stepper DAC offset side 1 */
            tdac[i].stepin2 += ONESTEP;          /* stepper DAC offset SDS */
            tdac[i].stepout2 += ONESTEP;         /* stepper DAC offset SDS */
        }
        switch (drivetype) {                     /* init the drive values */
        case D360K300:                           /* 5.25' 360K 300 RPM */
            tidelay = 200;                       /* default index to data */
            break;
        case D360K600:                           /* 5.25' 360K 600 RPM */
            tidelay = 100;                       /* default index to data */
            break;
        case D360K900:                           /* 5.25' 360K 900 RPM */
            tidelay = 75;                        /* default index to data */
            break;
        case D360K1200:                          /* 5.25' 360K 1200 RPM */
            tidelay = 50;                        /* default index to data */
            break;
        case D1200K360:                          /* 5.25' 1.2M 360 RPM */
            tidelay = 200;                       /* default index to data */
            break;
        case D1200K720:                          /* 5.25' 1.2M 720 RPM */
            tidelay = 100;                       /* default index to data */
            break;
        case D1200K900:                          /* 5.25' 1.2M 900 RPM */
            tidelay = 75;                        /* default index to data */
            break;
        case D1200K1200:                         /* 5.25' 1.2M 1200 RPM */
            tidelay = 50;                        /* default index to data */
            break;
        case D720K300:                           /* 720K 300 RPM */
            tidelay = 200;                       /* default index to data */
            break;
        case D720K600:                           /* 720K 600 RPM */
            tidelay = 100;                       /* default index to data */
            break;
        case D720K900:                           /* 720K 900 RPM */
            tidelay = 75;                        /* default index to data */
            break;
        case D720K1200:                          /* 720K 1200 RPM */
            tidelay = 50;                        /* default index to data */
            break;
        case D1400K300:                          /* 1.44M 300 RPM */
            tidelay = 200;                       /* default index to data */
            break;
```

```c
        case D1400K600:                 /* 1.44M 600 RPM */
            tidelay = 100;              /* default index to data */
            break;
        case D1400K900:                 /* 1.44M 900 RPM */
            tidelay = 75;               /* default index to data */
            break;
        case D1400K1200:                /* 1.44M 1200 RPM */
            tidelay = 50;               /* default index to data */
            break;
        default:                        /* unknown drive type */
            tidelay = 100;              /* default index to data */
            break;
    }
    errorp = 0;                         /* error buffer pointer */
    idelay0 = 1;                        /* clear index dealy side 0 */
    idelay1 = 1;                        /* clear index dealy side 1 */
    zstate = 7;                         /* init the track zero state */
    zoffset = 0x7f;                     /* zero stepper motor offset */
    wtrack = 255;                       /* init the zero switch track */
    rcent0 = 0;                         /* radial % side 0 */
    rcent1 = 0;                         /* radial % side 1 */
    drivetype = D360K600;               /* default drive type */
    adisktype = DYSAN20840;             /* dysan 208-40 alignment */
    debug = DEBUG;                      /* init software debug flag */
    i = stack16[sp16--];                /* restore i */
}

/*****************************************************************

This function will execute the drive selftest functions.

Variables used: i,p,c,s,t
*****************************************************************
/
void selftest()
{
    stack8[++sp8] = c;                  /* save c */
    stack8[++sp8] = p;                  /* save p */
    stack8[++sp8] = s;                  /* save s */
    stack8[++sp8] = t;                  /* save t */
    stack16[++sp16] = i;                /* save i */
    plabels();                          /* print the bit labels */
    output("[3;1H","Begin selftest software...");
    output("[5;1H","Memory test...");
    c = 0;                              /* clear the test fail flag */
    for (i = 0 ; i < SAMPLESIZE ; i++) {    /* fill the full buffer */
        sample[i] = (char)i;            /* memory = address */
    }
    for (i = 0 ; i < SAMPLESIZE ; i++) {    /* test the full buffer */
        if (sample[i] != (char)i) {     /* test the memory value */
            failed = 1;                 /* set selftest failed flag */
```

```c
            xerror = MEMORY;              /* set error code */
            perror(EERROR);               /* enter the error code */
            c = 1;                        /* set the test fail flag */
            break;                        /* stop the memory test */
        }
    }
    if (c) output("[5;30H","Memory test failed.");
    else output("[5;30H","Memory test passed.");

output("[6;1H","DAC/ADC test...");
    c = 0;                                /* clear the test fail flag */
    CLP0 = 0x7f;                          /* set the clip level side 0 */
    t = getadc(0xff,0x00,ADCLIP0);        /* read the side 0 clip */
    s = getadc(0x7f,0x00,ADCLIP0);        /* read the side 0 clip */
    if (s == t) {                         /* test for pass /fail */
        c = 1;                            /* set selftest failed flag */
        xerror = HIVREF;                  /* set error code */
        perror(EERROR);                   /* enter the error code */
    }
    s = getadc(0xff,0x7f,ADCLIP0);        /* read the side 0 clip */
    if (s == t) {                         /* test for pass /fail */
        c = 1;                            /* set selftest failed flag */
        xerror = LOVREF;                  /* set error code */
        perror(EERROR);                   /* enter the error code */
    }
    CLP0 = 0x00;                          /* set the clip level side 0 */
    s = getadc(0xff,0x00,ADCLIP0);        /* read the side 0 clip */
    if (s == t) {                         /* test for pass /fail */
        c = 1;                            /* set selftest failed flag */
        xerror = CLIPT0;                  /* set error code */
        perror(EERROR);                   /* enter the error code */
    }
    CLP1 = 0x7f;                          /* set the clip level side 1 */
    t = getadc(0xff,0x00,ADCLIP1);        /* read the side 0 clip */
    CLP1 = 0x00;                          /* set the clip level side 1 */
    s = getadc(0xff,0x00,ADCLIP1);        /* read the side 0 clip */
    if (s == t) {                         /* test for pass /fail */
        c = 1;                            /* set selftest failed flag */
        xerror = CLIPT1;                  /* set error code */
        perror(EERROR);                   /* enter the error code */
    }
    ASM0 = 0x7f;                          /* set the symm level side 0 */
    t = getadc(0xff,0x00,ADCSYM0);        /* read the side 0 asymmetry */
    ASM0 = 0x00;                          /* set the symm level side 0 */
    s = getadc(0xff,0x00,ADCSYM0);        /* read the side 0 asymmetry */
    if (s == t) {                         /* test for pass /fail */
        c = 1;                            /* set selftest failed flag */
        xerror = SYMMT0;                  /* set error code */
        perror(EERROR);                   /* enter the error code */
    }
    ASM1 = 0x7f;                          /* set the symm level side 1 */
```

```c
t = getadc(0xff,0x00,ADCSYM1);      /* read the side 1 asymmetry */
ASM1 = 0x00;                        /* set the symm level side 1 */
s = getadc(0xff,0x00,ADCSYM1);      /* read the side 1 asymmetry */
if (s == t) {                       /* test for pass /fail */
    c = 1;                          /* set selftest failed flag */
    xerror = SYMMT1;                /* set error code */
    perror(EERROR);                 /* enter the error code */
}
DWC0 = 0x7f;                        /* set the current side 0 */
t = getadc(0xff,0x00,ADCWC0);       /* read the side 0 asymmetry */
DWC0 = 0x00;                        /* set the symm level side 0 */
s = getadc(0xff,0x00,ADCWC0);       /* read the side 0 asymmetry */
if (s == t) {                       /* test for pass /fail */
    c = 1;                          /* set selftest failed flag */
    xerror = WCURR0;                /* set error code */
    perror(EERROR);                 /* enter the error code */
}
DWC1 = 0x7f;                        /* set the current side 1 */
t = getadc(0xff,0x00,ADCWC1);       /* read the side 1 asymmetry */
DWC1 = 0x00;                        /* set the symm level side 1 */
s = getadc(0xff,0x00,ADCWC1);       /* read the side 1 asymmetry */
if (s == t) {                       /* test for pass /fail */
    c = 1;                          /* set selftest failed flag */
    xerror = WCURR1;                /* set error code */
    perror(EERROR);                 /* enter the error code */
}
if (c) {                            /* did ADC/DAC test fail */
    output("[6;30H","DAC/ADC test failed.");
    failed = 1;                     /* set selftest failed flag */
}
  else output("[6;30H","DAC/ADC test passed.");

output("[7;1H","Stepper motor test...");
c = 0;                              /* clear the test fail flag */
iop0 |= CS0M;                       /* turn on stepper motor */
IOP0 = iop0;                        /* output the stepper bit */
while (IOP1 & T0SW) {               /* is the switch on ? */
    seektrack++;                    /* move out until no switch */
    if (seektrack > 20) {           /* test failed! */
        xerror = TOSON;             /* track zero failed */
        perror(EERROR);             /* log the error message */
        c = 1;                      /* stepper motor failed */
        break;                      /* end of motor testing */
    }
    smotor();                       /* move the stepper motor */
}
if (!c) {                           /* motor test good so far */
    seektrack += 9;                 /* seek in ten more tracks */
    smotor();                       /* move the motor */
    seektrack = 255;                /* home the drive head */
    smotor();                       /* move the motor */
```

```c
        }
        if (!(IOP1 & T0SW)) c = 1;              /* is the switch on ? */
        if (c) {                                /* did ADC/DAC test fail */
            output("[7;30H","Stepper motor test failed.");
            failed = 1;                         /* set selftest failed flag */
        }
        else output("[7;30H","Stepper motor test passed.");
            if (failed) output("[24;1H","Selftest Failed!");
            else output("[24;1H","Selftest passed.");

/* Init some special values if in software debug mode */ if (debug) {
            lastkey = ' ';                      /* set the key to refresh */
            if (failed) {                       /* if self test failed */
                output("[24;50H","Press any key to continue.");
                lastkey = 0;                    /* clear the lastkey flag */
                while (!lastkey) shortloop();   /* wait for console */
                if (lastkey == ' ') failed = 0; /* clear the failed flag */
                else lastkey = ' ';             /* no command waiting */
            }
        }
        i = stack16[++sp16];                    /* restore i */
        t = stack8[++sp8];                      /* restore t */
        s = stack8[++sp8];                      /* restore s */
        p = stack8[++sp8];                      /* restore p */
        c = stack8[++sp8];                      /* restore c */
}

/****************************************************************

This function will setup and read the ADC value for the selected pin.

Variables used: none
****************************************************************
/
unsigned char getadc(vrh,vrl,pin)
unsigned char vrh,vrl,pin;
{
    ACC = TRIG;                         /* trigger the oscilloscope */
    if (ADCON & 0x18) {                 /* error, ADC is busy? */
        xerror = ADCBUSY;               /* set busy error code */
        perror(EERROR);                 /* enter the error code */
        return(0);                      /* no value to report */
    }
    VRHI = vrh;                         /* set the ADC ref high value */
    VRLO = vrl;                         /* set the ADC ref low value */
    ADCON = pin;                        /* select adc input pin */
    ADCON |= 0x08;                      /* start the ADC conversion */
    while (!(ADCON & 0x10));            /* wait for the conversion */
```

```
        ADCON &= ~0x10;                    /* clear the interrupt flag */
        return(ADCH);                      /* return the adc value */
    }

/*****************************************************************

This function will service the idle loop tasks.

Variables used: none
*****************************************************************
/
    void idleloop()
    {
        for (;;) {                              /* loop until CPU reset */
            idlecount++;                        /* update the idle count */
            watchdog();                         /* feed the watchdog timer */
            teststack();                        /* test for stack overflow */
            if (lastkey) dothekey();            /* process the last key */
            if (tick1ms) idle1ms();             /* 1 ms idle loop functions */
            if (tick10ms) idle10ms();           /* 10 ms idle loop functions */
            if (tick100ms) idle100ms();         /* 100 ms idle loop functions */
            if (tick1s) idle1s();               /* 1 sec idle loop functions */
            if (seektrack != track) smotor();   /* move the stepper motor */
        }
    }

/*****************************************************************

This function will test for stack pointer overflows.

Variables used: none
*****************************************************************
/
    void teststack()
    {
        if (sp8 > MAXSTACK) {
            xerror = S8FAIL;                /* 8 bit stack overflow */
            perror(EERROR);                 /* print the error message */
            halt();                         /* this is a real problem */
        }
        if (sp16 > MAXSTACK) {
            xerror = S16FAIL;               /* 16 bit stack overflow */
            perror(EERROR);                 /* print the error message */
            halt();                         /* this is a real problem */
        }
    }

/*****************************************************************
```

This function will service the short idle loop functions.

Variables used: none
```
*******************************************************************
/
void shortloop()
{
    watchdog();                    /* feed the watchdog timer */
    if (tick1ms) idle1ms();        /* 1 ms idle loop functions */
    if (tick10ms) idle10ms();      /* 10 ms idle loop functions */
}
```

```
/*******************************************************************
```

This function will test for a key press and if found will process the command indicated by the key value.

```
<~>     Debug switch toggle on each press.
<!>     Turn on console refresh every second.
< >     Update the console once each press.
<@>     Stop the console auto update.
<TAB>   Move the console pointer to the next value.
<+>     Add ten to the value.
<=>     Add one to the value.
<->     Subtract one from the value.
<_>     Subtract ten from the value.
<a>     All alignment tests. (radial,index)
<c>     Clear the value.
<d>     Index data burst alignment.
<f>     Stepper full steps in and out.
<i>     Index time test.
<l>     Load the other tracks with this value.
<r>     Radial Alignment function.
<u>     Stepper usteps in and out.
```

Variables used: none
```
*******************************************************************
/
void dothekey()                    /* process the last key */
{
    motoron = MOTORON;             /* turn on the drive motor */
    output(LCMD,"");               /* set the display flag */
    switch (lastkey) {
    case '~':
        if (debug) debug = 0;      /* switch debug off */
        else debug = 1;            /* switch debug on */
        break;
    case '!':                      /* start refresh command */
        sportok = 1;               /* set serial port OK flag */
        if (!keyflag) {
```

```
            refresh();              /* refresh the console */
            keyflag = 1;            /* set flag for next time */
        }
        break;
    case ' ':                       /* single refresh command */
        if (!keyflag) {
            refresh();              /* refresh the console */
            keyflag = 1;            /* set flag for next time */
        }
        update();                   /* updata console display */
        break;
    case '@':                       /* stop display command */
        plabels();                  /* print the bit labels */
        keyflag = 0;                /* clear the key flag */
        sportok = 0;                /* clear serial port OK flag */
        break;
    case '\t':                      /* move to next console pntr */
        fixdot();                   /* update console pointer dot */
        break;
    case '+':                       /* add 10 to the value */
    case '=':                       /* add 1 to the value */
    case '-':                       /* subtract 1 from the value */
    case '_':                       /* subtract 10 from the value */
    case 'c':                       /* clear the value */
    case 'l':                       /* load all other tracks */
        fixvalue();                 /* change indicated value */
        if (!keyflag) {
            refresh();              /* refresh the console */
            keyflag = 1;            /* set flag for next time */
        }
        break;
    case 'i':                       /* index time test */
        if (!diskin) output("",""); /* no disk in drive */
        else indexprd();            /* find the index time */
        break;
    case 'f':                       /* stepper test (full step) */
        lastkey = 0;                /* clear the key flag */
        while (!lastkey) {          /* wait for end of test */
            seektrack = maxtrack;   /* seek last track */
            smotor();               /* move the stepper motor */
            seektrack = 0;          /* seek track zero */
            smotor();               /* move the stepper motor */
        }
        break;
    case 'u':                       /* stepper test (full step) */
        lastkey = 0;                /* clear the key flag */
        while (!lastkey) {          /* wait for end of test */
            custep = maxtrack * ONESTEP;    /* ustep to last track */
            ustepmotor();           /* move the stepper motor */
            custep = 0;             /* ustep to track zero */
            ustepmotor();           /* move the stepper motor */
```

```c
        }
        break;
    case 't':                               /* stepper test */
        lastkey = 0;                        /* clear the key flag */
        while (!lastkey) {                  /* wait for end of test */
            ACC = TRIG;                     /* trigger the oscilloscope */
            MD00 = 0x70;                    /* stepper motor test */
            MD00 = 0xf0;                    /* clear the write strobe */
        }
        break;
    case 'a':                               /* all (radial,index) */
        if (!diskin) {
            output("","");                  /* no disk in drive */
            break;                          /* test must have index */
        }
        indexprd();                         /* find the index time */
        doradial();                         /* go do radial alignment */
        if (!failed) indexdata();           /* go do index alignment */
        break;
    case 'd':                               /* index to data burst test */
        if ((wtrack != 255) && (diskin)) indexdata();
        else output("","");                 /* we are not aligned yet */
        break;
    case 'r':                               /* radial alignment */
        if (diskin) doradial();             /* go do the process */
        else output("","");                 /* no disk in drive */
        break;
    default:                                /* undefined command */
        output("","");                      /* beep the console */
        break;
    }
    lastkey = 0;                            /* clear the key flag */
}

/*****************************************************************

This function will measure the index to index time in us / 4.

Variables used: none
*****************************************************************
/
void indexprd()                             /* find the index time */
{
    tickindex0 = 0;                         /* clear the index flag */
    while (!tickindex0) shortloop();        /* wait for index */
    TM2CON &= ~T2ER;                        /* disable the T2 clear */
    TM2IR &= ~CTI0;                         /* clear the interrupt flag */
    while (!(TM2IR & CTI0)) shortloop();    /* wait for index */
    tlengthus = CTH0;                       /* index us high byte */
    tlengthus <<= 8;                        /* move to the high byte */
```

```c
        tlengthus |= CTL0;                      /* index us low byte */
        TM2CON |= T2ER;                         /* enable the T2 clear */
}

/******************************************************************

This function will clear or write the console pointer dot value.

Variables used: none
   ******************************************************************
/
void fixdot()                                   /* fix the pointer dot */
{
    if (cvpntr > 21) cvpntr = 0;                /* reset the dot pointer */
    switch (++cvpntr) {                         /* move pointer to next value */
    case 1:                                     /* current track */
        output(LCLIP3F," ");
        output(LTRACKF,"*");
        break;
    case 2:                                     /* current side select */
        output(LTRACKF," ");
        output(LSIDEF,"*");
        break;
    case 3:                                     /* index delay side 0 */
        output(LSIDEF," ");
        output(LIDLY0F,"*");
        break;
    case 4:                                     /* index delay side 1 */
        output(LIDLY0F," ");
        output(LIDLY1F,"*");
        break;
    case 5:                                     /* side 0 step in */
        output(LIDLY1F," ");
        output(LISTP0F,"*");
        break;
    case 6:                                     /* side 1 step in */
        output(LISTP0F," ");
        output(LISTP1F,"*");
        break;
    case 7:                                     /* SDS 2 step in */
        output(LISTP1F," ");
        output(LISTP2F,"*");
        break;
    case 8:                                     /* side 0 step out */
        output(LISTP2F," ");
        output(LOSTP0F,"*");
        break;
    case 9:                                     /* side 1 step out */
        output(LOSTP0F," ");
        output(LOSTP1F,"*");
```

```c
        break;
    case 10:                          /* SDS 2 step out */
        output(LOSTP1F," ");
        output(LOSTP2F,"*");
        break;
    case 11:                          /* side 0 write current */
        output(LOSTP2F," ");
        output(LCRNT0F,"*");
        break;
    case 12:                          /* side 1 write current */
        output(LCRNT0F," ");
        output(LCRNT1F,"*");
        break;
    case 13:                          /* SDS 0 write current */
        output(LCRNT1F," ");
        output(LCRNT2F,"*");
        break;
    case 14:                          /* SDS 1 write current */
        output(LCRNT2F," ");
        output(LCRNT3F,"*");
        break;
    case 15:                          /* side 0 asymmetry */
        output(LCRNT3F," ");
        output(LSYMM0F,"*");
        break;
    case 16:                          /* side 1 asymmetry */
        output(LSYMM0F," ");
        output(LSYMM1F,"*");
        break;
    case 17:                          /* SDS 0 asymmetry */
        output(LSYMM1F," ");
        output(LSYMM2F,"*");
        break;
    case 18:                          /* SDS 1 asymmetry */
        output(LSYMM2F," ");
        output(LSYMM3F,"*");
        break;
    case 19:                          /* side 0 clip level */
        output(LSYMM3F," ");
        output(LCLIP0F,"*");
        break;
    case 20:                          /* side 1 clip level */
        output(LCLIP0F," ");
        output(LCLIP1F,"*");
        break;
    case 21:                          /* SDS 0 clip level */
        output(LCLIP1F," ");
        output(LCLIP2F,"*");
        break;
    case 22:                          /* SDS 1 clip level */
        output(LCLIP2F," ");
```

```
            output(LCLIP3F,"*");
         break;
      default:                              /* something is in error */
         cvpntr = 0;
         break;
   }
}
/************************************************************

This function will change the console value pointed to by <cvpntr>.

Variables used: i,q
************************************************************
/
void fixvalue()                          /* fix the pointer dot */
{
   stack16[++sp16] = i;                  /* save i */
   stack16[++sp16] = q;                  /* save q */
   switch (cvpntr) {                     /* clear current set next */
   case 0:                               /* null pointer value */
   case 1:                               /* current track value */
      switch (lastkey) {                 /* change current track */
      case '+':                          /* add 10 to track value */
         if (seektrack + byten < maxtrack) { /* test for room to step in */
            seektrack += byten;          /* track = track + 10 */
         }
         else output("","");             /* beep the console */
         break;
      case '=':                          /* on the same key as + */
         if (seektrack < maxtrack) {     /* test for room to step in */
            seektrack += byone;          /* track = track + 1 */
         }
         else output("","");             /* beep the console */
         break;
      case '_':
         if (seektrack - byten > 0) {    /* test for room to step out */
            seektrack -= byten;          /* track = track - 10 */
         }
         else output("","");             /* beep the console */
         break;
      case '-':
         if (seektrack > 0) {            /* test for room to step out */
            seektrack -= byone;          /* track = track - 1 */
         }
         else output("","");             /* beep the console */
         break;
      case 'c':                          /* clear track (restore) */
         seektrack = 255;                /* set the motor home flag */
         break;
      }
      break;
```

```c
case 2:                                 /* current side select */
    switch (lastkey) {                  /* change current side */
    case '=':                           /* on the same key as + */
        if (side < 2) side++;           /* side = side + 1 */
        else output("","");             /* beep the console */
        break;
    case '-':
        if (side > 0) side--;           /* side = side - 1 */
        else output("","");             /* beep the console */
        break;
    case 'c':                           /* reset of clear value */
        side = 2;                       /* reset to SDS mode */
        break;
    }
    break;
case 3:                                 /* change index delay */
    switch (lastkey) {
    case '=':                           /* on the same key as + */
        if (idelay0 < 255) idelay0++;   /* delay = delay + 1 */
        else output("","");             /* beep the console */
        break;
    case '-':
        if (idelay0 > 1) idelay0--;     /* delay = delay - 1 */
        else output("","");             /* beep the console */
        break;
    case 'c':                           /* reset the delay */
        idelay0 = 1;                    /* reset to no delay */
        break;
    }
    break;
case 4:                                 /* change index delay */
    switch (lastkey) {
    case '=':                           /* on the same key as + */
        if (idelay1 < 255) idelay1++;   /* delay = delay + 1 */
        else output("","");             /* beep the console */
        break;
    case '-':
        if (idelay1 > 1) idelay1--;     /* delay = delay - 1 */
        else output("","");             /* beep the console */
        break;
    case 'c':                           /* reset the delay */
        idelay1 = 1;                    /* reset to no delay */
        break;
    }
    break;
case 5:                                 /* step in offset side 0 */
    switch (lastkey) {                  /* change current side */
    case '+':
        tdac[track].stepin0 += 10;      /* INC stepper DAC offset */
        break;
    case '=':                           /* on the same key as + */
```

```
            tdac[track].stepin0++;              /* INC stepper DAC offset */
        break;
    case '_':
            tdac[track].stepin0 -= 10;          /* DEC stepper DAC offset */
        break;
    case '-':
            tdac[track].stepin0--;              /* DEC stepper DAC offset */
        break;
    case 'c':                                   /* reset of clear value */
            tdac[track].stepin0 = ((unsigned int)track * ONESTEP) + ONESTEP;
        break;
    case 'l':
            q = tdac[track].stepin0 - ((unsigned int)track * ONESTEP);
            for (i = 0 ; i <= maxtrack ; i++) {
                tdac[i].stepin0 = q;            /* stepper DAC offset side 0 */
                q += ONESTEP;                   /* update for next track */
            }
        break;
    }
        custep = tdac[track].stepin0;           /* update the current ustep */
        ustepmotor();                           /* move the stepper motor */
    break;
case 6:                                         /* step in offset side 1 */
    switch (lastkey) {                          /* change current side */
    case '+':
            tdac[track].stepin1 += 10;          /* INC stepper DAC offset */
        break;
    case '=':                                   /* on the same key as + */
            tdac[track].stepin1++;              /* INC stepper DAC offset */
        break;
    case '_':
            tdac[track].stepin1 -= 10;          /* DEC stepper DAC offset */
        break;
    case '-':
            tdac[track].stepin1--;              /* DEC stepper DAC offset */
        break;
    case 'c':                                   /* reset of clear value */
            tdac[track].stepin1 = ((unsigned int)track * ONESTEP) + ONESTEP;
        break;
    case 'l':
            q = tdac[track].stepin1 - ((unsigned int)track * ONESTEP);
            for (i = 0 ; i <= maxtrack ; i++) {
                tdac[i].stepin1 = q;            /* stepper DAC offset side 1 */
                q += ONESTEP;                   /* update for next track */
            }
        break;
    }
        custep = tdac[track].stepin1;           /* update the current ustep */
        ustepmotor();                           /* move the stepper motor */
    break;
case 7:                                         /* step in offset SDS */
```

```c
    switch (lastkey) {                  /* change current side */
    case '+':
        tdac[track].stepin2 += 10;      /* INC stepper DAC offset */
        break;
    case '=':                           /* on the same key as + */
        tdac[track].stepin2++;          /* INC stepper DAC offset */
        break;
    case '_':
        tdac[track].stepin2 -= 10;      /* DEC stepper DAC offset */
        break;
    case '-':
        tdac[track].stepin2--;          /* DEC stepper DAC offset */
        break;
    case 'c':                           /* reset of clear value */
        tdac[track].stepin2 = ((unsigned int)track * ONESTEP) + ONESTEP;
        break;
    case 'l':
        q = tdac[track].stepin2 - ((unsigned int)track * ONESTEP);
        for (i = 0 ; i <= maxtrack ; i++) {
            tdac[i].stepin2 = q;        /* stepper DAC offset SDS */
            q += ONESTEP;               /* update for next track */
        }
        break;
    }
    custep = tdac[track].stepin2;       /* update the current ustep */
    ustepmotor();                       /* move the stepper motor */
    break;
case 8:                                 /* step out offset side 0 */
    switch (lastkey) {                  /* change current side */
    case '+':
        tdac[track].stepout0 += 10;     /* INC stepper DAC offset */
        break;
    case '=':                           /* on the same key as + */
        tdac[track].stepout0++;         /* INC stepper DAC offset */
        break;
    case '_':
        tdac[track].stepout0 -= 10;     /* DEC stepper DAC offset */
        break;
    case '-':
        tdac[track].stepout0--;         /* DEC stepper DAC offset */
        break;
    case 'c':                           /* reset of clear value */
        tdac[track].stepout0 = ((unsigned int)track * ONESTEP) + ONESTEP;
        break;
    case 'l':
        q = tdac[track].stepout0 - ((unsigned int)track * ONESTEP);
        for (i = 0 ; i <= maxtrack ; i++) {
            tdac[i].stepout0 = q;       /* stepper DAC offset side 0 */
            q += ONESTEP;               /* update for next track */
        }
```

```c
            break;
        }
            custep = tdac[track].stepout0;      /* update the current ustep */
            ustepmotor();                       /* move the stepper motor */
            break;
        case 9:                                 /* step out offset side 1 */
            switch (lastkey) {                  /* change current side */
            case '+':
                tdac[track].stepout1 += 10;     /* INC stepper DAC offset */
                break;
            case '=':                           /* on the same key as + */
                tdac[track].stepout1++;         /* INC stepper DAC offset */
                break;
            case '_':
                tdac[track].stepout1 -= 10;     /* DEC stepper DAC offset */
                break;
            case '-':
                tdac[track].stepout1--;         /* DEC stepper DAC offset */
                break;
            case 'c':                           /* reset of clear value */
                tdac[track].stepout1 = ((unsigned int)track * ONESTEP) + ONESTEP;
                break;
            case 'l':
                q = tdac[track].stepout1 - ((unsigned int)track * ONESTEP);
                for (i = 0 ; i <= maxtrack ; i++) {
                    tdac[i].stepout1 = q;       /* stepper DAC offset side 1 */
                    q += ONESTEP;               /* update for next track */
                }
                break;
            }
            custep = tdac[track].stepout1;      /* update the current ustep */
            ustepmotor();                       /* move the stepper motor */
            break;
        case 10:                                /* step out offset SDS */
            switch (lastkey) {                  /* change current side */
            case '+':
                tdac[track].stepout2 += 10;     /* INC stepper DAC offset */
                break;
            case '=':                           /* on the same key as + */
                tdac[track].stepout2++;         /* INC stepper DAC offset */
                break;
            case '_':
                tdac[track].stepout2 -= 10;     /* DEC stepper DAC offset */
                break;
            case '-':
                tdac[track].stepout2--;         /* DEC stepper DAC offset */
                break;
            case 'c':                           /* reset of clear value */
                tdac[track].stepout2 = ((unsigned int)track * ONESTEP) + ONESTEP;
                break;
            case 'l':
```

```c
            q = tdac[track].stepout2 - ((unsigned int)track * ONESTEP);
            for (i = 0 ; i <= maxtrack ; i++) {
                tdac[i].stepout2 = q;           /* stepper DAC offset SDS */
                q += ONESTEP;                   /* update for next track */
            }
            break;
        }
        custep = tdac[track].stepout2;          /* update the current ustep */
        ustepmotor();                           /* move the stepper motor */
        break;
    case 11:                                    /* current side */
        switch (lastkey) {                      /* write current DAC side 0 */
        case '+':
            tdac[track].current0 += 10;         /* INC write current DAC */
            break;
        case '=':                               /* on the same key as + */
            tdac[track].current0++;             /* INC write current DAC */
            break;
        case '_':
            tdac[track].current0 -= 10;         /* DEC write current DAC */
            break;
        case '-':
            tdac[track].current0--;             /* DEC write current DAC */
            break;
        case 'c':                               /* reset of clear value */
            tdac[track].current0 = 0x7f;        /* clear write current DAC */
            break;
        case 'l':
            q = tdac[track].current0;           /* get value to link */
            for (i = 0 ; i <= maxtrack ; i++) {
                tdac[i].current0 = q;           /* link write current value */
            }
        }
        updatedacs();                           /* write the new values */
        break;
    case 12:                                    /* write current DAC side 1 */
        switch (lastkey) {                      /* change current side */
        case '+':
            tdac[track].current1 += 10;         /* INC write current DAC */
            break;
        case '=':                               /* on the same key as + */
            tdac[track].current1++;             /* INC write current DAC */
            break;
        case '_':
            tdac[track].current1 -= 10;         /* DEC write current DAC */
            break;
        case '-':
            tdac[track].current1--;             /* DEC write current DAC */
            break;
        case 'c':                               /* reset of clear value */
            tdac[track].current1 = 0x7f;        /* clear write current DAC */
```

```c
                break;
            case 'l':
                q = tdac[track].current1;        /* get value to link */
                for (i = 0 ; i <= maxtrack ; i++) {
                    tdac[i].current1 = q;        /* link write current value */
                }
        }
        updatedacs();                            /* write the new values */
        break;
    case 13:                                     /* write current DAC SDS */
        switch (lastkey) {                       /* change current side */
            case '+':
                tdac[track].current2 += 10;      /* INC write current DAC */
                break;
            case '=':                            /* on the same key as + */
                tdac[track].current2++;          /* INC write current DAC */
                break;
            case '_':
                tdac[track].current2 -= 10;      /* DEC write current DAC */
                break;
            case '-':
                tdac[track].current2--;          /* DEC write current DAC */
                break;
            case 'c':                            /* reset of clear value */
                tdac[track].current2 = 0x7f;     /* clear write current DAC */
                break;
            case 'l':
                q = tdac[track].current2;        /* get value to link */
                for (i = 0 ; i <= maxtrack ; i++) {
                    tdac[i].current2 = q;        /* link write current value */
                }
        }
        updatedacs();                            /* write the new values */
        break;
    case 14:                                     /* write current DAC SDS */
        switch (lastkey) {                       /* change current side */
            case '+':
                tdac[track].current3 += 10;      /* INC write current DAC */
                break;
            case '=':                            /* on the same key as + */
                tdac[track].current3++;          /* INC write current DAC */
                break;
            case '_':
                tdac[track].current3 -= 10;      /* DEC write current DAC */
                break;
            case '-':
                tdac[track].current3--;          /* DEC write current DAC */
                break;
            case 'c':                            /* reset of clear value */
                tdac[track].current3 = 0x7f;     /* clear write current DAC */
                break;
```

```
   case 'l':
       q = tdac[track].current3;          /* get value to link */
       for (i = 0 ; i <= maxtrack ; i++) {
           tdac[i].current3 = q;          /* link write current value */
       }
   }
   updatedacs();                          /* write the new values */
   break;
case 15:                                  /* asymmetry DAC side 0 */
   switch (lastkey) {                     /* change current side */
   case '+':
       tdac[track].asymmetry0 += 10;      /* INC asymmetry DAC side 0 */
       break;
   case '=':                              /* on the same key as + */
       tdac[track].asymmetry0++;          /* INC asymmetry DAC side 0 */
       break;
   case '_':
       tdac[track].asymmetry0 -= 10;      /* DEC asymmetry DAC side 0 */
       break;
   case '-':
       tdac[track].asymmetry0--;          /* DEC asymmetry DAC side 0 */
       break;
   case 'c':                              /* reset of clear value */
       tdac[track].asymmetry0 = 0x7f;     /* clear asymmetry DAC side 0 */
       break;
   case 'l':
       q = tdac[track].asymmetry0;        /* get value to link */
       for (i = 0 ; i <= maxtrack ; i++) {
           tdac[i].asymmetry0 = q;        /* link write asymmetry value */
       }
   }
   updatedacs();                          /* write the new values */
   break;
case 16:                                  /* asymmetry DAC side 1 */
   switch (lastkey) {                     /* change current side */
   case '+':
       tdac[track].asymmetry1 += 10;      /* INC asymmetry DAC side 1 */
       break;
   case '=':                              /* on the same key as + */
       tdac[track].asymmetry1++;          /* INC asymmetry DAC side 1 */
       break;
   case '_':
       tdac[track].asymmetry1 -= 10;      /* DEC asymmetry DAC side 1 */
       break;
   case '-':
       tdac[track].asymmetry1--;          /* DEC asymmetry DAC side 1 */
       break;
   case 'c':                              /* reset of clear value */
       tdac[track].asymmetry1 = 0x7f;     /* clear asymmetry DAC side 1 */
       break;
   case 'l':
```

```c
            q = tdac[track].asymmetry1;           /* get value to link */
            for (i = 0 ; i <= maxtrack ; i++) {
                tdac[i].asymmetry1 = q;           /* link write asymmetry value */
            }
        }
        updatedacs();                             /* write the new values */
        break;
    case 17:                                      /* asymmetry DAC side SDS */
        switch (lastkey) {                        /* change current side */
        case '+':
            tdac[track].asymmetry2 += 10;         /* INC asymmetry DAC side 1 */
            break;
        case '=':                                 /* on the same key as + */
            tdac[track].asymmetry2++;             /* INC asymmetry DAC side 1 */
            break;
        case '_':
            tdac[track].asymmetry2 -= 10;         /* DEC asymmetry DAC side 1 */
            break;
        case '-':
            tdac[track].asymmetry2--;             /* DEC asymmetry DAC side 1 */
            break;
        case 'c':                                 /* reset of clear value */
            tdac[track].asymmetry2 = 0x7f;        /* clear asymmetry DAC side 1 */
            break;
        case 'l':
            q = tdac[track].asymmetry2;           /* get value to link */
            for (i = 0 ; i <= maxtrack ; i++) {
                tdac[i].asymmetry2 = q;           /* link write asymmetry value */
            }
        }
        updatedacs();                             /* write the new values */
        break;
    case 18:                                      /* asymmetry DAC side SDS */
        switch (lastkey) {                        /* change current side */
        case '+':
            tdac[track].asymmetry3 += 10;         /* INC asymmetry DAC side 1 */
            break;
        case '=':                                 /* on the same key as + */
            tdac[track].asymmetry3++;             /* INC asymmetry DAC side 1 */
            break;
        case '_':
            tdac[track].asymmetry3 -= 10;         /* DEC asymmetry DAC side 1 */
            break;
        case '-':
            tdac[track].asymmetry3--;             /* DEC asymmetry DAC side 1 */
            break;
        case 'c':                                 /* reset of clear value */
            tdac[track].asymmetry3 = 0x7f;        /* clear asymmetry DAC side 1 */
            break;
        case 'l':
            q = tdac[track].asymmetry3;           /* get value to link */
```

```
            for (i = 0 ; i <= maxtrack ; i++) {
                tdac[i].asymmetry3 = q;      /* link write asymmetry value */
            }
        }
        updatedacs();                        /* write the new values */
        break;
    case 19:                                 /* clip DAC side 0 */
        switch (lastkey) {                   /* change current side */
        case '+':
            tdac[track].clip0 += 10;         /* INC clip DAC side 0 */
            break;
        case '=':                            /* on the same key as + */
            tdac[track].clip0++;             /* INC clip DAC side 0 */
            break;
        case '_':
            tdac[track].clip0 -= 10;         /* DEC clip DAC side 0 */
            break;
        case '-':
            tdac[track].clip0--;             /* DEC clip DAC side 0 */
            break;
        case 'c':                            /* reset of clear value */
            tdac[track].clip0 = 0x7f;        /* reset clip DAC side 0 */
            break;
        case 'l':
            q = tdac[track].clip0;           /* get value to link */
            for (i = 0 ; i <= maxtrack ; i++) {
                tdac[i].clip0 = q;           /* link read clip value */
            }
        }
        updatedacs();                        /* write the new values */
        break;
    case 20:                                 /* clip DAC side 1 */
        switch (lastkey) {                   /* change current side */
        case '+':
            tdac[track].clip1 += 10;         /* INC clip DAC side 1 */
            break;
        case '=':                            /* on the same key as + */
            tdac[track].clip1++;             /* INC clip DAC side 1 */
            break;
        case '_':
            tdac[track].clip1 -= 10;         /* DEC clip DAC side 1 */
            break;
        case '-':
            tdac[track].clip1--;             /* DEC clip DAC side 1 */
            break;
        case 'c':                            /* reset of clear value */
            tdac[track].clip1 = 0x7f;        /* clear clip DAC side 1 */
            break;
        case 'l':
            q = tdac[track].clip1;           /* get value to link */
            for (i = 0 ; i <= maxtrack ; i++) {
```

```
                tdac[i].clip1 = q;              /* link read clip value */
            }
        }
        updatedacs();                           /* write the new values */
        break;
    case 21:                                    /* clip DAC side SDS */
        switch (lastkey) {                      /* change current side */
        case '+':
            tdac[track].clip2 += 10;            /* INC clip DAC side 1 */
            break;
        case '=':                               /* on the same key as + */
            tdac[track].clip2++;                /* INC clip DAC side 1 */
            break;
        case '_':
            tdac[track].clip2 -= 10;            /* DEC clip DAC side 1 */
            break;
        case '-':
            tdac[track].clip2--;                /* DEC clip DAC side 1 */
            break;
        case 'c':                               /* reset of clear value */
            tdac[track].clip2 = 0x7f;           /* clear clip DAC side 1 */
            break;
        case 'l':
            q = tdac[track].clip2;              /* get value to link */
            for (i = 0 ; i <= maxtrack ; i++) {
                tdac[i].clip2 = q;              /* link read clip value */
            }
        }
        updatedacs();                           /* write the new values */
        break;
    case 22:                                    /* clip DAC side SDS */
        switch (lastkey) {                      /* change current side */
        case '+':
            tdac[track].clip3 += 10;            /* INC clip DAC side 1 */
            break;
        case '=':                               /* on the same key as + */
            tdac[track].clip3++;                /* INC clip DAC side 1 */
            break;
        case '_':
            tdac[track].clip3 -= 10;            /* DEC clip DAC side 1 */
            break;
        case '-':
            tdac[track].clip3--;                /* DEC clip DAC side 1 */
            break;
        case 'c':                               /* reset of clear value */
            tdac[track].clip3 = 0x7f;           /* clear clip DAC side 1 */
            break;
        case 'l':
            q = tdac[track].clip3;              /* get value to link */
            for (i = 0 ; i <= maxtrack ; i++) {
                tdac[i].clip3 = q;              /* link read clip value */
```

```c
        }
      }
    updatedacs();                      /* write the new values */
    break;
  default:                             /* something is in error */
    cvpntr = 1;
    break;
  }
  q = stack16[sp16--];                 /* restore q */
  i = stack16[sp16--];                 /* restore i */
}

/*************************************************************

This function will do the index to data burst alignment on the drive.

Variables used: i,p,s,t
**************************************************************
*/
void indexdata()                       /* do the index test */
{
   stack8[++sp8] = side;               /* save side */
   stack8[++sp8] = p;                  /* save p */
   stack8[++sp8] = s;                  /* save s */
   stack8[++sp8] = t;                  /* save t */
   seektrack = adac[adisktype].indexb * byone; /* index data burst track */
   smotor();                           /* move the stepper motor */
   side = 0;                           /* test side zero first */
   s = 0;                              /* test must pass 3 times */
   p = 255;                            /* more than 255 is an error */
   t = (tidelay / 16) - 1;             /* target index delay value */
   while ((s < 3) && (p--)) {          /* find index delay value */
      trackid();                       /* return current index dealy */
      if ((c < t + 1) && (c > t - 1)) s++;   /* have we found the delay */
      else {
         if (c < t) {                  /* make index delay shorter */
            if ((t - c) > 3) idelay0 -= (t - c) * 2;
            else idelay0--;
         }
         else {                        /* make index delay larger */
            if ((c - t) > 3) idelay0 += (c - t) * 2;
            else idelay0++;
         }
      }
   }
   side = 1;                           /* test side one next */
   s = 0;                              /* test must pass 3 times */
   p = 255;                            /* more than 255 is an error */
   while ((s < 3) && (p--)) {          /* find index delay value */
      trackid();                       /* return current index dealy */
```

```c
            if ((c < t + 1) && (c > t - 1)) s++;    /* have we found the delay */
            else {
                if (c < t) {                        /* make index delay shorter */
                    if ((t - c) > 3) idelay1 -= (t - c) * 2;
                    else idelay1--;
                }
                else {                              /* make index delay larger */
                    if ((c - t) > 3) idelay1 += (c - t) * 2;
                    else idelay1++;
                }
            }
        }
        t = stack8[sp8--];                  /* restore t */
        s = stack8[sp8--];                  /* restore s */
        p = stack8[sp8--];                  /* restore p */
        side = stack8[sp8--];               /* restore side */
}

/****************************************************************************

This function will do the radial alignment on the drive.

Variables used: c,p,s,i,q
****************************************************************************
/
void doradial()                             /* do the radial test */
{
    stack8[++sp8] = side;                   /* save side */
    stack8[++sp8] = c;                      /* save c */
    stack8[++sp8] = p;                      /* save p */
    stack8[++sp8] = s;                      /* save s */
    stack16[++sp16] = i;                    /* save i */
    stack16[++sp16] = q;                    /* save q */
    stack16[++sp16] = n;                    /* save n */
    failed = 1;                             /* set the test failed flag */
    side = 0;                               /* start with size zero */
    seektrack = 255;                        /* set motor home flag */
    smotor();                               /* go home the head */
    custep += ONESTEP;                      /* move the head in some */
    ustepmotor();                           /* move the stepper motor */
    kickit = 1;                             /* set sepcial stepper flag */
    s = 0;                                  /* use <s> as a done flag */
    c = 0;                                  /* clear the average value */
    p = adac[adisktype].t0mins;             /* make a local variable */
    while ((c < p) && (custep > KICKBACK)) {    /* do we have minumum signal */
        custep -= 20;
        ustepmotor();                       /* move the stepper motor */
        trackzr();                          /* get average amplitude */
        if (!c) {                           /* value must be > 0 */
            xerror = NORCENTER;             /* track center not found */
```

```c
            perror(BERROR);              /* print and log the error */
            rerror();                    /* call error handler */
            return;                      /* test failed */
        }
    }
    if (c >= p) {                        /* we have minimum signal? */
        p = c;                           /* save the current value */
        while ((p <= c) && (custep > KICKBACK)) {
            p = c;                       /* update the old value */
            custep -= 20;                /* move the head out some */
            ustepmotor();                /* move the stepper motor */
            trackzr();                   /* get average amplitude */
            if (!c) {                    /* value must be > 0 */
                xerror = NOREDGE;        /* track edge not found */
                perror(BERROR);          /* print and log the error */
                rerror();                /* call error handler */
                return;                  /* test failed */
            }
        }
        if (p > c) {
            custep += 30;                /* move the head in some */
            ustepmotor();                /* move the stepper motor */
            s = 1;                       /* we found the center */
        }
    }
    else {
        while ((c < adac[adisktype].t0mins) && (custep < ONESTEP * 10)) {
            custep += 20;                /* move the head in some */
            ustepmotor();                /* move the stepper motor */
            trackzr();                   /* get average amplitude */
            if (!c) {                    /* value must be > 0 */
                xerror = NORCENTER;      /* track center not found */
                perror(BERROR);          /* print and log the error */
                rerror();                /* call error handler */
                return;                  /* test failed */
            }
        }
        if (c >= adac[adisktype].t0mins) {
            p = c;                       /* save the current value */
            while ((p <= c) && (custep < ONESTEP * 10)) {
                p = c;                   /* update the old value */
                custep += 20;            /* move the head out some */
                ustepmotor();            /* move the stepper motor */
                trackzr();               /* get average amplitude */
                if (!c) {                /* value must be > 0 */
                    xerror = NOREDGE;    /* track center not found */
                    perror(BERROR);      /* print and log the error */
                    rerror();            /* call error handler */
                    return;              /* test failed */
                }
```

```c
        }
      if (p > c) {
         custep -= 30;              /* move the head out some */
         ustepmotor();              /* move the stepper motor */
         s = 1;                     /* we found the center */
      }
    }
  }
  if (!s) {                         /* radial alignment failed */
    rerror();                       /* end the function */
    return;                         /* return, test failed */
  }
  kickit = 4;                       /* step in and then out */
  seektrack = adac[adisktype].radlobes * byone;
  custep += ONESTEP * seektrack;    /* setup ustep position */
  track = seektrack;                /* update the current track */
  ustepmotor();                     /* move the stepper motor */
  s = 0;                            /* done if more than once */
  while (s < 3) {                   /* run test three times */
    trackra();                      /* get radial alignment */
    if ((c > 250) || (p > 250) || (c < 5) || (p < 5)) {
       c = 5;                       /* clear the left lobe */
       p = 250;                     /* clear the right lobe */
       s = 0;                       /* bad alignment test */
       continue;                    /* reread the alignment data */
    }
    if ((c < p + 3) && (c > p - 3)) s++;   /* we are on track center */
    else {
       if (c < p) {                 /* move in to track center */
          if (p - c > 20) custep += 10;   /* move in big steps */
          else custep += 2;         /* move in small steps */
       }
       else {
          if (c - p > 20) custep -= 10;   /* move in big steps */
          else custep -=2;          /* move out some */
       }
       ustepmotor();                /* move the stepper motor */
    }
  }
  tdac[seektrack].stepin0 = custep;          /* help out the step in */
  q = custep - ((unsigned int)track * ONESTEP);
  for (i = 0 ; i <= maxtrack ; i++) {        /* init all other tracks */
    tdac[i].stepout0 = q;           /* stepper DAC offset side 0 */
    q += ONESTEP;                   /* update for next track */
  }
  c = 0;                            /* clear zero switch flag */
  seektrack = adac[adisktype].radlobes * byone;
  while (seektrack) {               /* count this down to zero */
    seektrack -= byone;             /* step out one track */
    smotor();                       /* move the stepper motor */
    if (IOP1 & T0SW) {              /* track zero switch true? */
```

```
            if (!c) c = seektrack;         /* save the track number */
    }
}
    wtrack = c;                            /* save the track number */
    zstate = mstate;                       /* save the zero state */
    zoffset = lastoff;                     /* save the zero offset */
    seektrack = 255;                       /* set the stepper home flag */
    smotor();                              /* move the stepper motor */ seektrack = adac[adisktype].radlobes * byone;
    smotor();                              /* move the stepper motor */
    kickit = 3;                            /* step out and then in */
    custep -= 2;                           /* move out some */
    ustepmotor();                          /* move the stepper motor */
    s = 0;                                 /* done if more than once */
    while (s < 3) {                        /* run test three times */
        trackra();                         /* get radial alignment */
        if ((c > 250) || (p > 250) || (c < 5) || (p < 5)) {
            c = 5;                         /* clear the left lobe */
            p = 250;                       /* clear the right lobe */
            s = 0;                         /* bad alignment test */
            continue;                      /* reread the alignment data */
        }
        if ((c < p + 3) && (c > p - 3)) s++;   /* we are on track center */
        else {
            if (c < p) {                   /* move in to track center */
                if (p - c > 20) custep += 10;  /* move in big steps */
                else custep += 2;          /* move in small steps */
            }
            else {
                if (c - p > 20) custep -= 10;  /* move in big steps */
                else custep -=2;           /* move out some */
            }
            ustepmotor();                  /* move the stepper motor */
        }
    }
    q = custep - ((unsigned int)track * ONESTEP);
    for (i = 0 ; i <= maxtrack ; i++) {    /* init all other tracks */
        tdac[i].stepin0 = q;               /* stepper DAC offset side 0 */
        q += ONESTEP;                      /* update for next track */
    }
    side = 1;                              /* side 1 alignment test */
    kickit = 4;                            /* step in and then out */
    s = 0;                                 /* done if more than once */
    while (s < 3) {                        /* run test three times */
        trackra();                         /* get radial alignment */
        if ((c > 250) || (p > 250) || (c < 5) || (p < 5)) {
            c = 5;                         /* clear the left lobe */
            p = 250;                       /* clear the right lobe */
            s = 0;                         /* bad alignment test */
            continue;                      /* reread the alignment data */
```

```c
            }
        if ((c < p + 3) && (c > p - 3)) s++;    /* we are on track center */
        else {
            if (c < p) {                        /* move in to track center */
                if (p - c > 20) custep += 10;   /* move in big steps */
                else custep += 2;               /* move in small steps */
            }
            else {
                if (c - p > 20) custep -= 10;   /* move in big steps */
                else custep -=2;                /* move out some */
            }
            ustepmotor();                       /* move the stepper motor */
        }
    }
}
tdac[seektrack].stepin1 = custep;               /* help out the step in */
q = custep - ((unsigned int)track * ONESTEP);
for (i = 0 ; i <= maxtrack ; i++) {             /* init all other tracks */
    tdac[i].stepout1 = q;                       /* stepper DAC offset side 1 */
    q += ONESTEP;                               /* update for next track */
}
kickit = 3;                                     /* step out and then in */
custep -= 2;                                    /* move out some */
ustepmotor();                                   /* move the stepper motor */
s = 0;                                          /* done if more than once */
while (s < 3) {                                 /* run test three times */
    trackra();                                  /* get radial alignment */
    if ((c > 250) || (p > 250) || (c < 5) || (p < 5)) {
        c = 5;                                  /* clear the left lobe */
        p = 250;                                /* clear the right lobe */
        s = 0;                                  /* bad alignment test */
        continue;                               /* reread the alignment data */
    }
    if ((c < p + 3) && (c > p - 3)) s++;        /* we are on track center */
    else {
        if (c < p) {                            /* move in to track center */
            if (p - c > 20) custep += 10;       /* move in big steps */
            else custep += 2;                   /* move in small steps */
        }
        else {
            if (c - p > 20) custep -= 10;       /* move in big steps */
            else custep -=2;                    /* move out some */
        }
        ustepmotor();                           /* move the stepper motor */
    }
}
q = custep - ((unsigned int)track * ONESTEP);
for (i = 0 ; i <= maxtrack ; i++) {             /* init all other tracks */
    tdac[i].stepin1 = q;                        /* stepper DAC offset side 1 */
    q += ONESTEP;                               /* update for next track */
}
```

```c
        q = tdac[0].stepout0;              /* get the step out offset 0 */
        n = tdac[0].stepout1;              /* get the step out offset 1 */
        q = (n + q) / 2;                   /* average the difference */
         for (i = 0 ; i <= maxtrack ; i++) {  /* init all other tracks */
            tdac[i].stepout2 = q;          /* stepper DAC offset SDS */
            q += ONESTEP;                  /* update for next track */
        }
        q = tdac[0].stepin0;               /* get the step in offset 0 */
        n = tdac[0].stepin1;               /* get the step in offset 1 */
        q = (n + q) / 2;                   /* average the difference */
         for (i = 0 ; i <= maxtrack ; i++) {  /* init all other tracks */
            tdac[i].stepin2 = q;           /* stepper DAC offset SDS */
            q += ONESTEP;                  /* update for next track */
        }
        rcent0 = 100;                      /* radial % side 0 */
        rcent1 = 1;                        /* radial % side 1 */
        kickit = 0;                        /* clear the special flag */
        refresh();                         /* refresh the console */
        seektrack = 255;                   /* set stepper home flag */
        smotor();                          /* move the motor */
        failed = 0;                        /* clear the test failed flag */
        rerror();                          /* no error, just cleanup */
}
```

```
/*****************************************************************

This function will handle the radial alignment errors.

Variables used: none
 *****************************************************************
/
```

```c
void rerror()                              /* radial alignment errors */
{
    n = stack16[sp16--];                   /* restore n */
    q = stack16[sp16--];                   /* restore q */
    i = stack16[sp16--];                   /* restore i */
    s = stack8[sp8--];                     /* restore s */
    p = stack8[sp8--];                     /* restore p */
    c = stack8[sp8--];                     /* restore c */
    side = stack8[sp8--];                  /* restore side */
    kickit = 0;                            /* clear the special flag */
}
```

```
/*****************************************************************

This function will return the track average amplitude in veriable c.

Variables used: i,p,c,l            (c,l not saved)
 *****************************************************************
/
```

```c
void trackaa()                             /* return average amplitude */
```

```c
{
    stack8[++sp8] = p;                          /* save p */
    stack16[++sp16] = i;                        /* save i */
    c = 0;                                      /* clear the return value */
    if (ADCON & 0x18) {                         /* error, ADC is busy? */
        xerror = ADCABUSY;                      /* set busy error code */
        perror(EERROR);                         /* enter the error code */
        trackaaend();                           /* restore stack values */
        return;                                 /* no value to report */
    }
    VRHI = adac[adisktype].amphrefv;            /* set the ADC ref high value */
    VRLO = adac[adisktype].amplrefv;            /* set the ADC ref low value */
    iop2 = adac[adisktype].ampintr;             /* track zero intr value */
    IOP2 = iop2;                                /* output the port bits */
    if ((side == 0) || (side == 2)) {           /* get data for side 0 */
        ADCON = ADCENV0;                        /* set switch for side 0 */
        i = 0;                                  /* clear the timeout counter */
        tickindex0 = 0;                         /* clear the index flag */
        while ((!tickindex0) && (--i));         /* wait for index */
        if (!i) {                               /* should have index by now */
            xerror = NOAINDEX;                  /* set busy error code */
            perror(EERROR);                     /* enter the error code */
            trackaaend();                       /* restore stack values */
            return;                             /* no value to report */
        }
        tickindex0 = 0;                         /* clear the index flag */
        for (i = 0 ; i < SAMPLESIZE ; i++) {    /* sample data until index */
            if (tickindex0) break;              /* stop when index is found */
            ADCON |= 0x08;                      /* start the ADC conversion */
            while (!(ADCON & 0x10));            /* wait for the conversion */
            ADCON &= ~0x10;                     /* clear the interrupt flag */
            c = ADCH;                           /* make a copy of the data */
            if (c) sample[i] = c;               /* store the adc value */
            else sample[i] = 1;                 /* never enter a zero value */
        }
    }
    else {                                      /* get data for side 1 */
        ADCON = ADCENV1;                        /* set switch for side 1 */
        i = 0;                                  /* clear the timeout counter */
        tickindex1 = 0;                         /* clear the index flag */
        while ((!tickindex1) && (--i));         /* wait for index */
        if (!i) {                               /* should have index by now */
            xerror = NOAINDEX;                  /* set busy error code */
            perror(EERROR);                     /* enter the error code */
            trackaaend();                       /* restore stack values */
            return;                             /* no value to report */
        }
        tickindex1 = 0;                         /* clear the index flag */
        for (i = 0 ; i < SAMPLESIZE ; i++) {    /* sample data until index */
            if (tickindex1) break;              /* stop when index is found */
            ADCON |= 0x08;                      /* start the ADC conversion */
```

```c
        while (!(ADCON & 0x10));       /* wait for the conversion */
        ADCON &= ~0x10;                /* clear the interrupt flag */
        c = ADCH;                      /* make a copy of the data */
        if (c) sample[i] = c;          /* store the adc value */
        else sample[i] = 1;            /* never enter a zero value */
    }
  }
  sample[i] = 0;                       /* enter a zero value last */
  p = 1;                               /* init a sample value */
  i = 0;                               /* init data buffer pointer */
  l = 0L;                              /* clear the total */
  while (c = sample[i++]) {            /* process all data values */
    if (c > 0xf0) c = p;               /* test for a bad sample */
    else p = c;                        /* get next sample value */
    l += (unsigned long)c;             /* update the total */
  }
  c = (unsigned char)(l / (i - 1));    /* find the average value */
  trackaaend();                        /* restore stack values */
}
void trackaaend()                      /* restore stack values */
{
  i = stack16[sp16--];                 /* restore i */
  p = stack8[sp8--];                   /* restore p */
}
```

```
/************************************************************

This function will return the track zero average amplitude in veriable c.
Variables used: i,p,c,l              (c,l not saved)
************************************************************
/
```

```c
void trackzr()                         /* return average amplitude */
{
  stack8[++sp8] = p;                   /* save p */
  stack16[++sp16] = i;                 /* save i */
  c = 0;                               /* clear the return value */
  if (ADCON & 0x18) {                  /* error, ADC is busy? */
    xerror = ADCABUSY;                 /* set busy error code */
    perror(EERROR);                    /* enter the error code */
    trackzrend();                      /* restore stack values */
    return;                            /* no value to report */
  }
  VRHI = adac[adisktype].t0hrefv;      /* set the ADC ref high value */
  VRLO = adac[adisktype].t0lrefv;      /* set the ADC ref low value */
  iop2 = adac[adisktype].t0intr;       /* track zero intr value */
  IOP2 = iop2;                         /* output the port bits */
  if ((side == 0) || (side == 2)) {    /* get data for side 0 */
    ADCON = ADCENV0;                   /* set switch for side 0 */
    i = 0;                             /* clear the timeout counter */
    tickindex0 = 0;                    /* clear the index flag */
```

```c
      while ((!tickindex0) && (--i));         /* wait for index */
      if (!i) {                                /* should have index by now */
         xerror = NOAINDEX;                    /* set busy error code */
         perror(EERROR);                       /* enter the error code */
         trackzrend();                         /* restore stack values */
         return;                               /* no value to report */
      }
      tickindex0 = 0;                          /* clear the index flag */
      for (i = 0 ; i < SAMPLESIZE ; i++) {     /* sample data until index */
         if (tickindex0) break;                /* stop when index is found */
         ADCON |= 0x08;                        /* start the ADC conversion */
         while (!(ADCON & 0x10));              /* wait for the conversion */
         ADCON &= ~0x10;                       /* clear the interrupt flag */
         c = ADCH;                             /* make a copy of the data */
         if (c) sample[i] = c;                 /* store the adc value */
         else sample[i] = 1;                   /* never enter a zero value */
      }
   }
   else {                                      /* get data for side 1 */
      ADCON = ADCENV1;                         /* set switch for side 1 */
      i = 0;                                   /* clear the timeout counter */
      tickindex1 = 0;                          /* clear the index flag */
      while ((!tickindex1) && (--i));          /* wait for index */
      if (!i) {                                /* should have index by now */
         xerror = NOAINDEX;                    /* set busy error code */
         perror(EERROR);                       /* enter the error code */
         trackzrend();                         /* restore stack values */
         return;                               /* no value to report */
      }
      tickindex1 = 0;                          /* clear the index flag */
      for (i = 0 ; i < SAMPLESIZE ; i++) {     /* sample data until index */
         if (tickindex1) break;                /* stop when index is found */
         ADCON |= 0x08;                        /* start the ADC conversion */
         while (!(ADCON & 0x10));              /* wait for the conversion */
         ADCON &= ~0x10;                       /* clear the interrupt flag */
         c = ADCH;                             /* make a copy of the data */
         if (c) sample[i] = c;                 /* store the adc value */
         else sample[i] = 1;                   /* never enter a zero value */
      }
   }
   sample[i] = 0;                              /* enter a zero value last */
   p = 1;                                      /* init a sample value */
   i = 0;                                      /* init data buffer pointer */
   l = 0L;                                     /* clear the total */
   while (c = sample[i++]) {                   /* process all data values */
      if (c > 0xf0) c = p;                     /* test for a bad sample */
      else p = c;                              /* get next sample value */
      l += (unsigned long)c;                   /* update the total */
   }
   c = (unsigned char)(l / (i - 1));           /* find the average value */
   trackzrend();                               /* restore stack values */
```

```
}
void trackzrend()                          /* restore stack values */
{
    i = stack16[sp16--];                   /* restore i */
    p = stack8[sp8--];                     /* restore p */
}

/*********************************************************************

This function will return the track alignment lobes in variables c and p.
Variable c will hold the left lobe and p the right.

Variables used: i,r,n,c,p,s,t,l           (p,c,l not saved)
*********************************************************************
/
void trackra()                             /* return radial alignment */
{
    stack8[++sp8] = t;                     /* save t */
    stack8[++sp8] = s;                     /* save s */
    stack16[++sp16] = i;                   /* save i */
    stack16[++sp16] = n;                   /* save n */
    stack16[++sp16] = r;                   /* save r */
    c = 0;                                 /* clear the left lobe */
    p = 0;                                 /* clear the right lobe */
    if (ADCON & 0x18) {                    /* error, ADC is busy? */
        xerror = ADCRBUSY;                 /* set busy error code */
        perror(EERROR);                    /* enter the error code */
        trackraend();                      /* restore stack values */
        return;                            /* no value to report */
    }
    VRHI = adac[adisktype].radhrefv;       /* set the ADC ref high value */
    VRLO = adac[adisktype].radlrefv;       /* set the ADC ref low value */
    iop2 = adac[adisktype].radintr;        /* radial intr value */
    IOP2 = iop2;                           /* output the port bits */
    if ((side == 0) || (side == 2)) {      /* get data for side 0 */
        ADCON = ADCENV0;                   /* set switch for side 0 */
        i = 0;                             /* clear the timeout counter */
        tickindex0 = 0;                    /* clear the index flag */
        while ((!tickindex0) && (--i));    /* wait for index */
        if (!i) {                          /* should have index by now */
            xerror = NORINDEX;             /* set busy error code */
            perror(EERROR);                /* enter the error code */
            trackraend();                  /* restore stack values */
            return;                        /* no value to report */
        }
        tickindex0 = 0;                    /* clear the index flag */
        for (i = 0 ; i < SAMPLESIZE ; i++) {   /* sample data until index */
            if (tickindex0) break;         /* stop when index is found */
            ADCON |= 0x08;                 /* start the ADC conversion */
            while (!(ADCON & 0x10));       /* wait for the conversion */
```

```c
            ADCON &= ~0x10;                    /* clear the interrupt flag */
            c = ADCH;                          /* make a copy of the data */
            if (c) sample[i] = c;              /* store the adc value */
            else sample[i] = 1;                /* never enter a zero value */
        }
    }
    else {                                     /* get data for side 1 */
        ADCON = ADCENV1;                       /* set switch for side 1 */
        i = 0;                                 /* clear the timeout counter */
        tickindex1 = 0;                        /* clear the index flag */
        while ((!tickindex1) && (--i));        /* wait for index */
        if (!i) {                              /* should have index by now */
            xerror = NORINDEX;                 /* set busy error code */
            perror(EERROR);                    /* enter the error code */
            trackraend();                      /* restore stack values */
            return;                            /* no value to report */
        }
        tickindex1 = 0;                        /* clear the index flag */
        for (i = 0 ; i < SAMPLESIZE ; i++) {   /* sample data until index */
            if (tickindex1) break;             /* stop when index is found */
            ADCON |= 0x08;                     /* start the ADC conversion */
            while (!(ADCON & 0x10));           /* wait for the conversion */
            ADCON &= ~0x10;                    /* clear the interrupt flag */
            c = ADCH;                          /* make a copy of the data */
            if (c) sample[i] = c;              /* store the adc value */
            else sample[i] = 1;                /* never enter a zero value */
        }
    }
    sample[i] = 0;                             /* enter a zero value last */
    c = 1;                                     /* init a sample value */
    for (r = 0 ; r < i ; r++) {                /* remove all bad samples */
        if (sample[r] > 0xe0) sample[r] = c;   /* test for a bad sample */
        else c = sample[r];                    /* get next sample value */
    }
    r = i;                                     /* make a pointer to last */
    p = 5;                                     /* average last 5 values */
    l = 0L;                                    /* clear the total */
    while (p--) l += (unsigned long)sample[r--];/* make a total for average */
    c = (unsigned char)(l / 5L);               /* find the average value */
    r = i;                                     /* make a pointer to last */
    t = 0;                                     /* clear bad value counter */
    s = adac[adisktype].radfilter;             /* get filter length value */
    while (--r) {                              /* remove all delta values */
        p = sample[r];                         /* make a local value */
        if ((p > c + 10) || (p < c - 10)) {    /* is smaple value in range ? */
            sample[r] = c;
            if (++t > s) break;                /* test for failed filter */
        }
        else {                                 /* current value is OK */
            c = p;                             /* sample value was OK */
            t = 0;                             /* clear the filter flag */
```

```c
    }
  }
  if (t > 100) {                              /* the filter failed */
    c = 255;                                  /* set filter failed flag */
      p = 255;                                /* set filter failed flag */
      trackraend();                           /* restore stack values */
      return;                                 /* report the error */
  }
  c = 0;                                      /* clear the left lobe */
  p = 0;                                      /* clear the right lobe */
    for (r = i / 10 ; r < i / 2 ; r++) {     /* test the first lobe */
        if (sample[r] > c) c = sample[r];     /* if bigger then save it */
    }
    for (r = i / 2 ; r < i ; r++) {          /* test the second lobe */
        if (sample[r] > p) p = sample[r];     /* if bigger then save it */
    }
    trackraend();                             /* restore stack values */
}
void trackraend()                             /* restore stack values */
{
    r = stack16[sp16--];                      /* restore r */
    n = stack16[sp16--];                      /* restore n */
    i = stack16[sp16--];                      /* restore i */
    s = stack8[sp8--];                        /* restore s */
    t = stack8[sp8--];                        /* restore t */
}
```

/*****************************************************************

This function will return the index burst delay in veriable c.

Variables used: i,p,s,t,c          (c not saved)
*****************************************************************
/
```c
void trackid()                                /* return index dealy */
{
    stack8[++sp8] = p;                        /* save p */
    stack8[++sp8] = s;                        /* save s */
    stack8[++sp8] = t;                        /* save t */
    stack16[++sp16] = i;                      /* save i */
    c = 0;                                    /* clear the return value */
    if (ADCON & 0x18) {                       /* error, ADC is busy? */
       xerror = ADCIBUSY;                     /* set busy error code */
       perror(EERROR);                        /* enter the error code */
       trackidend();                          /* restore stack values */
       return;                                /* no value to report */
    }
      VRHI = adac[adisktype].idxhrefv;        /* set the ADC ref high value */
      VRLO = adac[adisktype].idxlrefv;        /* set the ADC ref low value */
      iop2 = adac[adisktype].idxintr;         /* index intr value */
```

```c
IOP2 = iop2;                                    /* output the port bits */
if ((side == 0) || (side == 2)) {               /* get data for side 0 */
    ADCON = ADCENV0;                            /* set switch for side 0 */
    CML0 = idelay0;                             /* load index delay side 0 */
    EA = 0;                                     /* all interrupts off */
    for (p = 0 ; p < 8 ; p++) {                 /* do eight passes of 8us */
        t = p;                                  /* init the wait counter */
        i = (unsigned int)p;                    /* init the sample pointer */
        ADCON &= ~0x10;                         /* clear the ADC done flag */
        TM2IR &= ~CMI2;                         /* clear the stop flag */
        TM2IR &= ~CMI0;                         /* clear the start flag */
        while (!(TM2IR & CMI0));                /* wait for the index side 0 */
        while (t) {                             /* delay 8 us per loop */
            t--;                                /* count this value down */
            s = t;                              /* delay 2us longer */
        }
        ADCON |= 0x08;                          /* start the ADC conversion */
        while (!(TM2IR & CMI2)) {               /* while index true get data */
            if (s) sample[i] = s;               /* store the adc value */
            else sample[i] = 1;                 /* never enter a zero value */
            i += 8;                             /* move pointer to next value */
            while (!(ADCON & 0x10));            /* wait for the conversion */
            ADCON &= ~0x10;                     /* clear the interrupt flag */
            s = ADCH;                           /* make a copy of the data */
            ADCON |= 0x08;                      /* start the ADC conversion */
        }
        sample[i] = 0;                          /* set the end of data flag */
        while (!(ADCON & 0x10));                /* wait for the conversion */
        ADCON &= ~0x10;                         /* clear the interrupt flag */
    }
}
else {                                          /* get data for side 1 */
    ADCON = ADCENV1;                            /* set switch for side 1 */
    CML1 = idelay1;                             /* load index delay side 1 */
    EA = 0;                                     /* all interrupts off */
    for (p = 0 ; p < 8 ; p++) {                 /* do eight passes of 8us */
        t = p;                                  /* init the wait counter */
        i = (unsigned int)p;                    /* init the sample pointer */
        ADCON &= ~0x10;                         /* clear the ADC done flag */
        TM2IR &= ~CMI2;                         /* clear the stop flag */
        TM2IR &= ~CMI1;                         /* clear the start flag */
        while (!(TM2IR & CMI1));                /* wait for the index side 1 */
        while (t) {                             /* delay 8 us per loop */
            t--;                                /* count this value down */
            s = t;                              /* delay 2us longer */
        }
        ADCON |= 0x08;                          /* start the ADC conversion */
        while (!(TM2IR & CMI2)) {               /* while index true get data */
            if (s) sample[i] = s;               /* store the adc value */
            else sample[i] = 1;                 /* never enter a zero value */
            i += 8;                             /* move pointer to next value */
```

```c
        while (!(ADCON & 0x10));      /* wait for the conversion */
        ADCON &= ~0x10;               /* clear the interrupt flag */
        s = ADCH;                     /* make a copy of the data */
        ADCON |= 0x08;                /* start the ADC conversion */
    }
    sample[i] = 0;                    /* set the end of data flag */
    while (!(ADCON & 0x10));          /* wait for the conversion */
    ADCON &= ~0x10;                   /* clear the interrupt flag */
    }
}
EA = 1;                               /* all interrupts on */
i = 0;                                /* init data buffer pointer */
p = adac[adisktype].idxfilter;        /* index burst filter value */
while (c = sample[i++]) {             /* process all data values */
    if (c > p) {                      /* test the begin of burst ? */
        if ((sample[i + 1] > p) &&    /* test sample + 1 */
            (sample[i + 2] > p) &&    /* test sample + 2 */
            (sample[i + 3] > p) &&    /* test sample + 3 */
            (sample[i + 4] > p)) break; /* test sample + 4 */
    }
}
if (c > p) {
    i -= 8;                           /* remove the first eight */
    if (i >= 255) c = 250;            /* make an 8 bit value */
    else c = (unsigned char)i;        /* return an 8 bit value */
}
else c = 0;                           /* no value to return */
trackidend();                         /* restore stack values */
}
void trackidend()                     /* restore stack values */
{
    i = stack16[sp16--];              /* restore i */
    t = stack8[sp8--];                /* restore t */
    s = stack8[sp8--];                /* restore s */
    p = stack8[sp8--];                /* restore p */
}
/***********************************************************************

This function will display the last sample buffer on a spare DAC port.

Variables used: q
***********************************************************************
*/
void trackplay()                      /* display last track */
{
    stack16[++sp16] = q;              /* save q */
    if ((side == 0) || (side == 2)) { /* get data for side 0 */
        tickindex0 = 0;               /* clear the index flag */
        while (!tickindex0);          /* wait for index */
        for (q = 0 ; q < SAMPLESIZE ; q++) {  /* sample data until index */
            if (!sample[q]) break;    /* stop when index is found */
```

```c
        ADCON |= 0x08;              /* start the ADC conversion */
        while (!(ADCON & 0x10));    /* wait for the conversion */
        ADCON &= ~0x10;             /* clear the interrupt flag */
        CLP1 = sample[q];           /* display the ADC value */
      }
    }
    else {                          /* get data for side 1 */
      tickindex1 = 0;               /* clear the index flag */
      while (!tickindex1);          /* wait for index */
      for (q = 0 ; q < SAMPLESIZE ; q++) {  /* sample data until index */
        if (!sample[q]) break;      /* stop when index is found */
        ADCON |= 0x08;              /* start the ADC conversion */
        while (!(ADCON & 0x10));    /* wait for the conversion */
        ADCON &= ~0x10;             /* clear the interrupt flag */
        CLP1 = sample[q];           /* display the ADC value */
      }
    }
    q = stack16[sp16--];            /* restore q */
}

/*******************************************************************

This function will clear and rewrite all field labels on the console.

Variables used: none
*******************************************************************
/
void refresh()                      /* refresh the console */
{
    dtrack = 255;                   /* clear display track */
    dtlengthus = 255;               /* clear display index */
    dside = 255;                    /* clear display side */
    didlec = 255;                   /* clear idle loop counter */
    dlastoff = 255;                 /* clear motor last offset */
    dmstate = 255;                  /* clear motor phase state */
    didelay0 = 255;                 /* clear index delay side 0 */
    didelay1 = 255;                 /* clear index delay side 1 */
    lzeroswitch = 255;              /* clear the track zero flag */
    dstpi0 = 0xffff;                /* clear stepper display */
    dstpi1 = 0xffff;                /* clear stepper display */
    dstpi2 = 0xffff;                /* clear stepper display */
    dstpo0 = 0xffff;                /* clear stepper display */
    dstpo1 = 0xffff;                /* clear stepper display */
    dstpo2 = 0xffff;                /* clear stepper display */
    dcur0 = 255;                    /* clear current display */
    dcur1 = 255;                    /* clear current display */
    dcur2 = 255;                    /* clear current display */
    dcur3 = 255;                    /* clear current display */
    dsym0 = 255;                    /* clear asymmetry display */
    dsym1 = 255;                    /* clear asymmetry display */
```

```c
    dsym2 = 255;                    /* clear asymmetry display */
    dsym3 = 255;                    /* clear asymmetry display */
    dclp0 = 255;                    /* clear clip lavel display */
    dclp1 = 255;                    /* clear clip lavel display */
    dclp2 = 255;                    /* clear clip lavel display */
    dclp3 = 255;                    /* clear clip lavel display */
    plabels();                      /* print the bit labels */
    output(LTRACK,"Track =");       /* print track label string */
    output(LSIDE,"Side =");         /* print side label string */
    output(LIDLY0,"lp D0 =");       /* print delay label string */
    output(LIDLY1,"lp D1 =");       /* print delay label string */
    output(LINDEX,"lp us =");       /* print time label string */
    output(LIDLE,"Loops =");        /* print idle label string */
    output(LMOTOR,"Phase =");       /* print motor phase string */
    output(LFFSET,"Value =");       /* print motor phase value */
    output(LERROR,"Errors:");       /* print error list string */
    output(LSIDE0,"Side 0:");       /* print side 0 label */
    output(LSIDE1,"Side 1:");       /* print side 1 label */
    output(LSIDE2,"SDS  0:");       /* print SDS 2 label */
    output(LSIDE3,"SDS  1:");       /* print SDS 2 label */
    output(LISTP3V,"xxxxx");        /* no SDS side 1 value */
    output(LOSTP3V,"xxxxx");        /* no SDS side 1 value */
    output(LISTEP,"Step In");       /* print the motor DAC value */
    output(LOSTEP,"Step Out");      /* print the motor DAC value */
    output(LCRNT,"Current");        /* print the write current */
    output(LSYMM,"Asymmetry");      /* print the head asymmetry */
    output(LCLIP,"Clip");           /* print the clip level */
    perror(PERROR);                 /* print the error list */
}

/*****************************************************************

This function will put a VT100 style cursor position and the string
pointed to by *s into a ring buffer to be sent to the serial device.

Variables used: none
******************************************************************
/
void output(c,s)                    /* output cursor and string */
char *c,*s;                         /* output string */
{
    shortloop();                    /* call short idle loop */
    if (!debug) return;             /* no debug flag no output */
    if (headp > endp) {             /* test for buffer space */
        debug = 0;                  /* switch debug off */
        return;                     /* output buffer is full */
    }
    if (tready) {                   /* output buffer empty ? */
        tready = 0;                 /* clear the empty flag */
        headp = &ring[0];           /* init the buffer pointer */
```

```c
        strcpy(ring,c);                     /* fix cursor address */
        strcat(ring,s);                     /* move data to buffer */
          tailp = &ring[strlen(ring)];      /* init the tail pointer */
        SBUF = *headp++;                    /* output the next char */
      }
      else {                                /* test for buffer space */
        ES0 = 0;                            /* disable serial interrupt */
        strcpy(tailp,c);                    /* append data to buffer */
        tailp += strlen(c);                 /* update the tail pointer */
        strcpy(tailp,s);                    /* append data to buffer */
        tailp += strlen(s);                 /* update the tail pointer */
        ES0 = 1;                            /* enable serial interrupt */
      }
  }

/***********************************************************************
  This function will print the bit labels on the console.

Variables used: none
  **********************************************************************
  /
  void plabels()                            /* update console display */
  {
      output(LCLEAR,"");                    /* clear the console */
      output(LVERS,version);                /* print version string */
      output(LCOPY,cright);                 /* print copyright string */
      output(LSTAT0,"A E C T I S D M W V R");  /* print status header */
      output(LSTAT1,"C R M 0 D T I T G E D");  /* print status header */
      output(LSTAT2,"T R D S X P R R T R Y");  /* print status header */
        output(LSTAT3,"---------------------");  /* print status header */
      if (newversion) output(LVERON,"");    /* output the version flag */
      if (driveready) output(LRDYON,"");    /* output the ready flag */
  }

/***********************************************************************
  This function will update the console display if any new data.

Variables used: c,q
  **********************************************************************
  /
  void update()                             /* update console display */
  {
      stack8[++sp8] = c;                    /* save c */
      stack16[++sp16] = q;                  /* save q */
      c = track / byone;                    /* save some CPU time */
      if (c != dtrack) {                    /* update track display ? */
          dtrack = c;
            sprintf(itoatemp,"%02d",(int)c);
```

```
            output(LTRACKV,itoatemp);
    }
    q = tlengthus;
    if (q != dtlengthus) {                  /* update index display ? */
        dtlengthus = q;
        sprintf(itoatemp,"%05d",q);
        output(LINDEXV,itoatemp);
    }
    c = side;
    if (c != dside) {                       /* update side display ? */
        dside = c;
        sprintf(itoatemp,"%02d",(int)c);
        output(LSIDEV,itoatemp);
    }
    c = idelay0;
    if (c != didelay0) {                    /* update index display ? */
        didelay0 = c;
        sprintf(itoatemp,"%03d",(int)c);
        output(LIDLY0V,itoatemp);
    }
    c = idelay1;
    if (c != didelay1) {                    /* update index display ? */
        didelay1 = c;
        sprintf(itoatemp,"%03d",(int)c);
        output(LIDLY1V,itoatemp);
    }
    c = idlec;
    if (c != didlec) {                      /* update idle display ? */
        didlec = c;
        sprintf(itoatemp,"%03d",(int)c);
        output(LIDLEV,itoatemp);
    }
    c = lastoff;
    if (c != dlastoff) {                    /* update offset display ? */
        dlastoff = c;
        sprintf(itoatemp,"%03d",(int)c);
        output(LFFSETV,itoatemp);
    }
    c = mstate;
    if (c != dmstate) {                     /* update phase display ? */
        dmstate = c;
        sprintf(itoatemp,"%03d",(int)c);
        output(LMOTORV,itoatemp);
    }
    q = tdac[track].stepin0;
    if (q != dstpi0) {                      /* update stepper display ? */
        dstpi0 = q;
        sprintf(itoatemp,"%05d",q);
        output(LISTP0V,itoatemp);
    }
    q = tdac[track].stepin1;
```

```
        if (q != dstpi1) {                      /* update stepper display ? */
            dstpi1 = q;
            sprintf(itoatemp,"%05d",q);
            output(LISTP1V,itoatemp);
        }
        q = tdac[track].stepin2;
        if (q != dstpi2) {                      /* update stepper display ? */
            dstpi2 = q;
            sprintf(itoatemp,"%05d",q);
            output(LISTP2V,itoatemp);
        }
        q = tdac[track].stepout0;
        if (q != dstpo0) {                      /* update stepper display ? */
            dstpo0 = q;
            sprintf(itoatemp,"%05d",q);
            output(LOSTP0V,itoatemp);
        }
        q = tdac[track].stepout1;
        if (q != dstpo1) {                      /* update stepper display ? */
            dstpo1 = q;
            sprintf(itoatemp,"%05d",q);
            output(LOSTP1V,itoatemp);
        }
        q = tdac[track].stepout2;
        if (q != dstpo2) {                      /* update stepper display ? */
            dstpo2 = q;
            sprintf(itoatemp,"%05d",q);
            output(LOSTP2V,itoatemp);
        }
        c = tdac[track].current0;
        if (c != dcur0) {                       /* update current display ? */
            dcur0 = c;
            sprintf(itoatemp,"%03d",(int)c);
            output(LCRNT0V,itoatemp);
        }
        c = tdac[track].current1;
        if (c != dcur1) {                       /* update current display ? */
            dcur1 = c;
            sprintf(itoatemp,"%03d",(int)c);
            output(LCRNT1V,itoatemp);
        }
        c = tdac[track].current2;
        if (c != dcur2) {                       /* update current display ? */
            dcur2 = c;
            sprintf(itoatemp,"%03d",(int)c);
            output(LCRNT2V,itoatemp);
        }
        c = tdac[track].current3;
        if (c != dcur3) {                       /* update current display ? */
```

```c
        dcur3 = c;
            sprintf(itoatemp,"%03d",(int)c);
            output(LCRNT3V,itoatemp);
    }
    c = tdac[track].asymmetry0;
    if (c != dsym0) {                       /* update current display ? */
        dsym0 = c;
            sprintf(itoatemp,"%03d",(int)c);
            output(LSYMM0V,itoatemp);
    }
    c = tdac[track].asymmetry1;
    if (c != dsym1) {                       /* update current display ? */
        dsym1 = c;
            sprintf(itoatemp,"%03d",(int)c);
            output(LSYMM1V,itoatemp);
    }
    c = tdac[track].asymmetry2;
    if (c != dsym2) {                       /* update current display ? */
        dsym2 = c;
            sprintf(itoatemp,"%03d",(int)c);
            output(LSYMM2V,itoatemp);
    }
    c = tdac[track].asymmetry3;
    if (c != dsym3) {                       /* update current display ? */
        dsym3 = c;
            sprintf(itoatemp,"%03d",(int)c);
            output(LSYMM3V,itoatemp);
    }
    c = tdac[track].clip0;
    if (c != dclp0) {                       /* update current display ? */
        dclp0 = c;
            sprintf(itoatemp,"%03d",(int)c);
            output(LCLIP0V,itoatemp);
    }
    c = tdac[track].clip1;
    if (c != dclp1) {                       /* update current display ? */
        dclp1 = c;
            sprintf(itoatemp,"%03d",(int)c);
            output(LCLIP1V,itoatemp);
    }
    c = tdac[track].clip2;
    if (c != dclp2) {                       /* update current display ? */
        dclp2 = c;
            sprintf(itoatemp,"%03d",(int)c);
            output(LCLIP2V,itoatemp);
    }
    c = tdac[track].clip3;
    if (c != dclp3) {                       /* update current display ? */
        dclp3 = c;
            sprintf(itoatemp,"%03d",(int)c);
            output(LCLIP3V,itoatemp);
```

```
        }
    q = stack16[sp16--];                /* restore q */
    c = stack8[sp8--];                  /* restore c */
}

/************************************************************

This function will process all error flags and values.
PERROR 0   Only print the error list.
EERROR 1   Only enter the error into the list.
BERROR 2   Enter the error into the list and print the error list.

Variables used: c
************************************************************
/
void perror(flag)                       /* print error numbers */
data unsigned char flag;                /* print list if set */
{
    stack8[++sp8] = c;                  /* save c */
    if ((flag == 2) || (flag == 1)) {   /* add error to list */
        output(LERR,"*");               /* set the display flag */
        if (errorp > MAXERROR) {        /* error buffer full ? */
            c = 0;                      /* buffer tail pointer */
            errorp = 1;                 /* buffer head pointer */
            while (c < MAXERROR) errors[c++] = errors[errorp++];
            errorp = MAXERROR;          /* fix the error pointer */
        }
        errors[errorp++] = xerror;      /* input new error value */
        xerror = 0;                     /* clear the error flag */
    }
    if ((flag == 2) || (flag == 0)) {   /* add error to list */
        for (c = 0 ; c < errorp ; c++) { /* reprint error list */
            sprintf(addr,"[23;%dH",10 + ((int)c * 3));
            sprintf(itoatemp,",%02d",(int)errors[c]);
            output(addr,itoatemp);      /* output the error string */
        }
    }
    c = stack8[sp8--];                  /* restore c */
}

/************************************************************

This function will process all 1ms idle loop functions.

Variables used: none
************************************************************
/
void idle1ms()                          /* 1 ms idle loop functions */
```

```c
{
    tick1ms = 0;                            /* clear the 1ms flag */
    if (tickindex) {                        /* test for index flag */
        if (ixcounter++ == 1) {             /* limit the CPU load */
            ixcounter = 0;                  /* clear the index counter */
            output(LIDX,"");                /* output the index flag */
        }
        tickindex = 0;                      /* clear the index flag */
    }
    if (dma) {                              /* are we talking to the DMA */
        if (recvcmd) docmddata();           /* do the command and data */
        else dmaxfer();                     /* test for DMA transfer */
        if (sendcmd) putcmddata();          /* output command and data */
    }
    if (!driveready) {                      /* drive is not ready */
        if ((wtrack != 255) && (!failed)) { /* test for drive ready */
            driveready = 1;                 /* set the drive ready flag */
            output(LRDYON,"");              /* output the ready flag */
        }
    }
    else if (failed) {                      /* test for drive not ready */
        driveready = 0;                     /* set the drive ready flag */
        output(LRDYOFF,"");                 /* output the ready flag */
    }
}

/****************************************************************

This function will process all 10ms idle loop functions.

Variables used: none
****************************************************************
/
void idle10ms()                             /* 10 ms idle loop functions */
{
    tick10ms = 0;                           /* clear the 10ms flag */
    if (! --hndms) {                        /* test for 100ms count */
        hndms = 10;                         /* reset the 100ms counter */
        tick100ms = 1;                      /* set the 100ms tick flag */
    }
    if (! --onesec) {                       /* test for 1sec count */
        onesec = 100;                       /* reset the 1sec counter */
        tick1s = 1;                         /* set the 1sec tick flag */
    }
    if (IOP1 & T0SW) {                      /* is the switch on ? */
        if (!lzeroswitch) output(LT0SON,""); /* turn on display flag */
        lzeroswitch = 1;                    /* set our flag */
    }
    else {
        if (lzeroswitch) output(LT0SOFF,""); /* turn on display flag */
```

```c
        lzeroswitch = 0;              /* clear our flag */
    }
    if (motoron) {
        iop0 |= MTON;                 /* turn the drive motor on */
        IOP0 = iop0;                  /* output the new bits */
    }
}
```

/*****************************************************************

This function will process all 100ms idle loop functions.

Variables used: none
*****************************************************************
/

```c
void idle100ms()                      /* 100 ms idle loop functions */
{
    tick100ms = 0;                    /* clear the 100ms flag */
    if (xerror) perror(BERROR);       /* print the error message */
    idlec = (unsigned char)(idlecount / 100);  /* save the idle counter */
    idlecount = 0;                    /* reset the idle counter */
}
```

/*****************************************************************

This function will process all 1 second idle loop functions.
Variables used: none
*****************************************************************
/

```c
void idle1s()                         /* 1 sec idle loop functions */
{
    tick1s = 0;                       /* clear the 1sec flag */
    output(LHEART,"");                /* clear the display flag */
    if (sportok) update();            /* updata console display */
    if (!dma) {                       /* this is for tdebug */
        dma = 1;                      /* try the dma every second */
        dmastate = 0;                 /* reset the DMA status */
    }
    if (motoron) motoron--;           /* count the timer down */
    else {                            /* time to stop motor */
        iop0 &= ~MTON;                /* turn the drive motor off */
        IOP0 = iop0;                  /* output the new bits */
    }
}
```

/*****************************************************************

This function will process all DMA command and data traffic.

Variables used: p,t

```c
/*************************************************************/
void dmaxfer()                  /* test for DMA transfer */
{
    stack8[++sp8] = p;          /* save p */
    stack8[++sp8] = t;          /* save t */
    p = 1;                      /* if set then keep going */
    while (p) {                 /* still talking to DMA ? */
        p = 0;                  /* clear repeat flag */
        t = 0;                  /* init wait counter */
         switch (dmastate) {    /* switch to current state */
         case 0:                /* init port for read state */
            dma = 1;             /* turn on the DMA flag */
            dmastate = 1;        /* next DMA state */
            iop1 &= 0xf0;        /* TCLK,TDAT,TACK,TREQ off */
            IOP1 = iop1;         /* output the data, and next */
         case 1:                 /* test for a request signal */
            if (!(IOP0 & RREQ)) {  /* test for DMA REQ low */
                iop1 |= TACK;       /* set TACK true */
                IOP1 = iop1;        /* output new value */
                while ((--t) && (!(IOP0 & RREQ)));
                iop1 &= 0xf0;       /* TCLK,TDAT,TACK,TREQ off */
                IOP1 = iop1;        /* output the hardware data */
                if (!t) {           /* timeout error (RREQ low) */
                    dma = 0;         /* no DMA to talk with */
                    dmastate = 0;    /* reset state counter */
                }
                else {              /* DMA wants something */
                    getcmddata();    /* get command and data */
                    p = 1;           /* set the repeat flag */
                }
            }
            break;                 /* do we have data to send ? */
         default:                  /* undefined state */
            dmastate = 0;           /* clear the DMA state */
            break;
        }
    }
    t = stack8[sp8--];          /* restore t */
    p = stack8[sp8--];          /* restore p */
}

/*************************************************************/
```

This function will output the command and data to the DMA software.

Variables used: t,p

/*

```c
void putcmddata()                                       /* get command and data */
{
    if (!(IOP0 & RREQ)) {                               /* test for DMA REQ low */
        dmaxfer();                                      /* test for DMA transfer */
        return;                                         /* this is more important */
    }
    stack8[++sp8] = t;                                  /* save t */
    stack8[++sp8] = p;                                  /* save p */
    iop1 |= TREQ;                                       /* set request true */
    IOP1 = iop1;                                        /* output the data bits */
    t = 0;                                              /* clear the timeout counter */
    while ((--t) && (IOP0 & RACK));                     /* wait for DMA ACK go low */
    if (!t) {                                           /* we have a timeout error */
        p = stack8[sp8--];                              /* restore p */
        t = stack8[sp8--];                              /* restore t */
        xerror = DMASENDERR;                            /* DMA data send error */
        perror(EERROR);                                 /* record the error */
        return;                                         /* input command ready */
    }
    iop1 &= 0xf0;                                       /* TCLK,TDAT,TACK,TREQ off */
    IOP1 = iop1;                                        /* output the hardware data */
    t = 0;                                              /* clear the timeout counter */
    while ((--t) && (!(IOP0 & RACK)));                  /* wait for DMA ACK go high */
    if (!t) {                                           /* we have a timeout error */
        p = stack8[sp8--];                              /* restore p */
        t = stack8[sp8--];                              /* restore t */
        xerror = DMASENDERR;                            /* DMA data send error */
        perror(EERROR);                                 /* record the error */
        return;                                         /* input command ready */
    }
    for (p = 0 ; p < 8 ; p++) {                         /* put 8 bits of command */
        if (sendcmd & 0x80) {                           /* test MSB for true */
            iop1 |= TDAT;                               /* set output data true */
            IOP1 = iop1;                                /* output the bits */
        }
        else {                                          /* MSB must be false */
            iop1 &= ~TDAT;                              /* set output data false */
            IOP1 = iop1;                                /* output the bits */
        }
        sendcmd <<= 1;                                  /* shift one bit left */
        iop1 |= TCLK;                                   /* set output clock true */
        IOP1 = iop1;                                    /* output the bits */
        t = 0;                                          /* clear the timeout counter */
        while ((--t) && (IOP0 & RACK));                 /* wait for DMA ACK go low */
        if (!t) break;                                  /* we have a timeout error */
        iop1 &= ~TCLK;                                  /* set output clock false */
        IOP1 = iop1;                                    /* output the bits */
        t = 0;                                          /* clear the timeout counter */
        while ((--t) && (!(IOP0 & RACK)));              /* wait for DMA ACK go high */
        if (!t) break;                                  /* we have a timeout error */
```

```c
    }
    if (t) {
        for (p = 0 ; p < 8 ; p++) {          /* put 8 bits of data */
            if (senddata & 0x80) {            /* test MSB for true */
                iop1 |= TDAT;                  /* set output data true */
                IOP1 = iop1;                   /* output the bits */
            }
            else {                             /* MSB must be false */
                iop1 &= ~TDAT;                 /* set output data false */
                IOP1 = iop1;                   /* output the bits */
            }
            senddata <<= 1;                    /* shift one bit left */
            iop1 |= TCLK;                      /* set output clock true */
            IOP1 = iop1;                       /* output the bits */
            t = 0;                             /* clear the timeout counter */
            while ((--t) && (IOP0 & RACK));    /* wait for DMA ACK go low */
            if (!t) break;                     /* we have a timeout error */
            iop1 &= ~TCLK;                     /* set output clock false */
            IOP1 = iop1;                       /* output the bits */
            t = 0;                             /* clear the timeout counter */
            while ((--t) && (!(IOP0 & RACK))); /* wait for DMA ACK go high */
            if (!t) break;                     /* we have a timeout error */
        }
    }
    if (!t) {                                  /* we have a timeout error */
        iop1 &= 0xf0;                          /* TCLK,TDAT,TACK,TREQ off */
        IOP1 = iop1;                           /* output the hardware data */
        xerror = DMASENDERR;                   /* DMA data send error */
        perror(EERROR);                        /* record the error */
    }
    p = stack8[sp8--];                         /* restore p */
    t = stack8[sp8--];                         /* restore t */
}

/****************************************************************

This function will input the command and data from the DMA software.

Variables used: t,p
****************************************************************
/
void getcmddata()                              /* get command and data */
{
    stack8[++sp8] = t;                         /* save t */
    stack8[++sp8] = p;                         /* save p */
    recvcmd = 0;                               /* clear input command */
    recvdata = 0;                              /* clear input data value */
    for (p = 0 ; p < 8 ; p++) {                /* get 8 bits of command */
        t = 0;                                 /* clear the timeout counter */
```

```c
        while ((--t) && (IOP0 & RCLK));         /* wait for DMA CLK go low */
        if (!t) break;                          /* we have a timeout error */
        recvcmd <<= 1;                          /* shift one bit left */
        recvcmd &= 0xfe;                        /* clear LSB bit value */
        if (!(IOP0 & RDAT)) recvcmd |= 1;       /* LSB of command was true */
        iop1 |= TACK;                           /* set TACK true */
        IOP1 = iop1;                            /* output new value */
        t = 0;                                  /* clear the timeout counter */
        while ((--t) && (!(IOP0 & RCLK)));      /* wait for DMA CLK go high */
        if (!t) break;                          /* we have a timeout error */
        iop1 &= 0xf0;                           /* TCLK,TDAT,TACK,TREQ off */
        IOP1 = iop1;                            /* output the hardware data */
    }
    if (t) {
        for (p = 0 ; p < 8 ; p++) {             /* get 8 bits of data */
            t = 0;                              /* clear the timeout counter */
            while ((--t) && (IOP0 & RCLK));     /* wait for DMA CLK go low */
            if (!t) break;                      /* we have a timeout error */
            recvdata &= 0xfe;                   /* clear LSB bit value */
            if (!(IOP0 & RDAT)) recvdata |= 1;  /* LSB of command was true */
            iop1 |= TACK;                       /* set TACK true */
            IOP1 = iop1;                        /* output new value */
            recvdata <<= 1;                     /* shift data one bit left */
            t = 0;                              /* clear the timeout counter */
            while ((--t) && (!(IOP0 & RCLK)));  /* wait for DMA CLK go high */
            if (!t) break;                      /* we have a timeout error */
            iop1 &= 0xf0;                       /* TCLK,TDAT,TACK,TREQ off */
            IOP1 = iop1;                        /* output the hardware data */
        }
    }
    if (!t) {                                   /* we have a timeout error */
        iop1 &= 0xf0;                           /* TCLK,TDAT,TACK,TREQ off */
        IOP1 = iop1;                            /* output the hardware data */
        recvcmd = 0;                            /* clear input command */
        recvdata = 0;                           /* clear input data value */
    }
    p = stack8[sp8--];                          /* restore p */
    t = stack8[sp8--];                          /* restore t */
}

/*******************************************************************

This function will process the command and data from the DMA software.

Variables used: i,c
*******************************************************************
/
void docmddata()                                /* do the command and data */
```

```c
{
    stack8[++sp8] = c;                      /* save c */
    stack16[++sp16] = i;                    /* save i */
    switch (recvcmd) {
    case NOCOMMAND:                         /* null command, nothing */
        break;
    case CTESTING:                          /* test command, nothing */
        sendcmd = CTESTING;                 /* return the test command */
        senddata = 0;                       /* no data to return */
        break;
    case SEEK:                              /* seek to track command */
        if ((recvdata < maxtrack) && (recvdata != 0)) {
            seektrack = recvdata;           /* seek to track */
        }
        else {                              /* we have an error */
            sendcmd = CMDERROR;             /* return the test command */
            senddata = 0;                   /* no data to return */
        }
        break;
    case STEPIN:                            /* step in one track */
        if (seektrack < maxtrack) {         /* test for room to step in */
            seektrack += byone;             /* track = track + 1 */
        }
        break;
    case STEPOUT:                           /* step out one track */
        if (seektrack > 0) {                /* test for room to step out */
            seektrack -= byone;             /* track = track - 1 */
        }
        break;
    case USTEPIN:                           /* ustep in one track */
        break;
    case USTEPOUT:                          /* ustep out one track */
        break;
    case RESTORE:                           /* restore head to track zero */
        seektrack = 255;                    /* set motor home flag */
        break;
    case RUNRADIAL:                         /* run the radial alignment */
        doradial();                         /* go do alignment process */
        break;
    case RADSIDE0:                          /* request radial side 0 */
        break;
    case RADSIDE1:                          /* request radial side 1 */
        break;
    case GETRDATA:                          /* request the raw track data */
        break;
    case RALGNSIDE0:                        /* request full data side 0 */
        doradial();                         /* go do alignment process */
        sendcmd = RALGNSIDE0;               /* sending radial data */
        senddata = rcent0;                  /* send side 0 radial % */
        putcmddata();                       /* send command and data DMA */
        sendcmd = RALGNSIDE0;               /* sending radial data */
```

```
        senddata = rcent1;              /* send side 1 radial % */
        putcmddata();                   /* send command and data DMA */
        i = 0;                          /* set the pointer to zero */
         while (c = sample[i++]) {      /* send the track buffer */
            sendcmd = RALGNSIDE0;       /* sending radial data */
            senddata = c;               /* send next sample value */
            putcmddata();               /* send command and data DMA */
         }
        sendcmd = DATAEND;              /* end of radial data */
        senddata = 0;                   /* send this for now */
        putcmddata();                   /* send command and data DMA */
        break;
     case RALGNSIDE1:                   /* request full data side 1 */
        doradial();                     /* go do alignment process */
        sendcmd = RALGNSIDE0;           /* sending radial data */
        senddata = rcent0;              /* send side 0 radial % */
        putcmddata();                   /* send command and data DMA */
        sendcmd = RALGNSIDE0;           /* sending radial data */
        senddata = rcent1;              /* send side 1 radial % */
        putcmddata();                   /* send command and data DMA */
        i = 0;                          /* set the pointer to zero */
         while (c = sample[i++]) {      /* send the track buffer */
            sendcmd = RALGNSIDE0;       /* sending radial data */
            senddata = c;               /* send next sample value */
            putcmddata();               /* send command and data DMA */
         }
        sendcmd = DATAEND;              /* end of radial data */
        senddata = 0;                   /* send this for now */
        putcmddata();                   /* send command and data DMA */
        break;
     case SETDTYPE:                     /* set the drive type */
        drivetype = recvdata;           /* set drive type */
        break;
     case REQVER:                       /* request software version */
        c = 0;                          /* reset char pointer */
         while (version[c]) {           /* send the software version */
            sendcmd = REQVER;           /* sending software version */
            senddata = version[c++];    /* send char from string */
            putcmddata();               /* send command and data DMA */
         }
        break;
     case REQCNT:                       /* request disks duplicated */
        break;
     case CLRERRORS:                    /* clear the error list */
        errorp = 0;                     /* clear the error pointer */
        break;
     case CLEARCNT:                     /* clear the disk counter */
        break;
     case CPURESET:                     /* reset the drive CPU */
     case LOADSOFT:                     /* load new software version */
        IOP0 = WDOG;                    /* watchdog reset enabled */
```

```c
        PCON |= 0x10;              /* set the condition flag */
        T3 = 0xff;                 /* reset the counter (2ms) */
        for(;;);                   /* wait for the reset */
        break;
    case ADTYPE:                   /* set alignment disk type */
        adisktype = recvdata;      /* get the alignment type */
        break;
    case RITOILEN:                 /* req index to index in us */
        break;
    case RIJITTER:                 /* req index jitter in us */
        break;
    case RUNAMPLIT:                /* run the track amplitude */
        break;
    case RAMPSIDE0:                /* request amplitude side 0 */
        break;
    case RAMPSIDE1:                /* request amplitude side 1 */
        break;
    case GETRADATA:                /* request the raw track data */
        break;
    case RFAMPSIDE0:               /* request full data side 0 */
        break;
    case RFAMPSIDE1:               /* request full data side 1 */
        break;
    default:                       /* Error: Bad command ? */
        sendcmd = CMDERROR;        /* return the command error */
        senddata = 0;              /* no data to return */
        break;
    }
    recvcmd = 0;                   /* clear the input command */
    recvdata = 0;                  /* clear the input data */
    i = stack16[sp16--];           /* restore i */
    c = stack8[sp8--];             /* restore c */
}
```

/*********************************************************************

This function will halt the program. A bad error has been detected.

Variables used: none
*********************************************************************
/
```c
void halt()                        /* feed the watch dog */
{
    IEN0 = 0;                      /* all interrupts off */
    IEN1 = 0;                      /* all interrupts off */
    for(;;) watchdog();            /* keep feeding the dog */
}
```

/*********************************************************************

This function will reset the watchdog timer with the maximum count of 510ms. This function must be called to prevent a program reset.

Variables used: none
`*************************************************************`
/
```c
void watchdog()                       /* feed the watch dog */
{
    PCON |= 0x10;                     /* set the condition flag */
    T3 = 0;                           /* reset the counter (510ms) */
}
```

`/*************************************************************`

This function will do all track zero tests.

Variables used: none
`*************************************************************`
/
```c
void trackzero()
{

}
```
`/*************************************************************`

This function will move the stepper motor in track steps, and set the DAC values after the step.

Variables used: c
`*************************************************************`
/
```c
void smotor()                         /* move the stepper motor */
{
    stack8[++sp8] = c;                /* save c */
    if (seektrack > MAXTRACK) {       /* motor home command */
        custep = 1000;                /* force a known location */
        lustep = 1000;                /* make the last place here */
        while (IOP1 & T0SW) {         /* is the zero switch on ? */
            custep += 400;            /* move out until no swtich */
            if (custep > 4000) {      /* test failed! */
                xerror = T0SON;       /* track zero failed */
                perror(EERROR);       /* log the error message */
                return;               /* stepper motor failed */
            }
            ustepmotor();             /* move the stepper motor */
        }
        seektrack = maxtrack;         /* set to last track */
        track = maxtrack;             /* also set to last track */
        mstate = zstate;              /* init stepper motor state */
```

```c
        lastoff = zoffset;                      /* fix the motor zero offset */
        lustep = tdac[seektrack].stepout0;      /* only side 0 stepout is OK */
    onzero = 0;                                 /* we know this is not zero */
    if (wtrack == 255) c = 0;                   /* we are not aligned yet */
    else c = wtrack;                            /* init track zero counter */
        while ((seektrack) && (!onzero)) {      /* step out until track zero */
            seektrack -= byone;                 /* seektrack less one step */
            custep = tdac[seektrack].stepout0;  /* only side 0 stepout is OK */
            while (custep < lustep) {           /* are we there yet ? */
                stepout();                      /* step out one track */
                if (IOP1 & T0SW) {              /* is the zero switch on ? */
                    if (c) c--;                 /* still more steps to zero */
                    else onzero = 1;            /* set the on zero flag */
                }
            }
        }
    }
    seektrack = 0;                              /* reset the seek counter */
    track = 0;                                  /* reset the track counter */
        lustep = tdac[seektrack].stepout0;      /* find our ustep value */
        switch (side) {                         /* load ustep value for side */
        case 0:                                 /* load ustep for side 0 */
            custep = tdac[seektrack].stepout0;
            break;
        case 1:                                 /* load ustep for side 1 */
            custep = tdac[seektrack].stepout1;
            break;
        case 2:                                 /* load ustep for SDS */
            custep = tdac[seektrack].stepout2;
            break;
        }
        ustepmotor();                           /* move the stepper motor */
}
  else if (seektrack < track) {                 /* step out command */
    output(LDIROUT,"");                         /* output step out flag */
    direction = 1;                              /* set direction to step out */
    switch (side) {                             /* load ustep value for side */
    case 0:                                     /* load ustep for side 0 */
        custep = tdac[seektrack].stepout0;
        break;
    case 1:                                     /* load ustep for side 1 */
        custep = tdac[seektrack].stepout1;
        break;
    case 2:                                     /* load ustep for SDS */
        custep = tdac[seektrack].stepout2;
        break;
    }
    while (custep < lustep) {                   /* are we there yet ? */
        shortloop();                            /* call short idle loop */
        stepout();                              /* step out one track */
        trackzero();                            /* do the track zero test */
    }
}
```

```
        }
        else {                              /* step in command */
            output(LDIRIN,"");              /* output step in flag */
            direction = 0;                  /* set direction to step in */
            switch (side) {                 /* load ustep value for side */
            case 0:                         /* load ustep for side 0 */
                custep = tdac[seektrack].stepin0;
                break;
            case 1:                         /* load ustep for side 1 */
                custep = tdac[seektrack].stepin1;
                break;
            case 2:                         /* load ustep for SDS */
                custep = tdac[seektrack].stepin2;
                break;
            }
            while (custep > lustep) {       /* are we there yet ? */
                shortloop();                /* call short idle loop */
                stepin();                   /* step out one track */
                trackzero();                /* do the track zero test */
            }
        }
        track = seektrack;                  /* head is in position */
        updatedacs();                       /* update the drive DACS */
        output(LSTP,"");                    /* blink the console display */
        c = stack8[sp8--];                  /* restore c */
}

/******************************************************************************

This function will move the stepper motor in usteps, and set the
DAC values after the step. If the kickit flag is set to 1, then move out
KICKBACK usteps before moving to ustep position. If the kickit flag is
set to 2, then move in KICKBACK usteps before moving to ustep position.
if kickit is set to either 3 or 4, then move in whole steps.

Variables used: none
******************************************************************************
/
void ustepmotor()                           /* move the stepper motor */
{
    if (custep < lustep) {                  /* step out command */
        output(LDIROUT,"");                 /* output step out flag */
        direction = 1;                      /* set direction to step out */
        while (custep < lustep) ustepout(); /* step out one ustep */
    }
    else {                                  /* step in command */
        output(LDIRIN,"");                  /* output step in flag */
        direction = 0;                      /* set direction to step in */
        while (custep > lustep) ustepin();  /* step in one ustep */
    }
```

```c
        switch (kickit) {                          /* test for special step */
        case 0:                                    /* no kick stepping */
          break;
        case 1:
            custep -= KICKBACK;                    /* move out KICKBACK usteps */
                while (custep < lustep) ustepout();  /* step out one ustep */
            custep += KICKBACK;                    /* move in KICKBACK usteps */
                while (custep > lustep) ustepin();   /* step in one ustep */
            break;
        case 2:
            custep += KICKBACK;                    /* move in KICKBACK usteps */
                while (custep > lustep) ustepin();   /* step in one ustep */
            custep -= KICKBACK;                    /* move out KICKBACK usteps */
                while (custep < lustep) ustepout();  /* step out one ustep */
            break;
        case 3:
            custep -= ONESTEP * byone;             /* move out one full step */
                while (custep < lustep) ustepout();  /* step out one step */
            custep += ONESTEP * byone;             /* move in one full step */
                while (custep > lustep) ustepin();   /* step in one step */
            break;
        case 4:
            custep += ONESTEP * byone;             /* move in one full step */
                while (custep > lustep) ustepin();   /* step in one step */
            custep -= ONESTEP * byone;             /* move out one full step */
                while (custep < lustep) ustepout();  /* step out one step */
            break;
        }
}

/************************************************************************

This function will move the stepper motor one track out.

Variables used: q,i,r,c
*************************************************************************
/
void stepout()                                     /* step one track out */
{
    stack8[++sp8] = c;                             /* save c */
    stack16[++sp16] = i;                           /* save i */
    stack16[++sp16] = q;                           /* save q */
    stack16[++sp16] = r;                           /* save r */
    i = lustep;                                    /* make a local value */
    c = lastoff;                                   /* get the last motor offset */
    q = i - custep;                                /* find how far to ustep */
    r = q / USTEPS;                                /* find the number of groups */
    switch (mstate) {                              /* find the last motor state */
    case 0:                                        /* PH = 1  A/-B = 1 first */
        while (r) {                                /* while counting phase down */
```

```
            r--;                    /* count down the groups */
            c -= USTEPS;            /* move in groups of usteps */
            i -= USTEPS;            /* update local ustep counter */
            q -= USTEPS;            /* count down ustep number */
            if (c > 0x7e) {         /* are we at the end ? */
                mstate = 1;         /* next motor state */
                c = (0xff - c) + 1; /* next motor offset */
                MD10 = c;           /* move motor to next phase */
                MD10 = c | 0x80;    /* clear the motor strobe */
                break;              /* done with this phase */
            }
            MD11 = c;               /* output the motor value */
            MD11 = c | 0x80;        /* clear the motor strobe */
        }
        if (!r) {
            i -= q;                 /* last number of usteps */
            c -= q;                 /* find the last position */
            MD11 = c;               /* last motor current */
            MD11 = c | 0x80;        /* clear the motor strobe */
        }
        lustep = i;                 /* update the ustep counter */
        lastoff = c;                /* update last motor offset */
        break;                      /* done with this phase */
    case 1:                         /* PH = 0  A/-B = 1 */
        while (r) {                 /* while counting phase down */
            r--;                    /* count down the groups */
            c += USTEPS;            /* move in groups of usteps */
            i -= USTEPS;            /* update local ustep counter */
            q -= USTEPS;            /* count down ustep number */
            if (c > 0x7f) {         /* are we at the end ? */
                mstate = 2;         /* next motor state */
                c = 0x7e - (c - 0x7f); /* next motor offset */
                MD00 = c;           /* move motor to next phase */
                MD00 = c | 0x80;    /* clear the motor strobe */
                break;              /* done with this phase */
            }
            MD10 = c;               /* output the motor value */
            MD10 = c | 0x80;        /* clear the motor strobe */
        }
        if (!r) {
            i -= q;                 /* last number of usteps */
            c += q;                 /* find the last position */
            MD10 = c;               /* last motor current */
            MD10 = c | 0x80;        /* clear the motor strobe */
        }
        lustep = i;                 /* update the ustep counter */
        lastoff = c;                /* update last motor offset */
        break;                      /* done with this phase */
    case 2:                         /* PH = 1  A/-B = 1 first */
        while (r) {                 /* while counting phase down */
            r--;                    /* count down the groups */
```

```c
            c -= USTEPS;           /* move in groups of usteps */
            i -= USTEPS;           /* update local ustep counter */
            q -= USTEPS;           /* count down ustep number */
            if (c > 0x7e) {        /* are we at the end ? */
                mstate = 3;        /* next motor state */
                c = (0xff - c) + 1; /* next motor offset */
                MD01 = c;          /* move motor to next phase */
                MD01 = c | 0x80;   /* clear the motor strobe */
                break;             /* done with this phase */
            }
            MD00 = c;              /* output the motor value */
            MD00 = c | 0x80;       /* clear the motor strobe */
        }
        if (!r) {
            i -= q;                /* last number of usteps */
            c -= q;                /* find the last position */
            MD00 = c;              /* last motor current */
            MD00 = c | 0x80;       /* clear the motor strobe */
        }
        lustep = i;                /* update the ustep counter */
        lastoff = c;               /* update last motor offset */
        break;                     /* done with this phase */
    case 3:                        /* PH = 0  A/-B = 1 */
        while (r) {                /* while counting phase down */
            r--;                   /* count down the groups */
            c += USTEPS;           /* move in groups of usteps */
            i -= USTEPS;           /* update local ustep counter */
            q -= USTEPS;           /* count down ustep number */
            if (c > 0x7f) {        /* are we at the end ? */
                mstate = 4;        /* next motor state */
                c = 0x7e - (c - 0x7f); /* next motor offset */
                MD10 = c;          /* move motor to next phase */
                MD10 = c | 0x80;   /* clear the motor strobe */
                break;             /* done with this phase */
            }
            MD01 = c;              /* output the motor value */
            MD01 = c | 0x80;       /* clear the motor strobe */
        }
        if (!r) {
            i -= q;                /* last number of usteps */
            c += q;                /* find the last position */
            MD01 = c;              /* last motor current */
            MD01 = c | 0x80;       /* clear the motor strobe */
        }
        lustep = i;                /* update the ustep counter */
        lastoff = c;               /* update last motor offset */
        break;                     /* done with this phase */
    case 4:                        /* PH = 1  A/-B = 1 first */
        while (r) {                /* while counting phase down */
            r--;                   /* count down the groups */
            c -= USTEPS;           /* move in groups of usteps */
```

```
            i -= USTEPS;              /* update local ustep counter */
            q -= USTEPS;              /* count down ustep number */
            if (c > 0x7e) {           /* are we at the end ? */
                mstate = 5;           /* next motor state */
                c = (0xff - c) + 1;   /* next motor offset */
                MD11 = c;             /* move motor to next phase */
                MD11 = c | 0x80;      /* clear the motor strobe */
                break;                /* done with this phase */
            }
            MD10 = c;                 /* output the motor value */
            MD10 = c | 0x80;          /* clear the motor strobe */
        }
        if (!r) {
            i -= q;                   /* last number of usteps */
            c -= q;                   /* find the last position */
            MD10 = c;                 /* last motor current */
            MD10 = c | 0x80;          /* clear the motor strobe */
        }
        lustep = i;                   /* update the ustep counter */
        lastoff = c;                  /* update last motor offset */
        break;                        /* done with this phase */
    case 5:                           /* PH = 0 A/-B = 1 */
        while (r) {                   /* while counting phase down */
            r--;                      /* count down the groups */
            c += USTEPS;              /* move in groups of usteps */
            i -= USTEPS;              /* update local ustep counter */
            q -= USTEPS;              /* count down ustep number */
            if (c > 0x7f) {           /* are we at the end ? */
                mstate = 6;           /* next motor state */
                c = 0x7e - (c - 0x7f);/* next motor offset */
                MD01 = c;             /* move motor to next phase */
                MD01 = c | 0x80;      /* clear the motor strobe */
                break;                /* done with this phase */
            }
            MD11 = c;                 /* output the motor value */
            MD11 = c | 0x80;          /* clear the motor strobe */
        }
        if (!r) {
            i -= q;                   /* last number of usteps */
            c += q;                   /* find the last position */
            MD11 = c;                 /* last motor current */
            MD11 = c | 0x80;          /* clear the motor strobe */
        }
        lustep = i;                   /* update the ustep counter */
        lastoff = c;                  /* update last motor offset */
        break;                        /* done with this phase */
    case 6:                           /* PH = 1 A/-B = 1 first */
        while (r) {                   /* while counting phase down */
            r--;                      /* count down the groups */
            c -= USTEPS;              /* move in groups of usteps */
```

```
            i -= USTEPS;              /* update local ustep counter */
            q -= USTEPS;              /* count down ustep number */
            if (c > 0x7e) {           /* are we at the end ? */
                mstate = 7;           /* next motor state */
                c = (0xff - c) + 1;   /* next motor offset */
                MD00 = c;             /* move motor to next phase */
                MD00 = c | 0x80;      /* clear the motor strobe */
                break;                /* done with this phase */
            }
            MD01 = c;                 /* output the motor value */
            MD01 = c | 0x80;          /* clear the motor strobe */
        }
        if (!r) {
            i -= q;                   /* last number of usteps */
            c -= q;                   /* find the last position */
            MD01 = c;                 /* last motor current */
            MD01 = c | 0x80;          /* clear the motor strobe */
        }
        lustep = i;                   /* update the ustep counter */
        lastoff = c;                  /* update last motor offset */
        break;                        /* done with this phase */
    case 7:                           /* PH = 0  A/-B = 1 */
        while (r) {                   /* while counting phase down */
            r--;                      /* count down the groups */
            c += USTEPS;              /* move in groups of usteps */
            i -= USTEPS;              /* update local ustep counter */
            q -= USTEPS;              /* count down ustep number */
            if (c > 0x7f) {           /* are we at the end ? */
                mstate = 0;           /* next motor state */
                c = 0x7e - (c - 0x7f); /* next motor offset */
                MD11 = c;             /* move motor to next phase */
                MD11 = c | 0x80;      /* clear the motor strobe */
                break;                /* done with this phase */
            }
            MD00 = c;                 /* output the motor value */
            MD00 = c | 0x80;          /* clear the motor strobe */
        }
        if (!r) {
            i -= q;                   /* last number of usteps */
            c += q;                   /* find the last position */
            MD00 = c;                 /* last motor current */
            MD00 = c | 0x80;          /* clear the motor strobe */
        }
        lustep = i;                   /* update the ustep counter */
        lastoff = c;                  /* update last motor offset */
        break;                        /* done with this phase */
    }
    r = stack16[sp16--];              /* restore r */
    q = stack16[sp16--];              /* restore q */
    i = stack16[sp16--];              /* restore i */
    c = stack8[sp8--];                /* restore c */
}
```

```c
/*****************************************************************

This function will move the stepper motor one track in.

Variables used: q,i,r,c
*****************************************************************
/
void stepin()                           /* step one track in */
{
    stack8[++sp8] = c;                  /* save c */
    stack16[++sp16] = i;                /* save i */
    stack16[++sp16] = q;                /* save q */
    stack16[++sp16] = r;                /* save r */
    i = lustep;                         /* make a local value */
    c = lastoff;                        /* get the last motor offset */
    q = custep - i;                     /* find how far to ustep */
    r = q / USTEPS;                     /* find the number of groups */
    switch (mstate) {                   /* find the last motor state */
    case 7:                             /* PH = 1  A/-B = 1 first */
        while (r) {                     /* while counting phase down */
            r--;                        /* count down the groups */
            c -= USTEPS;                /* move in groups of usteps */
            i += USTEPS;                /* update local ustep counter */
            q -= USTEPS;                /* count down ustep number */
            if (c > 0x7f) {             /* are we at the end ? */
                mstate = 6;             /* next motor state */
                c = (0xff - c) + 1;     /* next motor offset */
                MD01 = c;               /* move motor to next phase */
                MD01 = c | 0x80;        /* clear the motor strobe */
                break;                  /* done with this phase */
            }
            MD00 = c;                   /* output the motor value */
            MD00 = c | 0x80;            /* clear the motor strobe */
        }
        if (!r) {
            i += q;                     /* last number of usteps */
            c -= q;                     /* find the last position */
            MD00 = c;                   /* last motor current */
            MD00 = c | 0x80;            /* clear the motor strobe */
        }
        lustep = i;                     /* update the ustep counter */
        lastoff = c;                    /* update last motor offset */
        break;                          /* done with this phase */
    case 6:                             /* PH = 0  A/-B = 1 */
        while (r) {                     /* while counting phase down */
            r--;                        /* count down the groups */
            c += USTEPS;                /* move in groups of usteps */
            i += USTEPS;                /* update local ustep counter */
            q -= USTEPS;                /* count down ustep number */
            if (c > 0x7f) {             /* are we at the end ? */
```

```
            mstate = 5;                  /* next motor state */
            c = 0x7e - (c - 0x7f);       /* next motor offset */
            MD11 = c;                    /* move motor to next phase */
            MD11 = c | 0x80;             /* clear the motor strobe */
            break;                       /* done with this phase */
        }
        MD01 = c;                        /* output the motor value */
        MD01 = c | 0x80;                 /* clear the motor strobe */
    }
    if (!r) {
        i += q;                          /* last number of usteps */
        c += q;                          /* find the last position */
        MD01 = c;                        /* last motor current */
        MD01 = c | 0x80;                 /* clear the motor strobe */
    }
    lustep = i;                          /* update the ustep counter */
    lastoff = c;                         /* update last motor offset */
    break;                               /* done with this phase */
case 5:                                  /* PH = 1 A/-B = 1 first */
    while (r) {                          /* while counting phase down */
        r--;                             /* count down the groups */
        c -= USTEPS;                     /* move in groups of usteps */
        i += USTEPS;                     /* update local ustep counter */
        q -= USTEPS;                     /* count down ustep number */
        if (c > 0x7f) {                  /* are we at the end ? */
            mstate = 4;                  /* next motor state */
            c = (0xff - c) + 1;          /* next motor offset */
            MD10 = c;                    /* move motor to next phase */
            MD10 = c | 0x80;             /* clear the motor strobe */
            break;                       /* done with this phase */
        }
        MD11 = c;                        /* output the motor value */
        MD11 = c | 0x80;                 /* clear the motor strobe */
    }
    if (!r) {
        i += q;                          /* last number of usteps */
        c -= q;                          /* find the last position */
        MD11 = c;                        /* last motor current */
        MD11 = c | 0x80;                 /* clear the motor strobe */
    }
    lustep = i;                          /* update the ustep counter */
    lastoff = c;                         /* update last motor offset */
    break;                               /* done with this phase */
case 4:                                  /* PH = 0 A/-B = 1 */
    while (r) {                          /* while counting phase down */
        r--;                             /* count down the groups */
        c += USTEPS;                     /* move in groups of usteps */
        i += USTEPS;                     /* update local ustep counter */
        q -= USTEPS;                     /* count down ustep number */
        if (c > 0x7f) {                  /* are we at the end ? */
```

```
            mstate = 3;                     /* next motor state */
            c = 0x7e - (c - 0x7f);          /* next motor offset */
            MD01 = c;                       /* move motor to next phase */
            MD01 = c | 0x80;                /* clear the motor strobe */
            break;                          /* done with this phase */
        }
        MD10 = c;                           /* output the motor value */
        MD10 = c | 0x80;                    /* clear the motor strobe */
    }
    if (!r) {
        i += q;                             /* last number of usteps */
        c += q;                             /* find the last position */
        MD10 = c;                           /* last motor current */
        MD10 = c | 0x80;                    /* clear the motor strobe */
    }
    lustep = i;                             /* update the ustep counter */
    lastoff = c;                            /* update last motor offset */
    break;                                  /* done with this phase */
case 3:                                     /* PH = 1  A/-B = 1 first */
    while (r) {                             /* while counting phase down */
        r--;                                /* count down the groups */
        c -= USTEPS;                        /* move in groups of usteps */
        i += USTEPS;                        /* update local ustep counter */
        q -= USTEPS;                        /* count down ustep number */
        if (c > 0x7f) {                     /* are we at the end ? */
            mstate = 2;                     /* next motor state */
            c = (0xff - c) + 1;             /* next motor offset */
            MD00 = c;                       /* move motor to next phase */
            MD00 = c | 0x80;                /* clear the motor strobe */
            break;                          /* done with this phase */
        }
        MD01 = c;                           /* output the motor value */
        MD01 = c | 0x80;                    /* clear the motor strobe */
    }
    if (!r) {
        i += q;                             /* last number of usteps */
        c -= q;                             /* find the last position */
        MD01 = c;                           /* last motor current */
        MD01 = c | 0x80;                    /* clear the motor strobe */
    }
    lustep = i;                             /* update the ustep counter */
    lastoff = c;                            /* update last motor offset */
    break;                                  /* done with this phase */
case 2:                                     /* PH = 0  A/-B = 1 */
    while (r) {                             /* while counting phase down */
        r--;                                /* count down the groups */
        c += USTEPS;                        /* move in groups of usteps */
        i += USTEPS;                        /* update local ustep counter */
        q -= USTEPS;                        /* count down ustep number */
        if (c > 0x7f) {                     /* are we at the end ? */
            mstate = 1;                     /* next motor state */
```

```
            c = 0x7e - (c - 0x7f);          /* next motor offset */
            MD10 = c;                        /* move motor to next phase */
            MD10 = c | 0x80;                 /* clear the motor strobe */
            break;                           /* done with this phase */
        }
        MD00 = c;                            /* output the motor value */
        MD00 = c | 0x80;                     /* clear the motor strobe */
    }
    if (!r) {
        i += q;                              /* last number of usteps */
        c += q;                              /* find the last position */
        MD00 = c;                            /* last motor current */
        MD00 = c | 0x80;                     /* clear the motor strobe */
    }
    lustep = i;                              /* update the ustep counter */
    lastoff = c;                             /* update last motor offset */
    break;                                   /* done with this phase */
case 1:                                      /* PH = 1  A/-B = 1 first */
    while (r) {                              /* while counting phase down */
        r--;                                 /* count down the groups */
        c -= USTEPS;                         /* move in groups of usteps */
        i += USTEPS;                         /* update local ustep counter */
        q -= USTEPS;                         /* count down ustep number */
        if (c > 0x7f) {                      /* are we at the end ? */
            mstate = 0;                      /* next motor state */
            c = (0xff - c) + 1;              /* next motor offset */
            MD11 = c;                        /* move motor to next phase */
            MD11 = c | 0x80;                 /* clear the motor strobe */
            break;                           /* done with this phase */
        }
        MD10 = c;                            /* output the motor value */
        MD10 = c | 0x80;                     /* clear the motor strobe */
    }
    if (!r) {
        i += q;                              /* last number of usteps */
        c -= q;                              /* find the last position */
        MD10 = c;                            /* last motor current */
        MD10 = c | 0x80;                     /* clear the motor strobe */
    }
    lustep = i;                              /* update the ustep counter */
    lastoff = c;                             /* update last motor offset */
    break;                                   /* done with this phase */
case 0:                                      /* PH = 0  A/-B = 1 */
    while (r) {                              /* while counting phase down */
        r--;                                 /* count down the groups */
        c += USTEPS;                         /* move in groups of usteps */
        i += USTEPS;                         /* update local ustep counter */
        q -= USTEPS;                         /* count down ustep number */
```

```
        if (c > 0x7f) {                /* are we at the end ? */
            mstate = 7;                /* next motor state */
            c = 0x7e - (c - 0x7f);     /* next motor offset */
            MD00 = c;                  /* move motor to next phase */
            MD00 = c | 0x80;           /* clear the motor strobe */
            break;                     /* done with this phase */
        }
        MD11 = c;                      /* output the motor value */
        MD11 = c | 0x80;               /* clear the motor strobe */
    }
    if (!r) {
        i += q;                        /* last number of usteps */
        c += q;                        /* find the last position */
        MD11 = c;                      /* last motor current */
        MD11 = c | 0x80;               /* clear the motor strobe */
    }
    lustep = i;                        /* update the ustep counter */
    lastoff = c;                       /* update last motor offset */
    break;                             /* done with this phase */
}
r = stack16[sp16--];                   /* restore r */
q = stack16[sp16--];                   /* restore q */
i = stack16[sp16--];                   /* restore i */
c = stack8[sp8--];                     /* restore c */
}

/*************************************************************

This function will move the stepper motor usteps out.

Variables used: q,i,c
*************************************************************
/
void ustepout()                        /* step one track out */
{
    stack8[++sp8] = c;                 /* save c */
    stack16[++sp16] = i;               /* save i */
    stack16[++sp16] = q;               /* save q */
    i = lustep;                        /* make a local value */
    c = lastoff;                       /* get the last motor offset */
    q = i - custep;                    /* find how far to ustep */
    switch (mstate) {                  /* find the last motor state */
    case 0:                            /* PH = 1 A/-B = 1 first */
        while (q) {                    /* while counting phase down */
            q--;                       /* count down the groups */
            c--;                       /* move in groups of usteps */
            i--;                       /* update local ustep counter */
            if (c > 0x7e) {            /* are we at the end ? */
                mstate = 1;            /* next motor state */
```

```
            c = 0x01;                    /* next motor offset */
            MD10 = c;                    /* move motor to next phase */
            MD10 = c | 0x80;                 /* clear the motor strobe */
            break;                       /* done with this phase */
        }
        MD11 = c;                        /* output the motor value */
        MD11 = c | 0x80;                     /* clear the motor strobe */
    }
    lustep = i;                          /* update the ustep counter */
    lastoff = c;                             /* update last motor offset */
    break;                               /* done with this phase */
case 1:                                  /* PH = 0  A/-B = 1 */
    while (q) {                          /* while counting phase down */
        q--;                             /* count down the groups */
        c++;                             /* move in groups of usteps */
        i--;                             /* update local ustep counter */
        if (c > 0x7f) {                  /* are we at the end ? */
            mstate = 2;                  /* next motor state */
            c = 0x7e;                    /* next motor offset */
            MD00 = c;                    /* move motor to next phase */
            MD00 = c | 0x80;                 /* clear the motor strobe */
            break;                       /* done with this phase */
        }
        MD10 = c;                        /* output the motor value */
        MD10 = c | 0x80;                     /* clear the motor strobe */
    }
    lustep = i;                          /* update the ustep counter */
    lastoff = c;                             /* update last motor offset */
    break;                               /* done with this phase */
case 2:                                  /* PH = 1  A/-B = 1 first */
    while (q) {                          /* while counting phase down */
        q--;                             /* count down the groups */
        c--;                             /* move in groups of usteps */
        i--;                             /* update local ustep counter */
        if (c > 0x7e) {                  /* are we at the end ? */
            mstate = 3;                  /* next motor state */
            c = 0x01;                    /* next motor offset */
            MD01 = c;                    /* move motor to next phase */
            MD01 = c | 0x80;                 /* clear the motor strobe */
            break;                       /* done with this phase */
        }
        MD00 = c;                        /* output the motor value */
        MD00 = c | 0x80;                     /* clear the motor strobe */
    }
    lustep = i;                          /* update the ustep counter */
    lastoff = c;                             /* update last motor offset */
    break;                               /* done with this phase */
case 3:                                  /* PH = 0  A/-B = 1 */
    while (q) {                          /* while counting phase down */
        q--;                             /* count down the groups */
```

```c
            c++;                            /* move in groups of usteps */
            i--;                            /* update local ustep counter */
            if (c > 0x7f) {                 /* are we at the end ? */
                mstate = 4;                 /* next motor state */
                c = 0x7e;                   /* next motor offset */
                MD10 = c;                   /* move motor to next phase */
                MD10 = c | 0x80;            /* clear the motor strobe */
                break;                      /* done with this phase */
            }
            MD01 = c;                       /* output the motor value */
            MD01 = c | 0x80;                /* clear the motor strobe */
        }
        lustep = i;                         /* update the ustep counter */
        lastoff = c;                        /* update last motor offset */
        break;                              /* done with this phase */
    case 4:                                 /* PH = 1  A/-B = 1 first */
        while (q) {                         /* while counting phase down */
            q--;                            /* count down the groups */
            c--;                            /* move in groups of usteps */
            i--;                            /* update local ustep counter */
            if (c > 0x7e) {                 /* are we at the end ? */
                mstate = 5;                 /* next motor state */
                c = 0x01;                   /* next motor offset */
                MD11 = c;                   /* move motor to next phase */
                MD11 = c | 0x80;            /* clear the motor strobe */
                break;                      /* done with this phase */
            }
            MD10 = c;                       /* output the motor value */
            MD10 = c | 0x80;                /* clear the motor strobe */
        }
        lustep = i;                         /* update the ustep counter */
        lastoff = c;                        /* update last motor offset */
        break;                              /* done with this phase */
    case 5:                                 /* PH = 0  A/-B = 1 */
        while (q) {                         /* while counting phase down */
            q--;                            /* count down the groups */
            c++;                            /* move in groups of usteps */
            i--;                            /* update local ustep counter */
            if (c > 0x7f) {                 /* are we at the end ? */
                mstate = 6;                 /* next motor state */
                c = 0x7e;                   /* next motor offset */
                MD01 = c;                   /* move motor to next phase */
                MD01 = c | 0x80;            /* clear the motor strobe */
                break;                      /* done with this phase */
            }
            MD11 = c;                       /* output the motor value */
            MD11 = c | 0x80;                /* clear the motor strobe */
        }
        lustep = i;                         /* update the ustep counter */
        lastoff = c;                        /* update last motor offset */
        break;                              /* done with this phase */
```

```c
        case 6:                         /* PH = 1 A/-B = 1 first */
            while (q) {                 /* while counting phase down */
                q--;                    /* count down the groups */
                c--;                    /* move in groups of usteps */
                i--;                    /* update local ustep counter */
                if (c > 0x7e) {         /* are we at the end ? */
                    mstate = 7;         /* next motor state */
                    c = 0x01;           /* next motor offset */
                    MD00 = c;           /* move motor to next phase */
                    MD00 = c | 0x80;    /* clear the motor strobe */
                    break;              /* done with this phase */
                }
                MD01 = c;               /* output the motor value */
                MD01 = c | 0x80;        /* clear the motor strobe */
            }
            lustep = i;                 /* update the ustep counter */
            lastoff = c;                /* update last motor offset */
            break;                      /* done with this phase */
        case 7:                         /* PH = 0 A/-B = 1 */
            while (q) {                 /* while counting phase down */
                q--;                    /* count down the groups */
                c++;                    /* move in groups of usteps */
                i--;                    /* update local ustep counter */
                if (c > 0x7f) {         /* are we at the end ? */
                    mstate = 0;         /* next motor state */
                    c = 0x7e;           /* next motor offset */
                    MD11 = c;           /* move motor to next phase */
                    MD11 = c | 0x80;    /* clear the motor strobe */
                    break;              /* done with this phase */
                }
                MD00 = c;               /* output the motor value */
                MD00 = c | 0x80;        /* clear the motor strobe */
            }
            lustep = i;                 /* update the ustep counter */
            lastoff = c;                /* update last motor offset */
            break;                      /* done with this phase */
    }
    q = stack16[sp16--];                /* restore q */
    i = stack16[sp16--];                /* restore i */
    c = stack8[sp8--];                  /* restore c */
}
```

/*****************************************************************

This function will move the stepper motor usteps in.

Variables used: q,i,c
*****************************************************************

```c
/
void ustepin()                          /* step one track in */
{
    stack8[++sp8] = c;                  /* save c */
    stack16[++sp16] = i;                /* save i */
    stack16[++sp16] = q;                /* save q */
    i = lustep;                         /* make a local value */
    c = lastoff;                        /* get the last motor offset */
    q = custep - i;                     /* find how far to ustep */
                                        /* find the last motor state */
    switch (mstate) {
    case 7:                             /* PH = 1 A/-B = 1 first */
        while (q) {                     /* while counting phase down */
            q--;                        /* count down the groups */
            c--;                        /* move in groups of usteps */
            i++;                        /* update local ustep counter */
            if (c == 0) {               /* are we at the end ? */
                mstate = 6;             /* next motor state */
                c = 0x00;               /* next motor offset */
                MD01 = c;               /* move motor to next phase */
                MD01 = c | 0x80;        /* clear the motor strobe */
                break;                  /* done with this phase */
            }
            MD00 = c;                   /* output the motor value */
            MD00 = c | 0x80;            /* clear the motor strobe */
        }
        lustep = i;                     /* update the ustep counter */
        lastoff = c;                    /* update last motor offset */
        break;                          /* done with this phase */
    case 6:                             /* PH = 0 A/-B = 1 */
        while (q) {                     /* while counting phase down */
            q--;                        /* count down the groups */
            c++;                        /* move in groups of usteps */
            i++;                        /* update local ustep counter */
            if (c > 0x7f) {             /* are we at the end ? */
                mstate = 5;             /* next motor state */
                c = 0x7e;               /* next motor offset */
                MD11 = c;               /* move motor to next phase */
                MD11 = c | 0x80;        /* clear the motor strobe */
                break;                  /* done with this phase */
            }
            MD01 = c;                   /* output the motor value */
            MD01 = c | 0x80;            /* clear the motor strobe */
        }
        lustep = i;                     /* update the ustep counter */
        lastoff = c;                    /* update last motor offset */
        break;                          /* done with this phase */
    case 5:                             /* PH = 1 A/-B = 1 first */
        while (q) {                     /* while counting phase down */
            q--;                        /* count down the groups */
            c--;                        /* move in groups of usteps */
            i++;                        /* update local ustep counter */
```

```c
        if (c == 0) {                    /* are we at the end ? */
            mstate = 4;                  /* next motor state */
            c = 0x00;                    /* next motor offset */
            MD10 = c;                    /* move motor to next phase */
            MD10 = c | 0x80;             /* clear the motor strobe */
            break;                       /* done with this phase */
        }
        MD11 = c;                        /* output the motor value */
        MD11 = c | 0x80;                 /* clear the motor strobe */
    }
    lustep = i;                          /* update the ustep counter */
    lastoff = c;                         /* update last motor offset */
    break;                               /* done with this phase */
case 4:                                  /* PH = 0  A/-B = 1 */
    while (q) {                          /* while counting phase down */
        q--;                             /* count down the groups */
        c++;                             /* move in groups of usteps */
        i++;                             /* update local ustep counter */
        if (c > 0x7f) {                  /* are we at the end ? */
            mstate = 3;                  /* next motor state */
            c = 0x7e;                    /* next motor offset */
            MD01 = c;                    /* move motor to next phase */
            MD01 = c | 0x80;             /* clear the motor strobe */
            break;                       /* done with this phase */
        }
        MD10 = c;                        /* output the motor value */
        MD10 = c | 0x80;                 /* clear the motor strobe */
    }
    lustep = i;                          /* update the ustep counter */
    lastoff = c;                         /* update last motor offset */
    break;                               /* done with this phase */
case 3:                                  /* PH = 1  A/-B = 1 first */
    while (q) {                          /* while counting phase down */
        q--;                             /* count down the groups */
        c--;                             /* move in groups of usteps */
        i++;                             /* update local ustep counter */
        if (c == 0) {                    /* are we at the end ? */
            mstate = 2;                  /* next motor state */
            c = 0x00;                    /* next motor offset */
            MD00 = c;                    /* move motor to next phase */
            MD00 = c | 0x80;             /* clear the motor strobe */
            break;                       /* done with this phase */
        }
        MD01 = c;                        /* output the motor value */
        MD01 = c | 0x80;                 /* clear the motor strobe */
    }
    lustep = i;                          /* update the ustep counter */
    lastoff = c;                         /* update last motor offset */
    break;                               /* done with this phase */
```

```
case 2:                             /* PH = 0  A/-B = 1 */
    while (q) {                     /* while counting phase down */
        q--;                        /* count down the groups */
        c++;                        /* move in groups of usteps */
        i++;                        /* update local ustep counter */
        if (c > 0x7f) {             /* are we at the end ? */
            mstate = 1;             /* next motor state */
            c = 0x7e;               /* next motor offset */
            MD10 = c;               /* move motor to next phase */
            MD10 = c | 0x80;        /* clear the motor strobe */
            break;                  /* done with this phase */
        }
        MD00 = c;                   /* output the motor value */
        MD00 = c | 0x80;            /* clear the motor strobe */
    }
    lustep = i;                     /* update the ustep counter */
    lastoff = c;                    /* update last motor offset */
    break;                          /* done with this phase */
case 1:                             /* PH = 1  A/-B = 1 first */
    while (q) {                     /* while counting phase down */
        q--;                        /* count down the groups */
        c--;                        /* move in groups of usteps */
        i++;                        /* update local ustep counter */
        if (c == 0) {               /* are we at the end ? */
            mstate = 0;             /* next motor state */
            c = 0x00;               /* next motor offset */
            MD11 = c;               /* move motor to next phase */
            MD11 = c | 0x80;        /* clear the motor strobe */
            break;                  /* done with this phase */
        }
        MD10 = c;                   /* output the motor value */
        MD10 = c | 0x80;            /* clear the motor strobe */
    }
    lustep = i;                     /* update the ustep counter */
    lastoff = c;                    /* update last motor offset */
    break;                          /* done with this phase */
case 0:                             /* PH = 0  A/-B = 1 */
    while (q) {                     /* while counting phase down */
        q--;                        /* count down the groups */
        c++;                        /* move in groups of usteps */
        i++;                        /* update local ustep counter */
        if (c > 0x7f) {             /* are we at the end ? */
            mstate = 7;             /* next motor state */
            c = 0x7e;               /* next motor offset */
            MD00 = c;               /* move motor to next phase */
            MD00 = c | 0x80;        /* clear the motor strobe */
            break;                  /* done with this phase */
        }
        MD11 = c;                   /* output the motor value */
        MD11 = c | 0x80;            /* clear the motor strobe */
```

```c
        }
        lustep = i;                 /* update the ustep counter */
        lastoff = c;                /* update last motor offset */
        break;                      /* done with this phase */
    }
    q = stack16[sp16--];            /* restore q */
    i = stack16[sp16--];            /* restore i */
    c = stack8[sp8--];              /* restore c */
}
```

/**************************************************************

This function will update the hardware DACS on the drive.

Variables used: none
**************************************************************
/
```c
void updatedacs()                   /* move the stepper motor */
{
    if (side == 2) {                /* SDS mode ? */
        DWC0 = tdac[track].current2;    /* head current side 0 */
        DWC1 = tdac[track].current3;    /* head current side 1 */
        ASM0 = tdac[track].asymmetry2;  /* head asymmetry side 0 */
        ASM1 = tdac[track].asymmetry3;  /* head asymmetry side 1 */
        CLP0 = tdac[track].clip2;       /* signal clip level side 0 */
        CLP1 = tdac[track].clip3;       /* signal clip level side 1 */
    }
    else {
        DWC0 = tdac[track].current0;    /* head current side 0 */
        DWC1 = tdac[track].current1;    /* head current side 1 */
        ASM0 = tdac[track].asymmetry0;  /* head asymmetry side 0 */
        ASM1 = tdac[track].asymmetry1;  /* head asymmetry side 1 */
        CLP0 = tdac[track].clip0;       /* signal clip level side 0 */
        CLP1 = tdac[track].clip1;       /* signal clip level side 1 */
    }
}
```

/**************************************************************

This interrupt will process the drive step pulse.

Variables used: none
**************************************************************
/
```c
void external0() interrupt 0 using 1
{
    if (IOP0 & IDIR) seektrack -= byone;    /* if step out, track - 1 */
    else seektrack += byone;                /* if step in, track + 1 */
    ACC = RSTP;                             /* reset the step latch */
}
```

```c
/****************************************************************

This interrupt will process the timer 0 overflow signal. This interrupt
   will pop every 250us.

Variables used: none
   ****************************************************************
/
void timer0() interrupt 1 using 1
{
    tick250us = 1;                    /* set the 250us tick flag */
    if (! --onems) {                  /* test for 1ms count */
        onems = 4;                    /* reset the 1ms counter */
        tick1ms = 1;                  /* set the 1ms tick flag */
        if (! --tenms) {              /* test for 10ms count */
            tenms = 10;               /* reset the 10ms counter */
            if (tick10ms) xerror = SLOW10MS;   /* the 10ms tick was slow */
            else tick10ms = 1;        /* set the 10ms tick flag */
        }
    }
}

/****************************************************************

This interrupt will process the power fail signal.
   ****************************************************************
/
void external1() interrupt 2 using 1
{

}

/****************************************************************

This interrupt will process the timer 1 overflow signal.
   ****************************************************************
/
void timer1() interrupt 3 using 1
{

}

/****************************************************************

This interrupt will process the serial port.

Variables used: none
   ****************************************************************
```

```c
/
void uart() interrupt 4 using 1
{
    if (RI) {                               /* service serial data input */
        RI = 0;                             /* clear the port input flag */
        if (!lastkey) lastkey = SBUF;       /* get the last input key */
    }
    if (TI) {                               /* transmiter ready */
        TI = 0;                             /* clear the ready flag */
        if (*headp) SBUF = *headp++;        /* output the next char */
        else tready = 1;                    /* set the trans ready flag */
    }
}

/****************************************************************

This interrupt will process the communication port.
****************************************************************
/
void iic() interrupt 5 using 1
{

}

/****************************************************************

This interrupt will process the index signal.

Variables used: a
****************************************************************
/
void capture0() interrupt 6 using 1
{
    TM2IR &= 0x0e;                          /* clear the interrupt */
    IEN1 &= ~ECT0;                          /* disable capture 0 */
    IEN1 |= 0xf0;                           /* enable T2O,CM0,CM1,CM2 */
    TM2CON |= T2MS0;                        /* enable T2 to count */
    CML0 = idelay0;                         /* load index delay side 0 */
    CMH0 = 0;                               /* 1ms max index dealy */
    CML1 = idelay1;                         /* load index delay side 1 */
    CMH1 = 0;                               /* 1ms max index dealy */
    a = (unsigned int)idelay0 + ILENGTH;    /* index delay + 3ms */
    CML2 = (unsigned char)(a & 0x00ff);     /* load the low byte */
    CMH2 = (unsigned char)((a >> 8) & 0x00ff); /* load the high byte */
    CMSR5 = 0;                              /* clear index side 0 */
    CMSR4 = 1;                              /* clear index side 1 */
    diskin = 1;                             /* drive index is active */
    motoron = MOTORON;                      /* turn on the drive motor */
}
```

```
/******************************************************************

This interrupt will read the clock signal from the DMA.
******************************************************************
/
    void capture1() interrupt 7 using 1
    {

}

/******************************************************************

This interrupt will read request signal from the DMA.
******************************************************************
/
    void capture2() interrupt 8 using 1
    {

}

/******************************************************************

This interrupt will write gate on side zero.
******************************************************************
/
    void capture3() interrupt 9 using 1
    {

}

/******************************************************************

This interrupt will process the ADC done signal.
******************************************************************
/
    void adcdone() interrupt 10 using 1
    {

}

/******************************************************************

This interrupt will pop on compare register 0

Variables used: none
******************************************************************
```

```c
/
 void compare0() interrupt 11 using 1
 {
     TM2IR &= ~CMI0;                /* clear the interrupt */
     tickindex = 1;                 /* set the index tick flag */
     tickindex0 = 1;                /* set the index tick side 0 */
 }
```

```
/*******************************************************************

This interrupt will pop on compare register 1

Variables used: none
    *****************************************************************
```

```c
/
 void compare1() interrupt 12 using 1
 {
     TM2IR &= ~CMI1;                /* clear the interrupt */
     tickindex1 = 1;                /* set the index tick side 1 */
     motoron = MOTORON;             /* turn on the drive motor */
 }
```

```
/*******************************************************************

This interrupt will pop on compare register 2

Variables used: a
    *****************************************************************
```

```c
/
 void compare2() interrupt 13 using 1
 {
     TM2IR &= ~CMI2;                /* clear the interrupt */
     CMSR5 = 0;                     /* clear index side 0 */
     CMSR4 = 1;                     /* clear index side 1 */
     CML0 = idelay0;                /* load index delay side 0 */
     CML1 = idelay1;                /* load index delay side 1 */
 }
```

```
/*******************************************************************

This interrupt will process the timer 2 overflow signal.

Variables used: none
    *****************************************************************
```

```c
/
 void overflow() interrupt 14 using 1
```

```c
{
    TM2CON &= ~T2MS0;        /* disable T2 from counting */
    TM2IR &= ~T2OV;          /* clear the interrupt flag */
    IEN1 |= ECT0;            /* enable capture 0 interrupt */
    diskin = 0;              /* drive index is not active */
}

/* general commands */
#define NOCOMMAND   0        /* no command to send */
#define READY       1        /* sent if drive is ready */
#define BUSY        2        /* sent if drive is busy */
#define ERRORS      3        /* sent if drive has errors */
#define CMDERROR    4        /* sent if command error */
#define DATAEND     5        /* end of raw track data */
#define CTESTING    9        /* command used for testing */

/* stepper motor commands */
#define SEEK        10       /* seek to track command */
#define STEPIN      11       /* step in one track */
#define STEPOUT     12       /* step out one track */
#define USTEPIN     13       /* ustep in one track */
#define USTEPOUT    14       /* ustep out one track */
#define RESTORE     15       /* restore head to track zero */
/* radial alignment commands */
#define RUNRADIAL   20       /* run the radial alignment */
#define RADSIDE0    21       /* request radial side 0 */
#define RADSIDE1    22       /* request radial side 1 */
#define GETRDATA    23       /* request the raw track data */
#define RALGNSIDE0  24       /* request full data side 0 */
#define RALGNSIDE1  25       /* request full data side 1 */
#define RADSPEC0    26       /* request % side 0 + offset */
#define RADSPEC1    27       /* request % side 1 + offset */
#define SENDRDATA   28       /* sending radial data to DMA */

/* general setup commands */
#define SETDTYPE    30       /* set the drive type */
#define REQVER      31       /* request software version */
#define REQCNT      32       /* request disks duplicated */
#define CLRERRORS   33       /* clear the error list */
#define CLEARCNT    34       /* clear the disk counter */
#define LOADSOFT    35       /* load new software version */
#define CPURESET    36       /* reset the drive CPU */
#define ADTYPE      37       /* set alignment disk type */
#define REQSER      38       /* request serial number */
#define LASTDATE    39       /* send the last date */

/* index data commands */
#define ITOILEN     40       /* index to index in ms */
#define IJITTER     41       /* index to index jitter ms */
#define RITOILEN    42       /* req index to index in ms */
#define RIJITTER    43       /* req index jitter in ms */
```

```c
#define RPMTEST    44        /* seek track zero and wait */
#define READITOD0  45        /* send side 0 index to data */
#define READITOD1  46        /* send side 1 index to data */
#define SETITOD0   47        /* set new index to data 0 */
#define SETITOD1   48        /* set new index to data 1 */

/* track amplitude commands */
#define RUNAMPLIT  50        /* run the track amplitude */
#define RAMPSIDE0  51        /* request amplitude side 0 */
#define RAMPSIDE1  52        /* request amplitude side 1 */
#define GETRADATA  53        /* request the raw track data */
#define RFAMPSIDE0 54        /* request full data side 0 */
#define RFAMPSIDE1 55        /* request full data side 1 */

/* track asymmetry commands */
#define ASSYDUP0   60        /* seek track 0 side 0 */
#define ASSYDUP1   61        /* seek track 0 side 1 */
#define ASSYSPEC0  62        /* seek 1F side 0 */
#define ASSYSPEC1  63        /* seek 1F side 1 */
#define ASSYUP     64        /* set all tracks this side */
#define ASSYDOWN   65        /* set all tracks this side */
#define MARGIN     66        /* seek maximum track */

/* track azimuth commands */
#define AZMI0      70        /* azimuth mins side 0 */
#define AZMI1      71        /* azimuth mins side 1 */

/* misc commands */
#define GETDATA    100       /* send the last raw data */

/* VT100 Cursor address definitions */ define LCLEAR   "[1;1H[2J"
define LVERS    "[1;1H"
#define LCOPY    "[1;30H"
#define LMESS    "[24;1H"
#define LLAST    "[24;80H"

#define LTRACKF  "[3;1H"
#define LTRACK   "[3;2H"
#define LTRACKV  "[3;10H"

#define LSIDEF   "[4;1H"
#define LSIDE    "[4;2H"
#define LSIDEV   "[4;10H"

#define LIDLY0F  "[5;1H"
#define LIDLY0   "[5;2H"
#define LIDLY0V  "[5;10H"
```

```
#define LIDLY1F "[6;1H"
#define LIDLY1  "[6;2H"
#define LIDLY1V "[6;10H"

#define LINDEXF "[11;1H"
#define LINDEX  "[11;2H"
#define LINDEXV "[11;10H"

#define LIDLEF  "[12;1H"
#define LIDLE   "[12;2H"
#define LIDLEV  "[12;10H"

#define LMOTORF "[13;1H"
#define LMOTOR  "[13;2H"
#define LMOTORV "[13;10H"

#define LFFSETF "[14;1H"
#define LFFSET  "[14;2H"
#define LFFSETV "[14;10H"

#define LERRORF "[23;1H"
#define LERROR  "[23;2H"
#define LERRORV "[23;10H"

#define LSTAT0  "[17;2H"
#define LSTAT1  "[18;2H"
#define LSTAT2  "[19;2H"
#define LSTAT3  "[20;2H"
#define LSTAT4  "[21;2H"

#define LHEART  "[21;2H*[21;2H "
#define LERR    "[21;4H"
#define LCMD    "[21;6H*[21;6H "
#define LTOSON  "[21;8H*"
#define LTOSOFF "[21;8H "
#define LIDX    "[21;10H*[21;10H "
#define LSTP    "[21;12H*[21;12H "
#define LDIRIN  "[21;14H+"
#define LDIROUT "[21;14H-"
#define LMTRON  "[21;16H*"
#define LMTROFF "[21;16H "
#define LWGT    "[21;18H*[21;18H "
#define LVERON  "[21;20H*"
#define LVEROFF "[21;20H "
#define LRDYON  "[21;22H*"
#define LRDYOFF "[21;22H "

#define LSIDE0  "[4;20H"
#define LSIDE1  "[5;20H"
#define LSIDE2  "[6;20H"
#define LSIDE3  "[7;20H"
```

```
#define LISTEP   "[3;31H"
#define LISTP0F  "[4;30H"
#define LISTP0V  "[4;31H"

#define LISTP1F  "[5;30H"
#define LISTP1V  "[5;31H"
#define LISTP2F  "[6;30H"
#define LISTP2V  "[6;31H"
#define LISTP3F  "[7;30H"
#define LISTP3V  "[7;31H"

#define LOSTEP   "[3;41H"
#define LOSTP0F  "[4;40H"
#define LOSTP0V  "[4;41H"
#define LOSTP1F  "[5;40H"
#define LOSTP1V  "[5;41H"
#define LOSTP2F  "[6;40H"
#define LOSTP2V  "[6;41H"
#define LOSTP3F  "[7;40H"
#define LOSTP3V  "[7;41H"

#define LCRNT    "[3;51H"
#define LCRNT0F  "[4;50H"
#define LCRNT0V  "[4;51H"
#define LCRNT1F  "[5;50H"
#define LCRNT1V  "[5;51H"
#define LCRNT2F  "[6;50H"
#define LCRNT2V  "[6;51H"
#define LCRNT3F  "[7;50H"
#define LCRNT3V  "[7;51H"

#define LSYMM    "[3;61H"
#define LSYMM0F  "[4;60H"
#define LSYMM0V  "[4;61H"
#define LSYMM1F  "[5;60H"
#define LSYMM1V  "[5;61H"
#define LSYMM2F  "[6;60H"
#define LSYMM2V  "[6;61H"
#define LSYMM3F  "[7;60H"
#define LSYMM3V  "[7;61H"

#define LCLIP    "[3;73H"
#define LCLIP0F  "[4;72H"
#define LCLIP0V  "[4;73H"
#define LCLIP1F  "[5;72H"
#define LCLIP1V  "[5;73H"
#define LCLIP2F  "[6;72H"
#define LCLIP2V  "[6;73H"
#define LCLIP3F  "[7;72H"
```

```c
#define LCLIP3V "[7;73H"

/* Defines for ADCS program */
#define SAMPLESIZE 40000      /* size of sample buffer */
#define RINGSIZE 10240        /* size of output buffer */
#define MAXTRACK 85           /* maximum size of struct */
#define MAXERROR 19           /* length of error list */
#define MAXLINE 80            /* lenght of output line */
#define MAXSTACK 100          /* stack pointer length */
#define MAXALIGN 3            /* maximum number of types */
#define MOTORON 10            /* drive motor on time */

/* Stepper motor defines */
#define USTEPS 10             /* number of usteps to move */
#define ONESTEP 253           /* one full step in usteps */
#define KICKBACK 150          /* value used while usteping */

/* Index pulse defines */
#define ILENGTH 750           /* index pulse length */

/* Error handler defines */
#define PERROR 0              /* only print the error list */
#define EERROR 1              /* only enter the error */
#define BERROR 2              /* enter and print the error */

/* Analog data input selector */
#define ADCENV0 0             /* side 0 signal level input */
#define ADCENV1 1             /* side 1 signal level input */
#define ADCSYM1 2             /* side 1 symmetry feedback */
#define ADCSYM0 3             /* side 0 symmetry feedback */
#define ADCWC1 4              /* side 1 current feedback */
#define ADCWC0 5              /* side 0 current feedback */
#define ADCLIP1 6             /* side 1 clip feedback */
#define ADCLIP0 7             /* side 0 clip feedback */

/* 5.25 Drive Types */
#define D360K300 0            /* 360K 300 RPM */
#define D360K600 1            /* 360K 600 RPM */
#define D360K900 2            /* 360K 900 RPM */
#define D360K1200 3           /* 360K 1200 RPM */
#define D1200K360 4           /* 1.2M 360 RPM */
#define D1200K720 5           /* 1.2M 720 RPM */
#define D1200K900 6           /* 1.2M 900 RPM */
#define D1200K1200 7          /* 1.2M 1200 RPM */

/* 3.5 Drive Types */
#define D720K300 8            /* 720K 300 RPM */
#define D720K600 9            /* 720K 600 RPM */
#define D720K900 10           /* 720K 900 RPM */
#define D720K1200 11          /* 720K 1200 RPM */
#define D1400K300 12          /* 1.44M 300 RPM */
```

```
#define D1400K600   13              /* 1.44M 600 RPM */
#define D1400K900   14              /* 1.44M 900 RPM */
#define D1400K1200  15              /* 1.44M 1200 RPM */

/* Alignment disk types */
#define DYSAN20840  0               /* Dysan 208-40 48TPI 5.25' */

/* Error defines for ADCS software */ define SLOW1MS     10              /* 1ms function failed to clear tick flag */
define SLOW8MS     11              /* 8ms function failed to clear tick flag */
#define SLOW10MS    12              /* 10ms function failed to clear tick flag */
/* execute: record         recovery: none */ define NOAINDEX    13              /* Disk index was lost for amplitude test */
define NORINDEX    14              /* Disk index was lost for radial test */
#define NOIINDEX    15              /* Disk index was lost for index test */
/* execute: report         recovery: operator action */ define MEMORY      20              /* selftest memory test failed */
define HIVREF      21              /* high V ref failed to change */
#define LOVREF      22              /* low V ref failed to change */
#define CLIPT0      23              /* clip threshold side 0 failed to change */
#define CLIPT1      24              /* clip threshold side 1 failed to change */
#define SYMMT0      25              /* symmetry side 0 failed to change */
#define SYMMT1      26              /* symmetry side 1 failed to change */
#define WCURR0      27              /* write current side 0 failed to change */
#define WCURR1      28              /* write current side 1 failed to change */
/* execute: halt           recovery: cleared by PC/DMA */ define ADCBUSY     30              /* ADC was busy on entry to <getadc> */
define ADCIBUSY    31              /* ADC was busy on entry to <trackid> */
#define ADCABUSY    32              /* ADC was busy on entry to <trackaa> */
#define ADCRBUSY    33              /* ADC was busy on entry to <trackra> */
/* execute: record         recovery: none */ define TOSON       40              /* Track zero did no turn off in selftest */
define TOSOFF      41              /* Track zero did not turn on in selftest */

/* execute: halt           recovery: cleared by PC/DMA */ define BADTYPE     51              /* Drive type was not defined */
/* execute: halt           recovery: cleared by PC/DMA */ define S8FAIL      61              /* Eight bit stack overflow */
define S16FAIL     62              /* Sixteen bit stack overflow */
/* execute: halt           recovery: cleared by PC/DMA */ define DMASENDERR  70              /* DMA data send error */
/* execute: record         recovery: cleared by PC/DMA */
```

```c
#define NORCENTER   80          /* Radial failed to find track center */
#define NOREDGE     81          /* Radial failed to find the track edge */
/* Signetics 80C552 Processor Declarations, by Tronix, Santa Clara CA */

/* BYTE Registers */
sfr P0      = 0x80;
sfr P1      = 0x90;
sfr P2      = 0xA0;
sfr P3      = 0xB0;
sfr P4      = 0xC0;
sfr P5      = 0xC4;
sfr PSW     = 0xD0;
sfr PWMP    = 0xFE;
sfr PWM1    = 0xFD;
sfr PWM0    = 0xFC;
sfr RTE     = 0xEF;
sfr ACC     = 0xE0;
sfr ADCH    = 0xC6;
sfr ADCON   = 0xC5;
sfr CTCON   = 0xEB;
sfr CTH3    = 0xCF;
sfr CTH2    = 0xCE;
sfr CTH1    = 0xCD;
sfr CTH0    = 0xCC;
sfr CMH2    = 0xCB;
sfr CMH1    = 0xCA;
sfr CMH0    = 0xC9;
sfr CTL3    = 0xAF;
sfr CTL2    = 0xAE;
sfr CTL1    = 0xAD;
sfr CTL0    = 0xAC;
sfr CML2    = 0xAB;
sfr CML1    = 0xAA;
sfr CML0    = 0xA9;
sfr B       = 0xF0;
sfr SP      = 0x81;
sfr DPL     = 0x82;
sfr DPH     = 0x83;
sfr PCON    = 0x87;
sfr TCON    = 0x88;
sfr TM2CON  = 0xEA;
sfr TM2IR   = 0xC8;
sfr TMH2    = 0xED;
sfr TML2    = 0xEC;
sfr TMOD    = 0x89;
sfr TL0     = 0x8A;
sfr TL1     = 0x8B;
sfr TH0     = 0x8C;
sfr TH1     = 0x8D;
sfr IE      = 0xA8;
sfr IEN0    = 0xA8;
```

```
sfr IEN1  = 0xE8;
sfr IP    = 0xB8;
sfr IP0   = 0xB8;
sfr IP1   = 0xF8;
sfr SCON  = 0x98;
sfr S0CON = 0x98;
sfr SBUF  = 0x99;
sfr S0BUF = 0x99;
sfr S1ADR = 0xDB;
sfr S1DAT = 0xDA;
sfr S1STA = 0xD9;
sfr S1CON = 0xD8;
sfr STE   = 0xEE;
sfr T3    = 0xFF;

/* PSW */
sbit CY  = 0xD7;
sbit AC  = 0xD6;
sbit F0  = 0xD5;
sbit RS1 = 0xD4;
sbit RS0 = 0xD3;
sbit OV  = 0xD2;
sbit F1  = 0xD1;
sbit P   = 0xD0;

/* TCON */
sbit TF1 = 0x8F;
sbit TR1 = 0x8E;
sbit TF0 = 0x8D;
sbit TR0 = 0x8C;
sbit IE1 = 0x8B;
sbit IT1 = 0x8A;
sbit IE0 = 0x89;
sbit IT0 = 0x88;

/* IEN0 */
sbit EA  = 0xAF;
sbit EAD = 0xAE;
sbit ES1 = 0xAD;
sbit ES0 = 0xAC;
sbit ET1 = 0xAB;
sbit EX1 = 0xAA;
sbit ET0 = 0xA9;
sbit EX0 = 0xA8;

/* IEN1 */
sbit ET2  = 0xEF;
sbit ECM2 = 0xEE;
sbit ECM1 = 0xED;
sbit ECM0 = 0xEC;
sbit ECT3 = 0xEB;
```

```
sbit ECT2 = 0xEA;
sbit ECT1 = 0xE9;
sbit ECT0 = 0xE8;

/* IP0 */
sbit PAD  = 0xBE;
sbit PS1  = 0xBD;
sbit PS0  = 0xBC;
sbit PT1  = 0xBB;
sbit PX1  = 0xBA;
sbit PT0  = 0xB9;
sbit PX0  = 0xB8;

/* IP1 */
sbit PT2  = 0xFF;
sbit PCM2 = 0xFE;
sbit PCM1 = 0xFD;
sbit PCM0 = 0xFC;
sbit PTC3 = 0xFB;
sbit PTC2 = 0xFA;
sbit PTC1 = 0xF9;
sbit PTC0 = 0xF8;

/* P0 Bits */
sbit AD7  = 0x87;
sbit AD6  = 0x86;
sbit AD5  = 0x85;
sbit AD4  = 0x84;
sbit AD3  = 0x83;
sbit AD2  = 0x82;
sbit AD1  = 0x81;
sbit AD0  = 0x80;

/* P1 Bits */
sbit SDA  = 0x97;
sbit SCL  = 0x96;
sbit RT2  = 0x95;
sbit T2   = 0x94;
sbit CT3I = 0x93;
sbit CT2I = 0x92;
sbit CT1I = 0x91;
sbit CT0I = 0x90;

/* P2 Bits */
sbit A15  = 0xA7;
sbit A14  = 0xA6;
sbit A13  = 0xA5;
sbit A12  = 0xA4;
sbit A11  = 0xA3;
sbit A10  = 0xA2;
sbit A09  = 0xA1;
sbit A08  = 0xA0;
```

```c
/* P3 Bits */
sbit RD   = 0xB7;
sbit WR   = 0xB6;
sbit T1   = 0xB5;
sbit T0   = 0xB4;
sbit INT1 = 0xB3;
sbit INT0 = 0xB2;
sbit TXD  = 0xB1;
sbit RXD  = 0xB0;

/* P4 BITS */
sbit CMT1  = 0xC7;
sbit CMT0  = 0xC6;
sbit CMSR5 = 0xC5;
sbit CMSR4 = 0xC4;
sbit CMSR3 = 0xC3;
sbit CMSR2 = 0xC2;
sbit CMSR1 = 0xC1;
sbit CMSR0 = 0xC0;

/* S0CON Bits */
sbit SM0 = 0x9F;
sbit SM1 = 0x9E;
sbit SM2 = 0x9D;
sbit REN = 0x9C;
sbit TB8 = 0x9B;
sbit RB8 = 0x9A;
sbit TI  = 0x99;
sbit RI  = 0x98;

/* S1CON BITS */
sbit CF   = 0xDF;
sbit ENS1 = 0xDF;
sbit STA  = 0xDE;
sbit ST0  = 0xDC;
sbit SI   = 0xDB;
sbit AA   = 0xDA;
sbit CR1  = 0xD9;
sbit CR0  = 0xD8;

/* Interrupt bits */
#define ECT0   0x01
#define T2MS0  0x01
#define T2OV   0x80
#define CMI2   0x40
#define CMI1   0x20
#define CMI0   0x10
#define T2ER   0x20
#define CTI0   0x01
```

```
/*
Memory map for the ANSI Drive Control Software.

MSB          LSB  MSB          LSB
S FEDC BA98 7654 3210   S FEDC BA98 7654 3210

0 0000 0000 0000 0000 -> 0 1111 1111 1111 1111 = Code
1 0000 0000 0000 0000 -> 1 1110 1111 1111 1111 = Data
1 1111 0000 0000 0000 -> 1 1111 1111 1111 1111 = MMIO 80c552 I/O port definitions for the ANSI Drive Control Software.

Port   Bit

P0    0   Address/Data 0
      1   Address/Data 1
      2   Address/Data 2
      3   Address/Data 3
      4   Address/Data 4
      5   Address/Data 5
      6   Address/Data 6
      7   Address/Data 7

P1    0   Index Input+    (T2 capture)
      1   RCLK-           (T2 capture)
      2   RREQ-           (T2 capture)
      3   WTGT0-          (T2 capture)
      4   unused          (T2 event)
      5   Index Input+    (T2 reset)
      6   TP3 SCL         (IIC bus)
      7   TP4 SDA         (IIC bus)

P2    0   Address 8
      1   Address 9
      2   Address A
      3   Address B
      4   Address C
      5   Address D
      6   Address E
      7   Address F P3    0   TP1 UART RXD
      1   TP2 UART TXD
      2   Step Input-
      3   Power Fail-
      4   T0 input
      5   T1 input
      6   Memory WR-
      7   Memory RD- P4    0   unused
```

```
   1   unused
   2   unused
   3   unused
   4   Index output side 1 +
   5   Index output side 0 -
   6   Index toggle output
   7   unused P5    0   Input Side 0 signal level in Mv
      1   Input Side 1 signal level in Mv
      2   Input ASM1 / 2
      3   Input ASM0 / 2
      4   Input WC1 / 2
      5   Input WC0 / 2
      6   Input THRS1 clip level
      7   Input THRS0 clip level
```

Hardware I/O Port definitions for the ANSI Drive Control Software.

```
Add        Bit   Output                  Input

F000 <zero> 0    Swap+ (Code/Data)       RCLK- (DRV SEL 2)
            1    Read Data Hold RDH+     RDAT- (DRV SEL 1)
            2    SDS Switch-             RACK- (DRV SEL 0)
            3    Spindle Motor+          RREQ- (DRV SEL 3)
            4    unused                  SIDE-
            5    Stepper Motor Select+   INUSE-
            6    Enable Watch Dog+       LSTEP-
            7    Disable PROM+           LDIR- F010 <one>  0    TCLK+ (DRV SEL 2)       MOTOR ON-
            1    TDAT+ (DRV SEL 1)       DENSITY-
            2    TACK+ (DRV SEL 0)       WD0-  (W Data 0)
            3    TREQ+ (DRV SEL 3)       WD1-  (W Data 1)
            4    READY+                  WTGT0- (W Gate 0)
            5    WTPO+                   WTGT1- (W Gate 1)
            6    TRACK 00+               Track Zero Switch-
            7    unused                  Battery Fail- F070 <two>  0    Int Rate 0 side 0
            1    Int Rate 1 side 0
            2    Int Rate 2 side 0
            3    AGC off side 0
            4    Int Rate 0 side 1
            5    Int Rate 1 side 1
            6    Int Rate 2 side 1
            7    AGC off side 1
*/ define RCLK 0x01        /* Slave Clock */
define RDAT 0x02        /* Slave Data */
```

```
#define RACK 0x04          /* Slave Ack */
#define RREQ 0x08          /* Slave Req */
#define TCLK 0x01          /* Master Clock */
#define TDAT 0x02          /* Master Data */
#define TACK 0x04          /* Master Ack */
define TREQ 0x08          /* Master Req */ define IDIR 0x80          /* Step Direction Input Signal */
define CS0M 0x20          /* Chip Select 0 on stepper motor */
#define T0SW 0x40          /* Track zero switch */
#define MTON 0x08          /* Drive motor signal */
define WDOG 0x40          /* Watch dog reset enable */ define IOP0 XBYTE[0xf000] /* (R/W) I/O Port Zero */
define IOP1 XBYTE[0xf010] /* (R/W) I/O Port One */
#define IOP2 XBYTE[0xf070] /* (W) I/O Port Two */
#define VRHI XBYTE[0xf020] /* (W) High DAC reference voltage */
#define VRLO XBYTE[0xf021] /* (W) Low DAC reference voltage */
#define CLP0 XBYTE[0xf022] /* (W) Clip Threshold DAC Side 0 */
#define CLP1 XBYTE[0xf023] /* (W) Clip Threshold DAC Side 1 */
#define MD00 XBYTE[0xf050] /* (W) Stepper Moter DAC PH = 0 A
#define MD01 XBYTE[0xf051] /* (W) Stepper Moter DAC PH = 1 A
#define MD10 XBYTE[0xf052] /* (W) Stepper Moter DAC PH = 0 A
#define MD11 XBYTE[0xf053] /* (W) Stepper Moter DAC PH = 1 A
#define ASM1 XBYTE[0xf060] /* (W) Symmetry Side 1 DAC */
#define DWC1 XBYTE[0xf061] /* (W) Write Current Side 1 DAC */
#define ASM0 XBYTE[0xf062] /* (W) Symmetry Side 0 DAC */
#define DWC0 XBYTE[0xf063] /* (W) Write Current Side 0 DAC */
#define TRIG XBYTE[0xf050] /* (R) scope trigger */
#define RSTP XBYTE[0xf060] /* (R) Step Latch Clear Strobe */
#define RFSH XBYTE[0xf070] /* (R) Memory Refresh Strobe */
```

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. An electronically alignable floppy disk drive comprising:
   a first transducer means for reading and writing information on a magnetic alignment disk recorded along with a plurality of concentric data tracks;
   a transducer positioning means for moving the first transducer means relative to the magnetic disk in microstep increments of less than the distance separating adjacent concentric data tracks;
   an envelope detector means for generating an analog data signal from information read by said first transducer means; and
   a system control means for;
      controlling said transducer positioning means to position said first transducer means such that said first transducer means is correctly positioned relative to at least one of the concentric data tracks of the magnetic alignment disk to optimize the analog data signal read from the magnetic alignment disk for an alignment parameter; and
      storing data pertaining to the quantity and direction of the microstep increments required to so correctly position said first transducer relative to the magnetic alignment disk such that, when the magnetic alignment disk is removed from the floppy disk drive and a conventional floppy disk substituted therefor, said system control means can use the data to again position said first transducer means such that said first transducer means is positioned relative to the conventional floppy disk in like orientation as when said first transducer means was previously positioned relative to the magnetic alignment disk using the analog data signal obtained from the magnetic alignment disk, wherein;
   said alignment parameter is the radial alignment of the first transducer means; and
   said system control means determines the correct position for said first transducer means relative to a radial alignment track of the magnetic alignment disk by slaving said transducer positioning means in microstep increments until the envelope of a first lobe of a radial alignment signal is equal in magnitude to a second lobe of the radial alignment signal, the radial alignment signal being the analog data signal read by said first transducer means from the radial alignment track.

2. The electronically alignable disk drive of claim 1 wherein, the envelope detector means comprises an operational amplifier.

3. The self-aligning disk drive of claim 1 further comprising:

an analog to digital conversion means connected to the envelope detector means for converting said analog data signal to a digital signal; and a write current adjustment means for electronically adjusting the write current applied to the first transducer means.

4. The electronically adjustable disk drive of claim 3 wherein, the write current adjustment means comprises a digital to analog convertor.

5. The electronically adjustable disk drive of claim 1 wherein, the system control means includes at least one computer program stored on a random access memory (RAM) chip.

* * * * *